US011398984B1

(12) United States Patent
Ros-Giralt et al.

(10) Patent No.: US 11,398,984 B1
(45) Date of Patent: Jul. 26, 2022

(54) SYSTEMS AND METHODS FOR QUALITY OF SERVICE (QOS) BASED MANAGEMENT OF BOTTLENECKS AND FLOWS IN NETWORKS

(71) Applicant: Reservoir Labs, Inc., New York, NY (US)

(72) Inventors: Jordi Ros-Giralt, Newport Beach, CA (US); Aditya Gudibanda, Jersey City, NJ (US)

(73) Assignee: Reservoir Labs, Inc., New York, NY (US)

( * ) Notice: Subject to any disclaimer, the term of this patent is extended or adjusted under 35 U.S.C. 154(b) by 77 days.

(21) Appl. No.: 16/580,718

(22) Filed: Sep. 24, 2019

Related U.S. Application Data

(60) Provisional application No. 62/740,757, filed on Oct. 3, 2018, provisional application No. 62/735,366, filed on Sep. 24, 2018.

(51) Int. Cl.
| | | |
|---|---|---|
| *H04L 12/28* | (2006.01) | |
| *H04L 47/125* | (2022.01) | |
| *H04L 41/5003* | (2022.01) | |
| *H04L 47/24* | (2022.01) | |
| *G06K 9/62* | (2022.01) | |
| *H04L 41/0893* | (2022.01) | |
| *H04L 43/0882* | (2022.01) | |
| *H04L 47/80* | (2022.01) | |
| *H04L 45/302* | (2022.01) | |

(52) U.S. Cl.
CPC .......... *H04L 47/125* (2013.01); *G06K 9/6215* (2013.01); *H04L 41/0893* (2013.01); *H04L 41/5003* (2013.01); *H04L 43/0882* (2013.01); *H04L 45/302* (2013.01); *H04L 47/24* (2013.01); *H04L 47/805* (2013.01)

(58) Field of Classification Search
CPC ..... H04L 47/02; H04L 47/125; H04L 47/805; H04L 41/0893
See application file for complete search history.

(56) References Cited

U.S. PATENT DOCUMENTS

2016/0057061 A1* 2/2016 Avci ................. H04L 43/50
                                            370/235

\* cited by examiner

*Primary Examiner* — Bo Hui A Zhu
(74) *Attorney, Agent, or Firm* — Seyfarth Shaw LLP

(57) ABSTRACT

Techniques based on the Theory of Bottleneck Ordering can reveal the bottleneck structure of a network, and the Theory of Flow ordering can take advantage of the revealed bottleneck structure to manage and configure network flows so as to improve the overall network performance. These two techniques provide insights into the inherent topological properties of a network at least in three areas: (1) identification of the regions of influence of each bottleneck; (2) the order in which bottlenecks (and flows traversing them) may converge to their steady state transmission rates in distributed congestion control algorithms; and (3) the design of optimized traffic engineering policies.

30 Claims, 21 Drawing Sheets
(15 of 21 Drawing Sheet(s) Filed in Color)

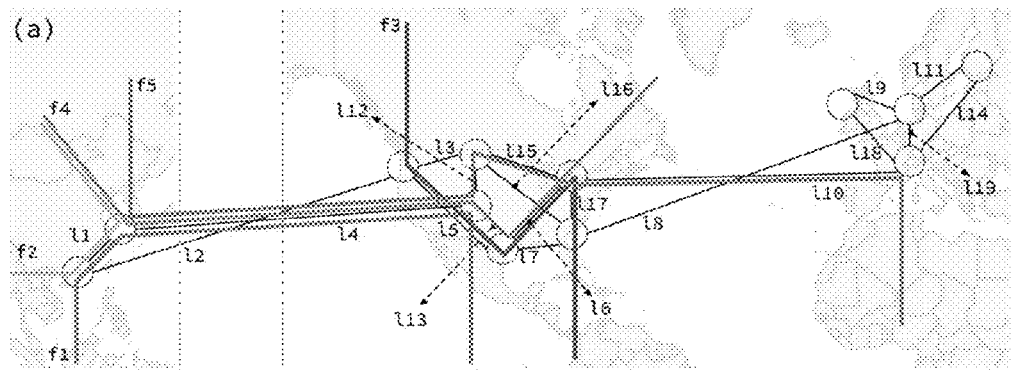
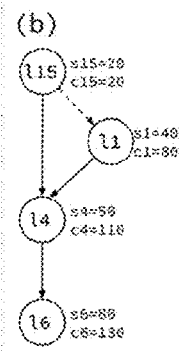
FIG. 5A
FIG. 5B
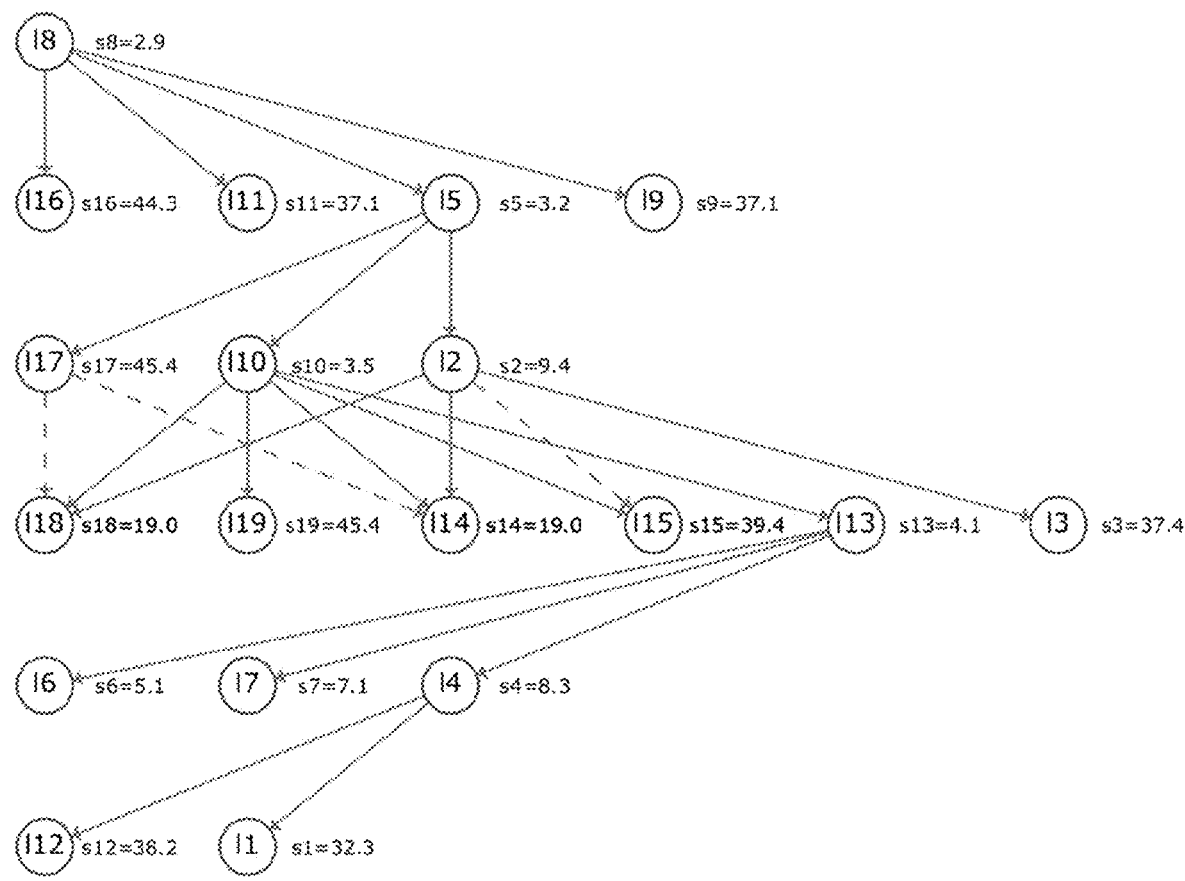
FIG. 6

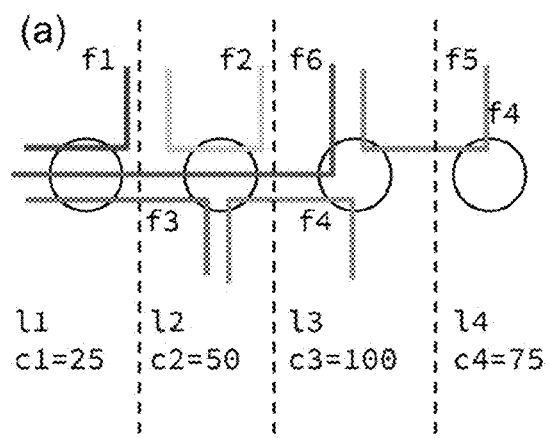
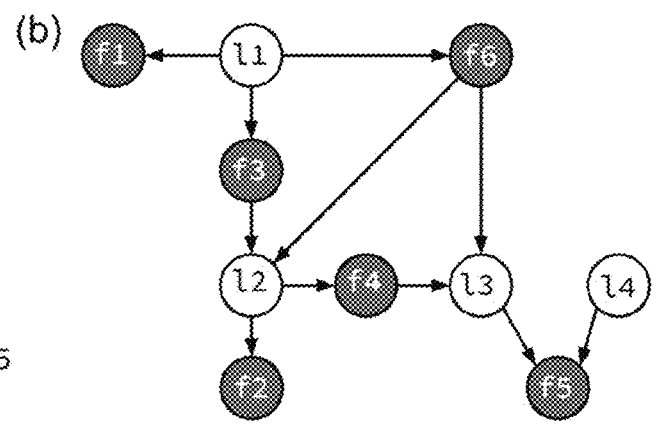
FIG. 7A
FIG. 7B
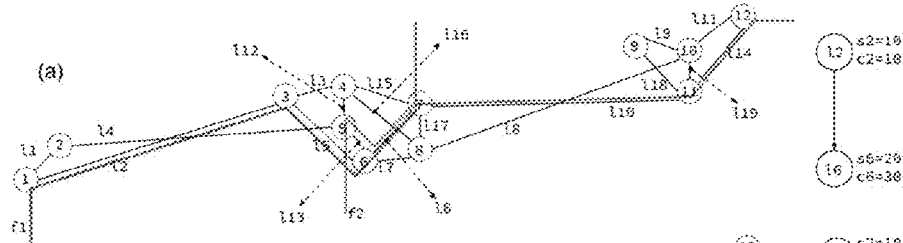
FIG. 8A
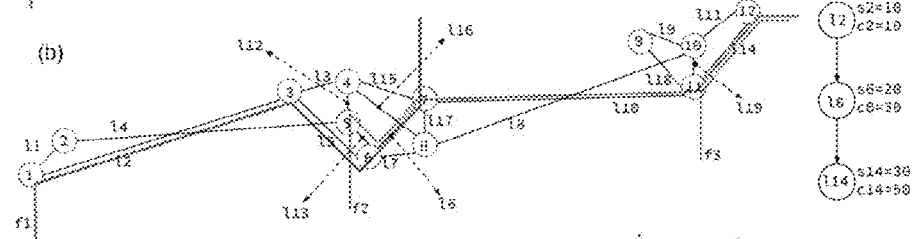
FIG. 8B
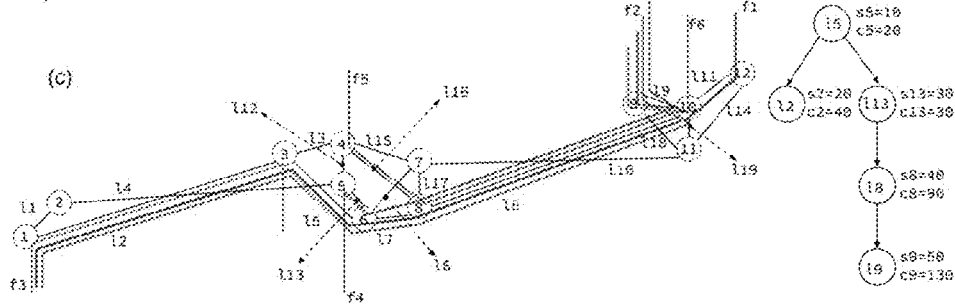
FIG. 8C

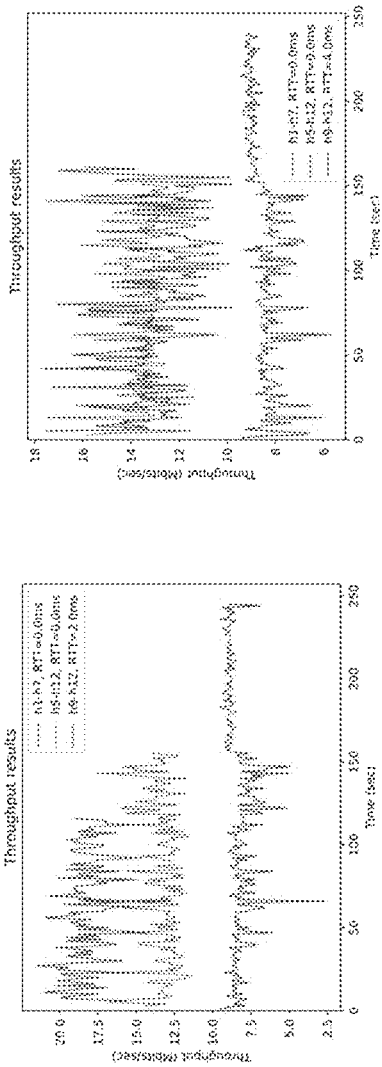
FIG. 11A
FIG. 11B
FIG. 11C
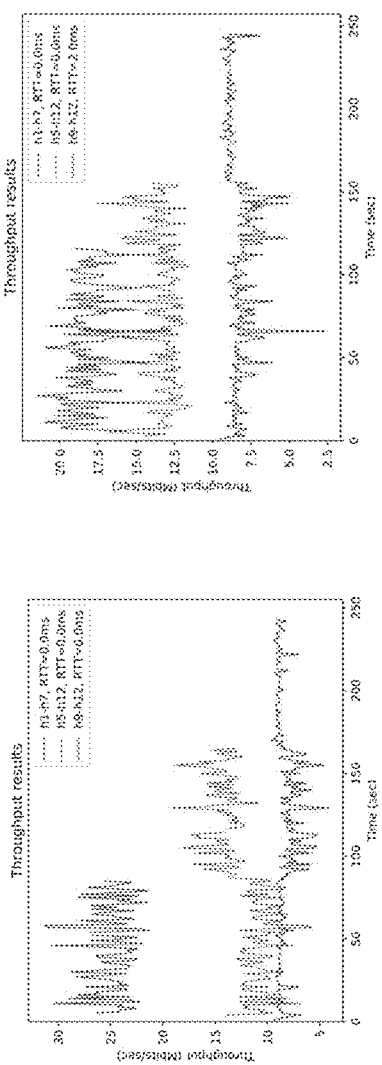
FIG. 11D
FIG. 11E
FIG. 11F

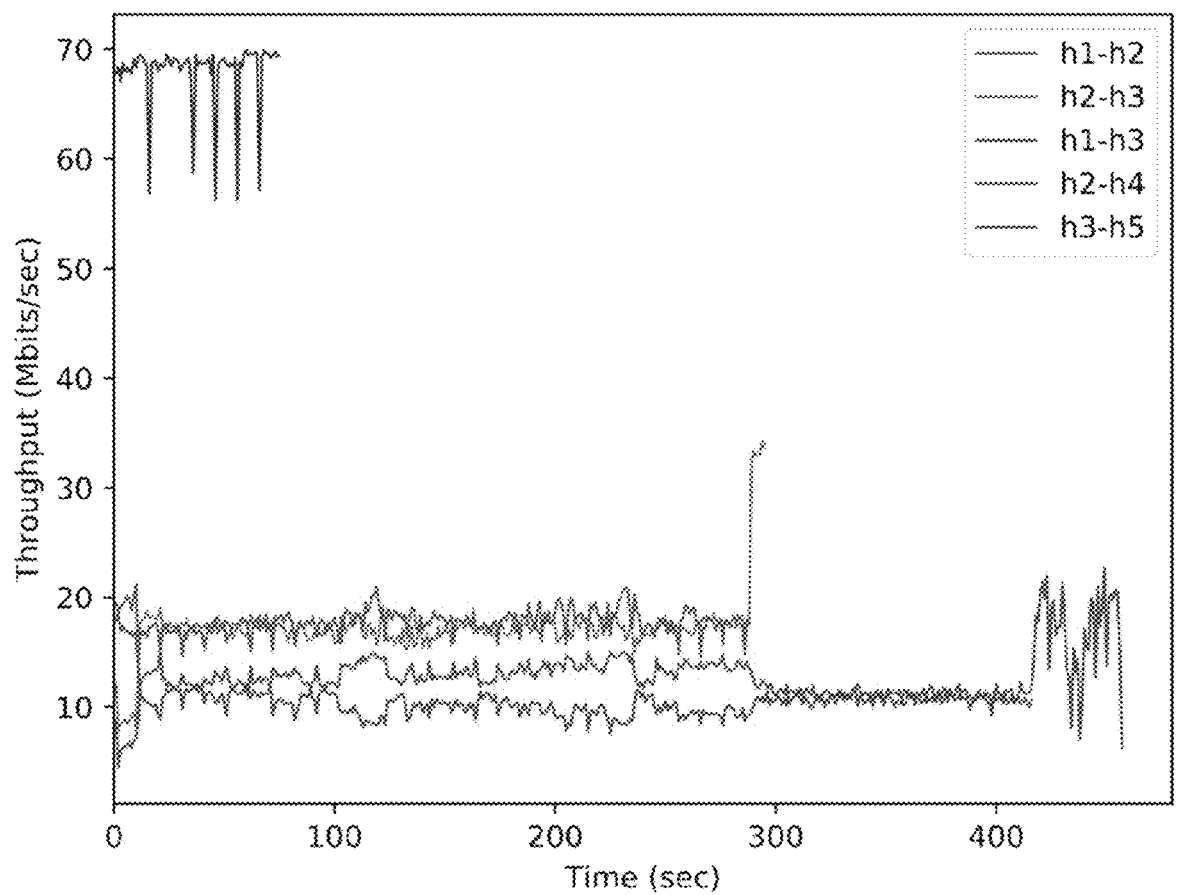
FIG. 12C
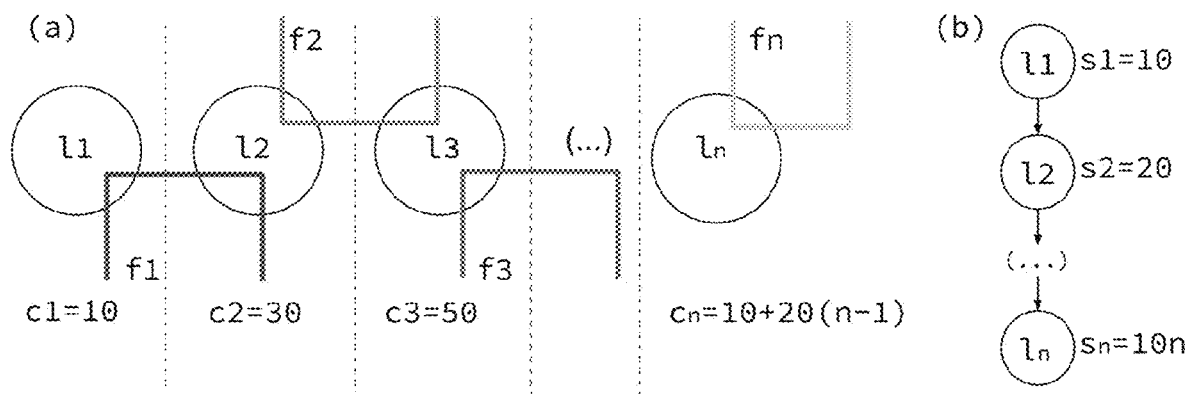
FIG. 13A
FIG. 13B

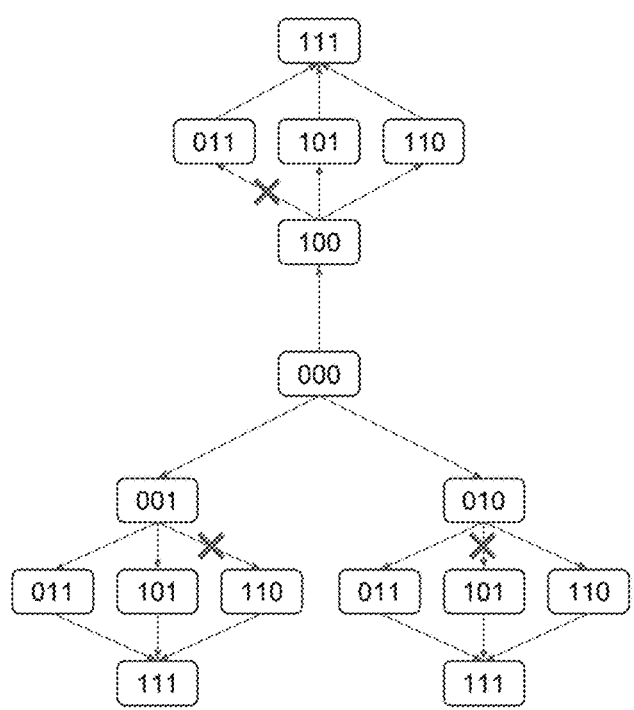
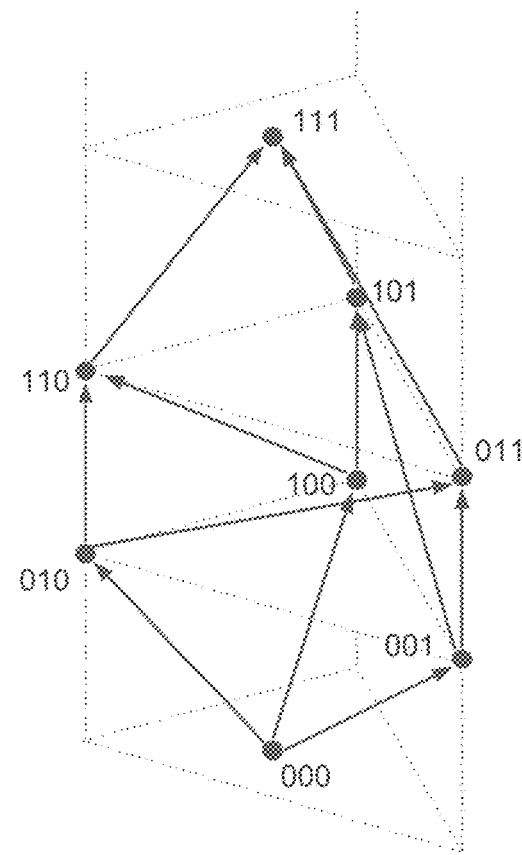
FIG. 16A                    FIG. 16B
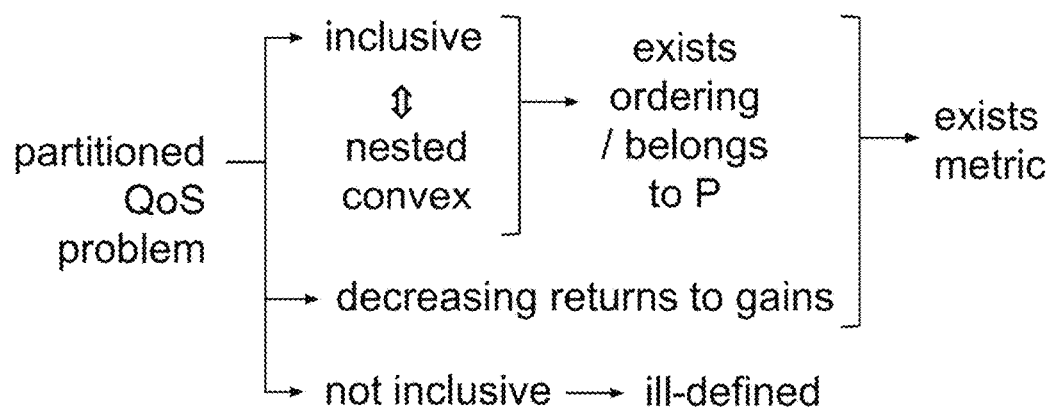
FIG. 17

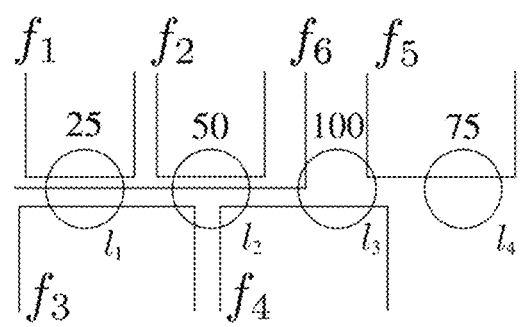
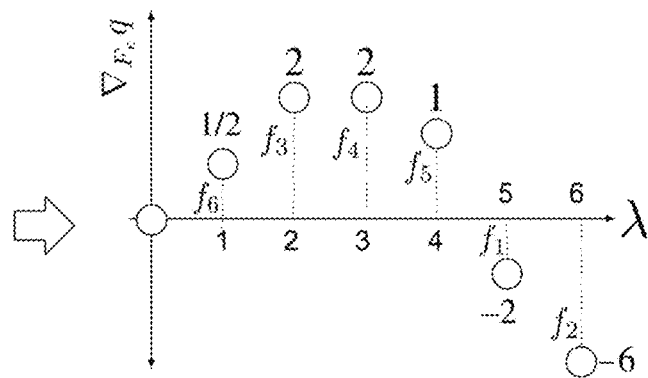
FIG. 18A
FIG. 18B
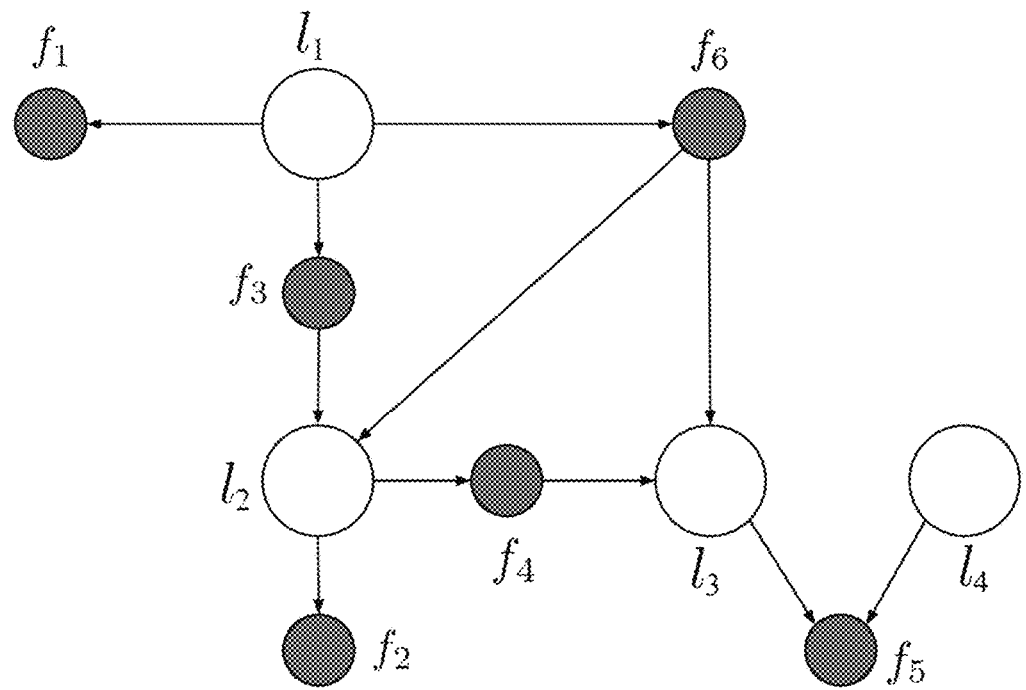
FIG. 19

(a) Link equation:

$$y_i = - \sum_{1 \leq j \leq m} x_j / n$$

(b) Flow equation:

$$y_i = min\{x_j, \ 1 \leq j \leq m\}$$

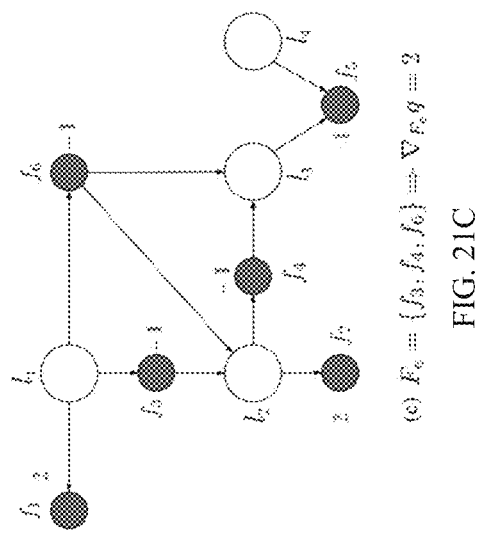
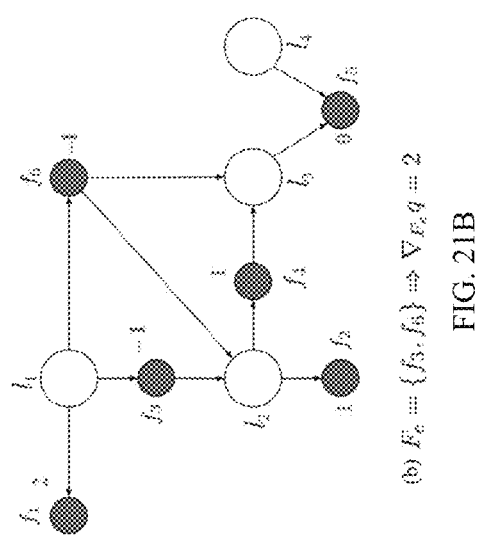
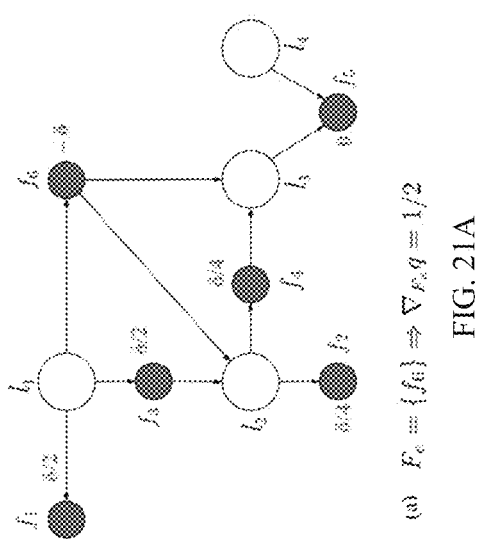
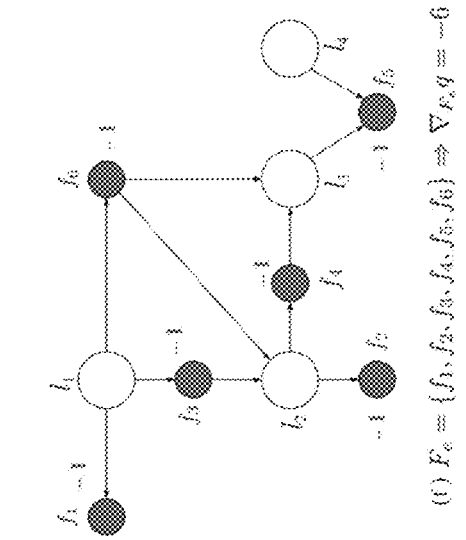

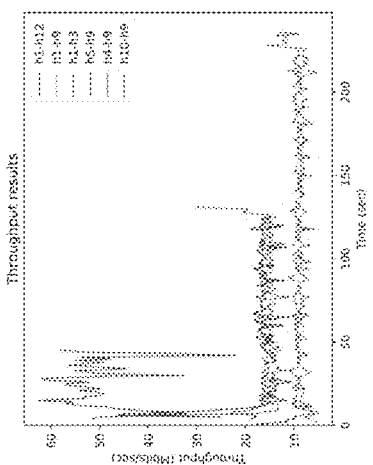
FIG. 22A
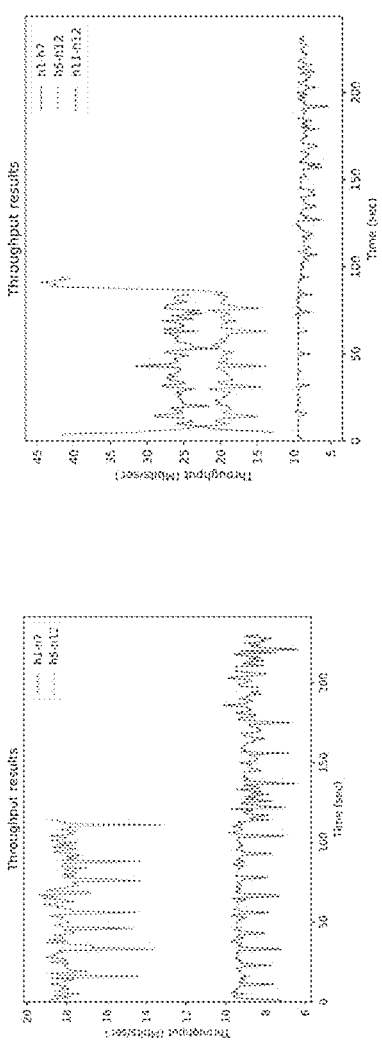
FIG. 22B
FIG. 22C
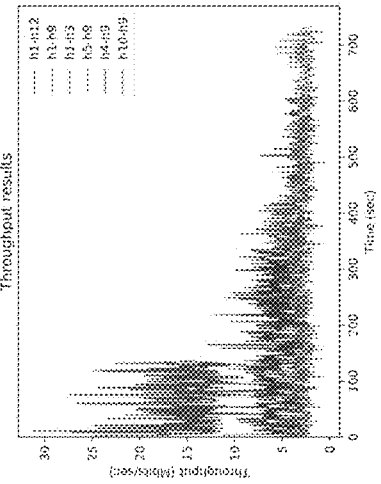
FIG. 22D
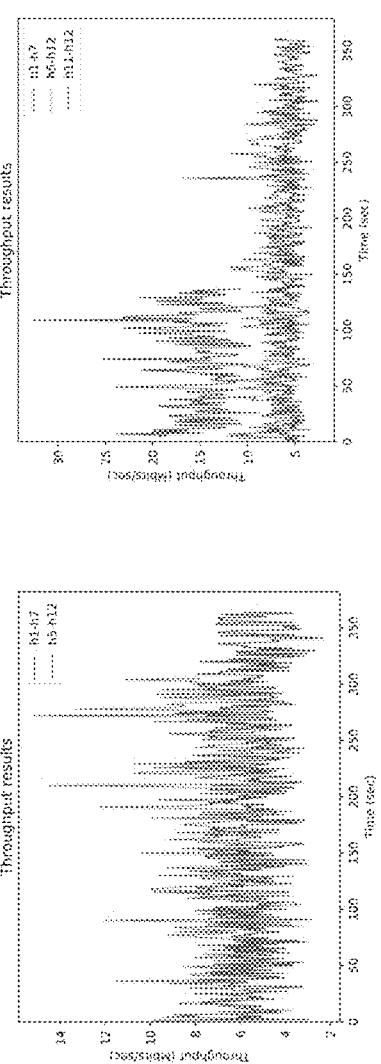
FIG. 22E
FIG. 22F

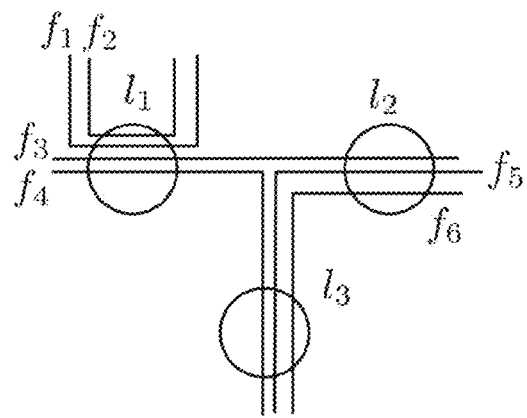 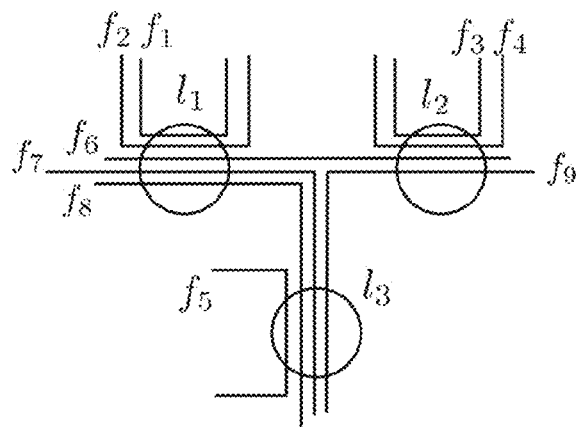
FIG. 26A          FIG. 26B
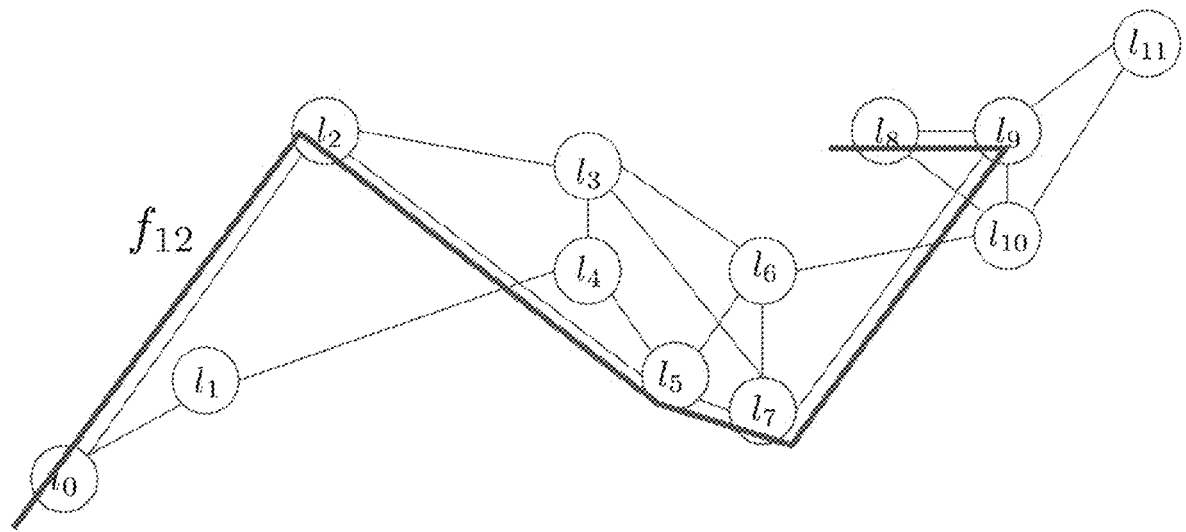
FIG. 27

| $F_e$ | $\nabla_{F_e} q$ | $F_e$ | $\nabla_{F_e} q$ | $F_e$ | $\nabla_{F_e} q$ | $F_e$ | $\nabla_{F_e} q$ |
|---|---|---|---|---|---|---|---|
| ∅ | 0 | $f_3, f_4$ | 1/2 | $f_2, f_3, f_4$ | -2 | $f_1, f_3, f_4, f_5$ | -2 |
| $f_1$ | -1 | $f_3, f_5$ | -1/2 | $f_2, f_3, f_5$ | -3/2 | $f_1, f_3, f_4, f_6$ | -1 |
| $f_2$ | -1 | $f_3, f_6$ | 2 | $f_2, f_3, f_6$ | 0 | $f_1, f_3, f_5, f_6$ | -2 |
| $f_3$ | -1/4 | $f_4, f_5$ | -1 | $f_2, f_4, f_5$ | -3 | $f_1, f_4, f_5, f_6$ | -2 |
| $f_4$ | 0 | $f_4, f_6$ | 1/2 | $f_2, f_4, f_6$ | -2 | $f_2, f_3, f_4, f_5$ | -3 |
| $f_5$ | -1 | $f_5, f_6$ | -1/2 | $f_2, f_5, f_6$ | -1/2 | $f_2, f_3, f_4, f_6$ | -2 |
| $f_6$ | 1/2 | $f_1, f_2, f_3$ | -3 | $f_3, f_4, f_5$ | -1/2 | $f_2, f_3, f_5, f_6$ | 0 |
| $f_1, f_2$ | -3/2 | $f_1, f_2, f_4$ | -2 | $f_3, f_4, f_6$ | 2 | $f_2, f_4, f_5, f_6$ | -3 |
| $f_1, f_3$ | -5/2 | $f_1, f_2, f_5$ | -2 | $f_3, f_5, f_6$ | 1 | $f_3, f_4, f_5, f_6$ | 1 |
| $f_1, f_4$ | -1 | $f_1, f_2, f_6$ | -1 | $f_4, f_5, f_6$ | -1/2 | $f_1, f_2, f_3, f_4, f_5$ | -3 |
| $f_1, f_5$ | -2 | $f_1, f_3, f_4$ | -2 | $f_1, f_2, f_3, f_4$ | -3 | $f_1, f_2, f_3, f_4, f_6$ | -5 |
| $f_1, f_6$ | -1 | $f_1, f_3, f_5$ | -5/2 | $f_1, f_2, f_3, f_5$ | -3 | $f_1, f_2, f_3, f_5, f_6$ | -3 |
| $f_2, f_3$ | -3/2 | $f_1, f_3, f_6$ | -1 | $f_1, f_2, f_3, f_6$ | -3 | $f_1, f_2, f_4, f_5, f_6$ | -3 |
| $f_2, f_4$ | -2 | $f_1, f_4, f_5$ | -2 | $f_1, f_2, f_4, f_5$ | -3 | $f_1, f_3, f_4, f_5, f_6$ | -2 |
| $f_2, f_5$ | -1 | $f_1, f_4, f_6$ | -1 | $f_1, f_2, f_4, f_6$ | -2 | $f_2, f_3, f_4, f_5, f_6$ | -3 |
| $f_2, f_6$ | 0 | $f_1, f_5, f_6$ | -2 | $f_1, f_2, f_5, f_6$ | -2 | $f_1, f_2, f_3, f_4, f_5, f_6$ | -6 |

SYSTEMS AND METHODS FOR QUALITY OF SERVICE (QOS) BASED MANAGEMENT OF BOTTLENECKS AND FLOWS IN NETWORKS

CROSS REFERENCE TO RELATED APPLICATIONS

This application claims priority to and benefit of U.S. Provisional Patent Application No. 62/735,366, entitled "Systems and Methods for Flow Ordering for Data Networks," filed on Sep. 24, 2018 and to U.S. Provisional Patent Application No. 62/740,757, entitled "Systems and Methods for QoS Based Analysis of Flows in Data Networks," filed on Oct. 3, 2018, the entire contents of each of which are incorporated herein by reference.

GOVERNMENT LICENSE RIGHTS

This invention was made with government support under contract No. DE-SC0011358 awarded by the U.S. Department of Energy (DoE). The government has certain rights in the invention.

FIELD OF THE INVENTION

This disclosure generally relates to networking systems and, in particular, to analysis and configuration of bottlenecks and flows in a network.

BACKGROUND

In data networks, congestion control algorithms such as those implemented in TCP/IP stacks typically focus on two general objectives: (1) Maximizing network utilization and (2) ensuring fairness among flows competing for network bandwidth. For the past three decades since the first congestion control algorithm was implemented as part of the TCP protocol, many different variations have been designed, implemented and extensively put into practice to help address these two objectives. In this context, it is well-known that regardless of the complexity of a communication path, the performance of a flow is uniquely determined by the capacity of its bottleneck link and its end-to-end round trip time (RTT). This funnel view has steered much of the research towards the single-bottleneck characterization problem, leading to the implicit assumption that bottlenecks in a network have a flat structure, and potentially hiding the need for a better understanding of bottlenecks in distributed networks.

While the problem of characterizing the influences and relationships existing between bottlenecks has not been addressed from a formal and practical standpoint, it has naturally not been fully omitted from the literature. For instance, some techniques describe the bottleneck relationships as dependency chains and observe that performance perturbations of bottleneck links may affect other bottleneck links, propagating through all links in the network, but do not address the problem of formally identifying the hidden structure that controls such perturbations.

SUMMARY

To address the above-described problems, we introduce the Theory of Bottleneck Ordering, a framework that, by revealing the bottleneck structure of a network, describes (qualitatively and quantitatively) the influence that bottlenecks exert onto each other. We then use three well-known congestion control algorithms to validate whether bottlenecks and flows in real networks behave as predicted by the theory. To get a broader sense of how the theory performs, we choose representatives from two widely used classes of congestion control algorithms: Bottleneck Bandwidth and Round-trip propagation time (BBR), from the class of congestion-based algorithms, and Cubic and Reno, from the class of loss-based additive-increase/multiplicative-decrease (AIMD) algorithms. The key contributions of the techniques described below can be summarized as follows:

Real networks qualitatively behave as predicted by the theory of bottleneck ordering. Thus the proposed framework can be used as a tool to understand bottleneck and flow performance.

Bottlenecks do not interact with and influence other bottlenecks in a flat structure, but rather through a structure described by the bottleneck precedence graph (BPG) as introduced herein.

Similarly, flows interact and influence each other through a structure described by the flow gradient graph also introduced herein.

Congestion control algorithms that can identify the bottleneck structure of the network perform significantly better in key metrics such as (1) flow completion time, (2) fairness, and (3) total throughput. The proposed theory can thus be used as a framework to evaluate the performance of various congestion control algorithms, helping to understand their capabilities and limitations in a rigorous approach, and providing a benchmark against an optimal baseline.

Differences in the round trip time can distort the bottleneck structure of a network. Depending on such differences, congestion-window based algorithms such as Cubic and Reno that are sensitive to RTT may not be able to identify the bottleneck structure; as a result, they perform poorly in the above-mentioned key performance metrics.

Congestion-based algorithms such as BBR that are more resilient to variations of RTT can identity the bottleneck structure and thus achieve significantly better performance. This insight provides a new formal explanation to understand the reason such class of algorithms may perform better.

Under the assumption that the congestion control algorithm can capture the bottleneck structure, the BPG graph reveals with precision the bounded regions of influence that bottlenecks and flows exert onto each other.

The convergence time of a congestion control algorithm depends on both (1) the number of levels in the bottleneck structure and (2) the number of flows that compete with each other in each independent bottleneck level.

Finally, against the conventional practice, we show (mathematically and experimentally) that low-hitter flows can have a significantly higher impact on the overall performance of the network than heavy-hitter flows. Such flows can be identified in polynomial time using an algorithm we describe below.

In addition, we note that various known techniques for determining flow size that use metrics such as the number of bytes, transmission rate, duration, jitter or burstiness, to name a few may not accurately model the flow size and, to address this problem, provide a formal mathematical definition of flow size that depends on the topological structure of the network and a utility function that describes its QoS properties. This leads to a theory of flow ordering, a mathematical framework that explains the connection between flow size and the QoS properties of a network. We also describe techniques for flow ordering using the bottleneck structure of the network.

Accordingly, in one aspect a method is provided for improving the utilization of a network by configuring processing of flows therein, where the network includes several links and has a number of flows that are processed according to P policies, where P is greater than 1. The method includes evaluating a number of candidate partitionings of the several flows into P groups, where the evaluation of each candidate partitioning is performed using a QoS function that, using network topology, determines network performance for each candidate partitioning. Specifically, according to a candidate partitioning, a first flow belongs to a first group of the P groups and one or more flows belong to a second group of the P groups and, to determine the network performance, the QoS function accounts for an effect of rate drift in a rate of the first flow on respective rates of all other flows in the network. The method also includes designating a candidate partitioning that maximizes the network performance as best partitioning. The several flows in the network are allocated to the P groups according to the best partitioning, and one or more flows in each group are processed according to a respective one of the P policies.

The QoS function may include a generalized P-partitioned set function receiving (P-1) sets as inputs. In some embodiments, the QoS function includes a max-min/max-flow function. The max-min/max-flow function may include: (i) a weighted max-min/max-flow function, (ii) a max-min/weighted max-flow function, or (iii) a weighted max-min/weighted max-flow function. In some embodiments, the QoS function guarantees, for at least one flow among the several network flows, a specified minimum flow rate.

In some embodiments, the QoS function is inclusive. As such, the several candidate partitionings that are evaluated may include one or more sets of partitionings, where one or more partitionings in each set corresponds to a respective value of a parameter ($\lambda$). Evaluating the several candidate partitionings may include selecting a sequence of parameter values in order and, for each parameter value, performing the following two operations: (1) evaluating from a corresponding set one or more candidate partitionings using the QoS function; and (2) designating a candidate partitioning that maximizes the network performance as optimal partitioning for that parameter value. This yields a number of optimal partitionings corresponding to the sequence of parameter values. The method may also include designating as the best partitioning from the several optimal partitionings, a partitioning for which the network performance according to the QoS function is maximum.

In some embodiments, evaluating the one or more candidate partitionings for a current parameter value includes identifying a nested neighborhood of the optimal partitioning for a preceding parameter value. In the optimal partitioning for the preceding parameter value, each flow belonging to a first group in the P groups may be larger in size than any flow in a second group in the P groups, and each partitioning may be encoded using P symbols. Identifying the nested neighborhood may include selecting a candidate partitioning such that: (1) the Manhattan distance between an encoding of the candidate partitioning and an encoding of the optimal partitioning for the preceding parameter value is less than or equal to a specified threshold; and (2) each flow designated to the first group in the optimal partitioning for the preceding parameter value is also designated to a corresponding first group in the candidate partitioning.

In some embodiments, evaluating a particular candidate partitioning includes constructing a flow gradient graph for the network. The method may also include decrementing a respective flow rate of each flow in at least one partition according to the candidate partitioning, by a unit rate ($\delta$), and propagating reduction in the flow rates through the flow gradient graph to obtain a flow rate drift at each flow in the network. The method may also include aggregating the flow rate drifts using a function based on the QoS function to obtain the network performance.

Constructing the flow gradient graph may include creating a link vertex for each bottleneck link in the network and a flow vertex for each flow in the network. In addition, the method may include, for each link (or each bottleneck link) in the network: (1) identifying one or more flows bottlenecked by that link, and adding a respective directed edge from a link vertex corresponding to that link to the respective flow vertices corresponding to each of the one or more bottlenecked flows; and (2) identifying non-bottlenecked flows passing through the link, and adding a respective directed edge from a flow vertex corresponding to each non-bottlenecked flow to the link vertex corresponding to the link. In some embodiments, the one or more bottlenecked flows and the one or more non-bottlenecked flows are identified by constructing a bottleneck precedence graph.

The network can be a data network, an energy-distribution network, a cellular network, and a goods-distribution network. In some embodiments, P is equal to two and, according to the best partitioning, one or more flows from the several flows in the network belong to a first group and are designated elephant flows, and the remaining flow or flows belong to a second group and are designated mouse flows. Each of the P policies may define a respective processing priority for the flows belonging to the corresponding one of the P groups.

In another aspect, a system is provided for improving the utilization of a network by configuring processing of flows therein, where the network includes several links and has a number of flows that are processed according to P policies, where P is greater than 1. The system includes a first processor, and a first memory in electrical communication with the first processor. The first memory includes instructions that may be executed by a processing unit. The processing unit may include the first processor and/or a second processor, and is in electronic communication with a memory module that may include the first memory and/or a second memory.

The instructions program the processing unit to evaluate a number of candidate partitionings of the several network flows into P groups using a QoS function that, using network topology, determines network performance for each candidate partitioning. According to a candidate partitioning, a first flow belongs to a first group of the P groups and one or more other flows belong to a second group of the P groups. To determine the network performance, the QoS function accounts for effect of rate drift in a rate of the first flow on respective rates of all other flows in the several network flows. The instructions program the processing unit to designate a candidate partitioning that maximizes the network performance as best partitioning, where the several network flows are allocated to the P groups according to the best partitioning, and one or more flows in each group are processed according to a respective one of the P policies. In various embodiments, the instructions can program the processing unit to perform one or more of the additional method steps described above.

In another aspect, an article of manufacture is provided that includes a non-transitory storage medium having stored therein instructions which, when executed by a processing unit program the processing unit, which is in electronic communication with a memory module, for improving the utilization of a network by configuring processing of flows therein, where the network includes several links and has a number of flows that are processed according to P policies, where P is greater than 1.

To this end, the instructions program the processing unit to evaluate a number of candidate partitionings of the several network flows into P groups using a QoS function that, using network topology, determines network performance for each candidate partitioning. According to a candidate partitioning, a first flow belongs to a first group of the P groups and one or more other flows belong to a second group of the P groups. To determine the network performance, the QoS function accounts for effect of rate drift in a rate of the first flow on respective rates of all other flows in the several network flows. The instructions program the processing unit to designate a candidate partitioning that maximizes the network performance as best partitioning, where the several network flows are allocated to the P groups according to the best partitioning, and one or more flows in each group are processed according to a respective one of the P policies. In various embodiments, the instructions can program the processing unit to perform one or more of the additional method steps described above.

BRIEF DESCRIPTION OF DRAWINGS

The patent or application file contains at least one drawing executed in color. Copies of this patent or patent application publication with color drawing(s) will be provided by the Office upon request and payment of the necessary fee. Various embodiments of the present invention taught herein are illustrated by way of example, and not by way of limitation, in the figures of the accompanying drawings, in which:

FIG. 5A depicts five example flows in the B4 network shown in FIG. 4;

FIG. 5B depicts a Bottleneck Precedence Graph (BPG) derived for the five flows shown in FIG. 5A, according to one embodiment;

FIG. 6 depicts a bottleneck structure of the B4 network shown in FIG. 4, according to one embodiment;

FIG. 7A depicts an example network having four links and six flows;

FIG. 7B shows a flow gradient graph corresponding to the network shown in FIG. 7A, according to one embodiment;

FIGS. 8A-8C depict networks having two-level, three-level, and four-level bottleneck structures, respectively, according to various embodiments;

FIGS. 11A-11F show failure of extraction of the bottleneck structures of the network shown in FIG. 8C using BBR when the round trip time (RTT) is increased progressively, and where a bottleneck precedence graph is not constructed;

FIG. 12C shows the effect of running BBR on the network shown in FIG. 7A, where a low-hitter flow is removed;

FIGS. 13A and 13B show another example network and the corresponding BPG, according one embodiment;

FIGS. 16A and 16B depict a set of feasible optimization paths on a two-partitioned QoS function for an example network having three flows, according to various embodiments;

FIG. 17 shows various configurations of a partitioned QoS problem;

FIGS. 18A and 18B depict, respectively, an example network having four links and six flows, and ordering of flows according to one embodiment;

FIG. 19 shows a flow gradient graph for the network shown in FIG. 18A;

FIGS. 21A-21F illustrate computation of flow gradients for λ-optimal partitionings for the network shown in FIG. 18A, according to one embodiment;

FIGS. 22A-22C show extraction of the bottleneck structures of the networks shown in FIGS. 8A-8C, respectively, using the conventional congestion control technique BBR, that does not construct bottleneck precedence graphs;

FIGS. 22D-22F show extraction of the bottleneck structures of the networks shown in FIGS. 8A-8C, respectively, using another conventional congestion control technique Reno, that also does not construct bottleneck precedence graphs;

FIGS. 26A and 26B depict, respectively, a singular, non-nested convex network and a non-singular, non-nested convex network;

FIG. 27 shows the largest flow in Google's B4 network, identified using a QoS function according to one embodiment;

FIG. 28 shows the identification of the flow size ordering for the network in FIG. 18A by computing the flow gradients for all possible subsets of flows; and FIG. 29 shows the identification of the flow size ordering for Google's B4 network via the computation of the flow gradients for all possible A-optimal partitions.

DETAILED DESCRIPTION

Part 1: A Theory of Bottleneck Ordering for Networks

We describe below the Theory of Bottleneck Ordering, a mathematical framework that reveals the bottleneck structure of networks in general, including data networks, energy-distribution networks, cellular networks, networks for distributing physical goods, etc. This theoretical framework provides insights into the inherent topological properties of a network at least in three areas: (1) It identifies the regions of influence of each bottleneck; (2) it reveals the order in which bottlenecks (and flows traversing them) converge to their steady state transmission rates in distributed congestion control algorithms; and (3) it provides key insights to the design of optimized traffic engineering policies.

We demonstrate the efficacy of the proposed theory in TCP congestion-controlled networks for two broad classes of algorithms: congestion-based algorithms (BBR) and loss-based additive-increase/multiplicative-decrease algorithms (Cubic and Reno). Among other results, our network experiments show that: (1) Qualitatively, both classes of congestion control algorithms behave as predicted by the bottleneck structure of the network; (2) flows generally compete for bandwidth only with other flows operating at the same bottleneck level; (3) BBR flows can achieve higher performance and fairness than Cubic and Reno flows due to their ability to operate at the right bottleneck level; (4) the bottleneck structure of a network is generally ever-changing and its levels can be folded due to variations in the flows' round trip times; and (5) against conventional wisdom, low-hitter flows can have a large impact to the overall performance of a network.

Transmission of Bottleneck Information

In the context of data networks, it is well-known that regardless of how many links a connection traverses, from the TCP's viewpoint, any network path generally behaves as a single link with the same round-trip time and bottleneck rate. What is less understood is the fact that not all bottleneck links are of equal importance. To provide some intuition to this argument, let us consider some initial simple network examples.

Figures 1A, 1B:
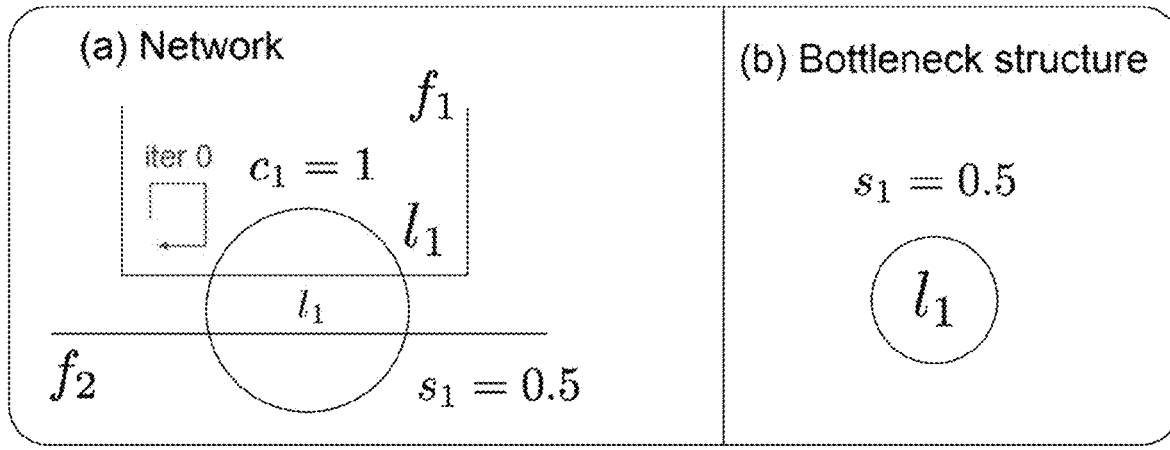
FIGS. 1A, 2A, and 3A depict one-link, two-link, and three-link networks, respectively.
FIGS. 1B, 2B, and 3B depict the respective bottleneck structures corresponding to the networks depicted in FIGS. 1A, 2A, and 3A, according to one embodiment.
Figures 2A, 2B:
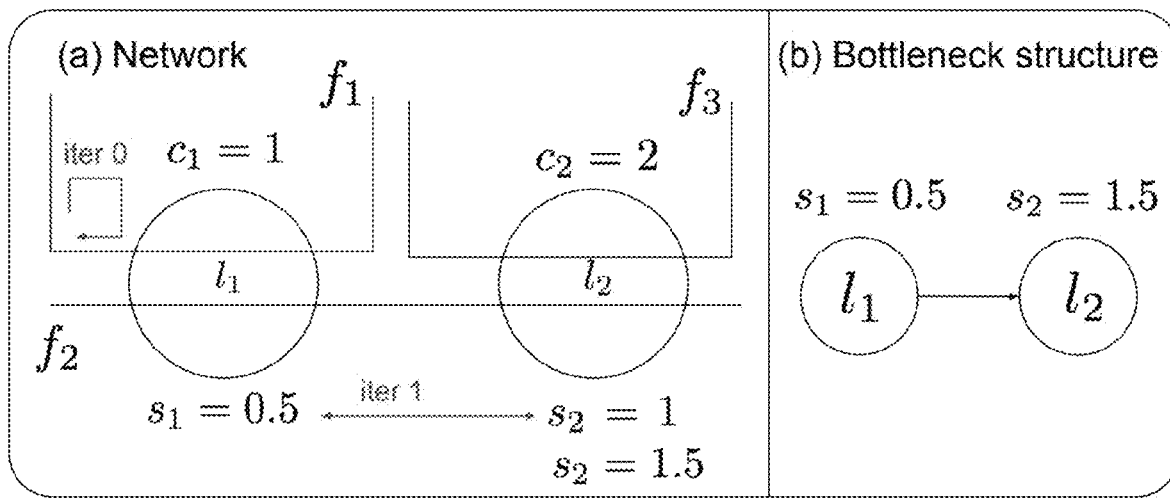
Figures 3A, 3B:
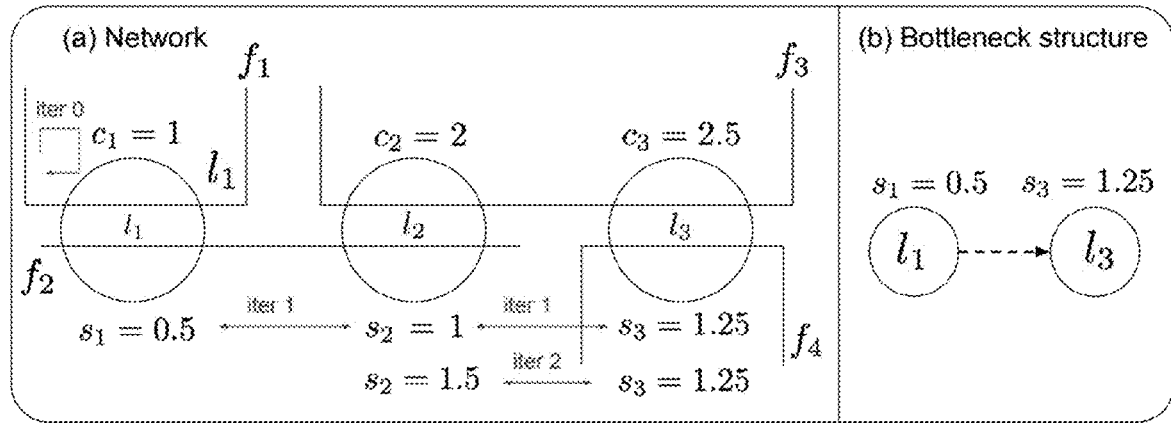

Consider the network configurations illustrated in FIGS. 1A, 2A and 3A. In these three drawings, links are represented by circles and flows by lines traversing the links. Each link $l_i$ has a capacity $c_i$ bps while each flow $f_i$ transmits data at a rate $r_i$ bps. For instance, FIG. 1A corresponds to the case of a single bottleneck link, $l_1$, with two flows, $f_1$ and $f_2$. Since the capacity of the link is $c_1=1$ bps, each flow can transmit data at 0.5 bps. This value is typically referred as the link's fair share, which we denote as $s_1=0.5$ bps. Thus we trivially have $r_1=r_2=s_1=0.5$ bps. Note that while other allocation schemes could result in flow transmission rates different than the fair share, since the existence of bottleneck links is a fundamental invariant in all of these schemes, the theoretical framework described herein is applicable without loss of generality. The bottleneck structure of a single link network is thus a trivial graph with just one vertex corresponding to the only link, as shown in FIG. 1B.

Consider now the network configuration in FIG. 2A corresponding to two links and three flows. Link $l_1$ is the most constrained since it has a lower fair share than link $l_2$ ($s_1=0.5$ while $s_2=1$). Thus the transmission rates of flows $f_1$ and $f_2$ are determined by this link, taking a value equal to its fair share: $r_1=r_2=s_1=0.5$. Once these two flow rates settle, then flow $f_3$'s rate can be determined as follows: since flow $f_2$ has a rate $r_2=0.5$, flow $f_3$ will take the excess capacity left in link $l_2$, which corresponds to $s_2=2-0.5=1.5$. In other words, since flow $f_3$ is bottlenecked at link $l_2$, its rate corresponds to this link's fair share after the rates of all flows going through it and bottlenecked at some other link have been subtracted from its capacity. Note that this rate assignment is also known in the literature as the max-min solution and can be computed using a water-filling algorithm.

While this network configuration is still very simple, an interesting question arises from its topological structure: Are both bottleneck links $l_1$ and $l_2$ equally important with regards to the overall performance of the network? For instance, it is easy to see that the derivative of $s_2$ with respect to $c_1$ is 0.5, $\partial s_2/\partial c_1=0.5$, while the derivative of $s_1$ with respect to $c_2$ is 0, $\partial s_1/\partial c_2=0$. That means the performance of link $l_2$ (measured in terms of its fair share) depends on the performance of link $l_1$, but not vice-versa, thus revealing a notion of hierarchy or ordering between these two bottleneck links. The bottleneck structure that we formally introduce herein is a graph that captures these relationships.

An intuitive way to understand the bottleneck structure of a network involves modeling the bottleneck links as nodes communicating with each other, where these nodes implement a distributed congestion control algorithm to determine their fair share while using the smallest possible number of iterations. In FIG. 2A, we can say that link $l_2$ cannot converge to its fair share value, $s_2=1.5$, until link $l_1$ has converged to its own, $s_1=0.5$. Thus, in order to settle its own fair share $s_2$, link $l_2$ has to wait until link $l_1$ broadcasts its fair share $s_1$. This leads to a bottleneck structure having two nodes, $l_1$ and $l_2$, and a directed edge from $l_1$ to $l_2$ denoting the communication that must occur so that the bottlenecks can settle their fair shares. This two-level bottleneck structure is shown in FIG. 2B.

Consider yet another network configuration having three links and four flows, as shown in FIG. 3A. Using our communication model, the first bottleneck link to settle its fair share is $l_1$ with a value of $s_1=0.5$. This implies that flows $f_1$ and $f_2$ get a transmission rate of $r_1=r_2=s_1=0.5$. Once link $l_1$'s fair share is communicated to links $l_2$ and $l_3$, then link $l_3$ becomes the next bottleneck with a fair share of $s_3=1.25$ (since this value is lower than link $l_2$'s fair share of $s_2=1.5$). Consequently, flows $f_3$ and $f_4$ get a transmission rate of $r_3=r_4=s_3=1.25$. Note that link $l_2$ is not a bottleneck link in this network, since its total flow is lower than its capacity, $r_2+r_3=1.75<2$. Thus the resulting bottleneck structure includes two nodes for links $l_1$ and $l_3$ and a directed edge between them as shown in FIG. 3B.

While the bottleneck structures of the second and third examples are apparently similar (both have two bottleneck links connected by an edge), there is a subtle yet important difference: In the second example (FIGS. 2A and 2B), there exists a flow that traverses both bottlenecks (flow $f_2$ goes through both links $l_1$ and $l_2$), while in the third example (FIGS. 3A and 3B) the two bottlenecks ($l_1$ and $l_3$) do not share any flow. The latter case is important as it demonstrates that bottleneck information can travel between two links even if there is no direct communication path between them. (In the discussion below, we mathematically prove this result.) In this case, links $l_1$ and $l_2$ are connected via flow $f_2$ while links $l_2$ and $l_3$ are connected via flow $f_3$, enabling a bottleneck communication path between links $l_1$ and $l_3$ via link $l_2$. To differentiate the two types of communication paths between links illustrated in FIGS. 2A and 3A, we use the terms direct precedence and indirect precedence, respectively, and denote this in the bottleneck structure graph by using a solid and a dashed edge connecting the two links. In the theoretical framework introduced herein, we refer to the bottleneck structure of a network as its bottleneck precedence graph (BPG), discussed below.

Note that the BPG also reveals the number of iterations required by links to converge to their fair share. For instance, while two links related by direct precedence can communicate in one iteration (FIG. 2A), links that are connected via indirect precedence require two iterations, since the bottleneck information needs to be conveyed via a relay link (FIG. 3A). In the discussion below, we mathematically prove that the BPG graph is also an effective tool to measure the minimum convergence time required by any distributed congestion control algorithm.

The above examples helped us to informally introduce the bottleneck structure of some simple network configurations providing initial intuition behind the existence of (1) bottleneck hierarchies, (2) the notion of convergence time for a distributed congestion control algorithm, and (3) the concept of direct and indirect precedence between two bottlenecks. In the discussion below, we formalize all these intuitive concepts into a mathematical theory of bottleneck ordering and introduce an algorithm to compute the bottleneck precedence graph for arbitrary network topologies.

Parallel Convergence in the Water-Filling Algorithm

We start our work with an implicit assumption: That in steady state, all congestion-controlled flows are bottlenecked at least at one link. The general intuition for this statement is that all congestion control algorithms—by their fundamental objective—are designed not to leave unused bandwidth. This fact is certainly true for algorithms implemented as part of a TCP/IP stack. The second observation we make is that, as shown above, the max-min rate allocation provides a natural way to identify the bottleneck link of every flow in steady state. Intuitively, a flow cannot get a rate above its bottleneck's fair share, as that would be a capacity violation if all other flows acted in the same way.

Thus, in what follows, we use the max-min assignment to analyze the influence that the bottlenecks exert onto each other and reveal the topological structure that inter-relates them. Two notes are relevant in this regard. First, the same general bottleneck principles apply to other allocation schemes different than max-min (for instance, weighted max-min or proportional fairness). The bottleneck structure in these other schemes might be different, but the concept of bottleneck structure is universal and exists in them too for a reason mentioned above. Secondly, as we show in our experiments discussed below, TCP's congestion control (a widely used algorithm in modern networks) does follow very closely the bottleneck structure revealed by the max-min assumption, which makes this choice highly practical.

Next, we describe an algorithm to compute the max-min rate allocation of a network. The original algorithm—called the water-filling Algorithm—was introduced by Bertsekas and Gallager (Dimitri P Bertsekas, Robert G Gallager, and Pierre Humblet, *Data Networks*, volume 2, Prentice-Hall International New Jersey (1992)). To develop the theoretical framework, however, we use a variant of the water-filling algorithm introduced by Ros-Giralt and Tsai (Jordi Ros and Wei Kang Tsai, "A Theory of Convergence Order of Maxmin Rate Allocation and an Optimal Protocol," *Proceedings IEEE INFOCOM* 2001, volume 2, pages 717-726 (2001)). This variant, presented in Algorithm 1, exploits a parallelization property in the original water-filling algorithm that allows certain bottleneck links to converge concurrently, leading to a lower execution time when the algorithm runs on a parallel computing architecture.

| Algorithm 1: FastWaterFilling |
| --- |
| 1     $\mathcal{L}$ := Set of links in the input network; |
| 2     $\mathcal{F}$ := Set of flows in the input network; |
| 3     $\mathcal{F}_l$ := Set of flows going through link l; |
| 4     $c_l$ := Capacity of link l; |
| 5     $\mathcal{B}$ := Set of bottleneck links; |
| 6     $r_f$ := Rate of flow f; |
| 7     $\mathcal{L}^k$ := Set of unresolved links at iteration k; |
| 8     $\mathcal{C}^k$ := Set of converged flows at iteration k; |
| 9     $\mathcal{L}^0 = \mathcal{L}; \mathcal{C}^0 = \{\emptyset\}$; |
| 10     k = 0; |
| 11     while $\mathcal{C}^k \neq \mathcal{F}$ do |
| 12        $s_l^k = (c_l - \Sigma_{\forall f \in \mathcal{C}^k \cap \mathcal{F}_l} r_f)/|\mathcal{F}_l \setminus \mathcal{C}^k|, \forall l \in \mathcal{L}^k$; |
| 13        $u_l^k = \min\{s_{l'}^k | \mathcal{F}_{l'} \cap \mathcal{F}_l \neq \{\emptyset\}, \forall l' \in \mathcal{L}^k\}$; |
| 14        for $l \in \mathcal{L}^k, s_l^k = u_l^k$ do |
| 15           $r_f = s_l^k, \forall f \in \mathcal{F}_l \setminus \mathcal{C}^k$; |
| 16           $\tilde{\mathcal{L}}^k = \mathcal{L}^k \setminus \{l\}$; |
| 17           $\mathcal{C}^k = \mathcal{C}^k \cup \{f, \forall f \in \mathcal{F}_l \setminus \mathcal{C}^k\}$; |
| 18        end for |
| 19        $\mathcal{L}^{k+1} = \tilde{\mathcal{L}}^k; \mathcal{C}^{k+1} = \mathcal{C}^k$; |
| 20        k = k + 1; |
| 21     end while |
| 22     $\mathcal{B} = \mathcal{L} \setminus \mathcal{L}^k$; |
| 23     return $\langle \mathcal{B}, \{r_f, \forall f \in \mathcal{F}\}, \{s_l^k, \forall l \in \mathcal{B}\}, k \rangle$; |

The algorithm relies on two parameters:

The fair share of link l at iteration k: $s_l^k$. As described above, this corresponds to the fair share of a link after removing all the flows that have converged up to iteration k and is computed in line 12.

The upstream fair share of link l at iteration k: $u_l^k$. This parameter corresponds to the minimum fair share among all the links sharing a flow with l and is computed in line 13.

The algorithm tracks the set of unresolved links $\mathcal{L}^k$ (links whose final fair share has not been determined yet) and the set of converged flows $\mathcal{C}^k$ (flows whose final transmission rate has been determined). At each iteration k, for each unresolved link l that has a fair share equal to its upstream fair share, $s_l^k = u_l^k$ (line 14), three actions are taken: (1) The transmission rate of the remaining flows going through link l is assigned to the fair share value (line 15), (2) link l is removed from the set of unresolved links (line 16), and (3) all of the remaining flows going through it are added to the set of converged flows (line 17). This process ends when all the flows and all the bottleneck links have converged to their final transmission rate and fair share values, respectively. Upon completion, the algorithm returns the set of bottleneck links $\mathcal{B}$, the transmission rate of all the flows $\{r_f^k, \forall f \in \mathcal{F}\}$, the fair share of all the bottleneck links $\{s_l^k, \forall l \in \mathcal{B}\}$, and the value of k, which corresponds to the depth of the bottleneck structure as we demonstrate below.

The FastWaterFilling algorithm exploits the following property formally proven elsewhere: A link that has the minimum fair share among all the links it shares flows with, can immediately converge to its final fair share. Because in general, more than one link satisfies this property at each iteration k, this allows multiple links to converge concurrently at the same iteration. On average this approach reduces the number of iterations from $O(|\mathcal{L}|)$ in Bertseka's original water-filling algorithm down to $O(\log(|\mathcal{L}|))$. In the techniques described herein, we observe that this parallelization property captures the exact natural convergence time of bottleneck links in real networks. Our observation relies on the fact that modern networks use distributed congestion control algorithms-such as TCP BBR, Cubic, and Reno—that effectively behave like a large parallel computer. This property plays a crucial role in understanding the bottleneck structure of a network, as we show next.

Precedent Link Relations

A more detailed analysis of the FastWaterFilling algorithm shows that the order of execution of its while loop reveals a bottleneck structure that is unique to every network. In this hidden structure, bottleneck links relate to each other by following well defined mathematical relationships that describe how (and in what magnitude) a link can affect the performance of another link. In particular, we show there exists only two essential relationships between bottlenecks, direct precedence and indirect precedence, which we formally introduce as follows:

Definition 1 Direct precedence. Let l and l' be two links such that (1) l converges at iteration k, (2) l' converges at iteration k', for some k'>k, and (3) $\mathcal{F}_l \cap \mathcal{F}_{l'} \neq \{\emptyset\}$. Then we say that link l is a direct precedent link (or simply a direct precedent) of link l'.

Definition 2 Indirect precedence. Let l and l' be two links such that (1) l converges at iteration k, (2) l' converges at iteration k', for some k'>k, and (3) $\mathcal{F}_l \cap \mathcal{F}_{l'} = \{\emptyset\}$ but there exists another link $l_r$ such that (4.1) $\mathcal{F}_l \cap \mathcal{F}_{l_r} \neq \{\emptyset\}$ and $\mathcal{F}_{l_r} \cap \mathcal{F}_{l'} \{\emptyset\}$, (4.2) $s_{l'}^k > s_{l_r}^k$ and (4.3) $l_r$ converges at an iteration k", for some k">k'. Then we say that link l is an indirect precedent link (or simply an indirect precedent) of link l' and we refer to link $l_r$ as the relay link between links l and l'.

The relevancy of these two definitions is justified in the next two lemmas, which state the order of bottleneck convergence and the degree to which one bottleneck can affect the performance of another one in arbitrary networks.

Lemma 1 Bottleneck convergence order. A link l is removed from the set of unresolved links $\mathcal{L}^k$ at iteration k, $\mathcal{L}^k = \mathcal{L}^k \setminus \{l\}$, if and only if all of its direct and indirect precedent links have already been removed from this set at iteration k−1.

Proof. See Appendix A.1.2.

This lemma introduces the notion of link convergence. We use this term to indicate that a link's fair share has been resolved and will no longer change as the FastWaterFilling algorithm continues iterating.

Intuitively, Lemma 1 says that for a link l to converge, all of its direct and indirect precedent links must have converged first (this is the necessary condition). Moreover, it also says that if k is the highest iteration at which any of its direct and indirect precedent links converges, then link l will converge immediately after it at iteration k+1 (this is the sufficient condition). The importance of this lemma lies in the fact that it reveals the hidden bottleneck structure of the network. Bottleneck links in a network are not all equal with respect to the performance impact they exert onto each other. On the contrary, they follow a well-defined structure uniquely characterized by the topological properties of the network. The following lemma characterizes the influence of bottlenecks onto each other:

Lemma 2 Bottleneck influence. A bottleneck l can influence the performance of another bottleneck l', i.e., $\partial s_l / \partial c_l \neq 0$, if and only if there exists a set of bottlenecks $\{l_1, l_2, \ldots, l_n\}$ such that $l_i$ is a direct precedent of $l_{i+1}$, for $1 \leq i \leq n-1$, $l_1 = l$ and $l_n = l'$.

Proof. See Appendix A.1.3.

Note that in the above lemma we capture the influence of a link l against another link l' using the derivative as $\partial s_l / \partial c_l$.

That is, if a change on the effective capacity $c_l$ of link l changes the fair share $sp$, of another link l', then we say that link l influences link l'. The lemma states that a bottleneck link l influences another bottleneck link l' if there exists a set of direct precedent links that provide a path between l and l'.

In FIGS. 2A and 2B we saw an example of bottleneck influence: as stated by the lemma, link $l_1$ can influence link $l_2$ ($\partial s_2 / \partial c_1 \neq 0$) but not vice versa ($\partial s_1 / \partial c_2 = 0$), since there is a path of direct precedents from link $l_1$ to $l_2$ (but not a reverse path). Note also that in FIGS. 3A and 3B we have $\partial s_3 / \partial c_1 = 0$, since bottlenecks $l_1$ and $l_3$ are related via an indirect precedence, while the lemma only works for direct precedences.

Next, we provide an algorithm to compute all the precedent links to help construct the bottleneck structure of arbitrary networks and a detailed example to illustrate the practical implications of Lemmas 1 and 2.

The Bottleneck Structure of Networks

To compute the bottleneck structure of a network, we need to obtain the direct and indirect precedent links of every bottleneck link. These precedent links correspond to edges in a digraph that has all the bottleneck links as its vertices, revealing the inherent mesh structure that characterizes the relationships between the bottlenecks and how they influence each other. This structure can be formally defined as follows:

Definition 3 Bottleneck precedence graph. We define the bottleneck precedence graph (BPG) as a tuple $\langle V, E \rangle$ of vertices V and edges E such that $V = \mathcal{B}$ and $E = \{\mathcal{D}_l^k, \forall l \in \mathcal{B}\} \cup \{\mathcal{I}_l^k, \forall l \in \mathcal{B}\}$. To differentiate them, we typically represent edges corresponding to direct and indirect precedents links with solid and dashed lines, respectively. We also equivalently refer to the BPG graph as the bottleneck structure of a network.

As noted in above, the FastWaterFilling algorithm already computes the set of bottleneck links $\mathcal{B}$. Thus to obtain the bottleneck structure, we can extend this algorithm with additional logic to compute the direct and indirect precedent links. We refer to this procedure as the Bottleneck Precedence Graph (BPG) Algorithm, which we introduce in Algorithm 2.

---

Algorithm 2: BPG

1    $\mathcal{L}, \mathcal{F}, \mathcal{F}_l, c_l, \mathcal{B}, r_f, \mathcal{L}^k, \mathcal{C}^k$ are as in Algorithm 2.2;
2    $\mathcal{D}_l^k :=$ Set of direct precedents of link l at iteration k;
3    $\mathcal{I}_l^k :=$ Set of indirect precedents of link l at iteration k;
4    $\mathcal{R}_l^k :=$ Set of relays of link l at iteration k;
5    $\mathcal{L}^0 = \mathcal{L}; \mathcal{C}^0 = \{\emptyset\}$;
6    $\mathcal{D}_l^0 = \mathcal{I}_l^0 = \mathcal{R}_l^0 = \{\emptyset\}, \forall l \in \mathcal{L}$;
7    k = 0;
8    while $\mathcal{C}^k \neq \mathcal{F}$ do
9      $s_l^k = (c_l - \Sigma_{\forall f \in \mathcal{C}^k \cap \mathcal{F}_l} r_f) / |\mathcal{F}_l \setminus \mathcal{C}^k|, \forall l \in \mathcal{L}^k$;
10      $u_l^k = \min\{s_{l'}^k | \mathcal{F}_{l'} \cap \mathcal{F}_l \neq \{\emptyset\}, \forall l' \in \mathcal{L}^k\}$;
11      for $l \in \mathcal{L}^k, s_l^k = u_l^k$ do
12        $r_f = s_l^k, \forall f \in \mathcal{F}_l$;
13        $\mathcal{L}^k = \mathcal{L}^k \setminus \{l\}$;
14        $\mathcal{C}^k = \mathcal{C}^k \cup \{f, \forall f \in \mathcal{F}_l\}$;
15        for $l' \in \mathcal{L}^k, \mathcal{F}_{l'} \cap \mathcal{F}_l \neq \{\emptyset\}$ do
16          $\mathcal{D}_{l'}^k = \mathcal{D}_{l'}^k \cup l$;
17        end for
18        for $l', l_r \in \mathcal{L}^k, \mathcal{F}_{l'} \cap \mathcal{F}_l \neq \{\emptyset\}, s_{l_r}^k < s_{l'}^k$ do
19          $\mathcal{R}_{l'}^k = \mathcal{R}_{l'}^k \cup \{l_r\}$;
20        end for
21        for $l' \in \mathcal{D}_{l_r}^k \setminus \mathcal{D}_{l'}^k, l_r \in \mathcal{R}_{l'}^k \setminus \mathcal{D}_{l'}^k$ do
22          $\mathcal{I}_{l'}^k = \mathcal{I}_{l'}^k \cup \{l'\}$;
23        end for Algorithm 2: BPG

```
24      end for
25      ℒ^{k+1} = ℒ^k; 𝒞^{k+1} = 𝒞^k;
26      𝒟_l^{k+1} = 𝒟_l^k; 𝒥_l^{k+1} = 𝒥_l^k; ℛ_l^{k+1} = ℛ_l^k;
27      k = k + 1;
28   end while
29   ℬ = ℒ \ ℒ^k;
30   return ⟨ℬ, {𝒟_l^k, ∀l ∈ ℬ}, {𝒥_l^k, ∀l ∈ ℬ}⟩ ;
```

For every link l, the BPG Algorithm keeps track of the sets of direct precedents $\mathcal{D}_l^k$, indirect precedents $\mathcal{J}_l^k$, and relays $\mathcal{R}_l^k$ (lines 2-4). Every time a link converges, these sets are updated as follows (lines 15-23):

Direct links (lines 15-17). When a link l converges, it becomes a direct precedent of all the links that it shares flows with and that have not converged yet.

Relay links (lines 18-20). For any two links l' and $l_r$ that have still not converged, if they share a flow and $s_{l_r}^k < s_{l'}^k$, then flow $l_r$ is a relay of flow l'. Note that this set only tracks potential relays. It is not until the actual calculation of the indirect precedents (lines 20-22) is carried out that the algorithm confirms whether an element in this set is an actual relay leading to an indirect precedence.

Indirect links (lines 21-23). When a link l converges, its indirect precedents correspond to the set of direct precedents of its relay links. Note also that its own set of direct precedents has to be subtracted to ensure correctness. (Since a link that is a direct precedent of another link, cannot be an indirect precedent of the same link.)

The BPG algorithm returns a tuple of vertices (corresponding to the bottleneck links $\mathcal{B}$) and edges (corresponding to the set of direct $\mathcal{D}_l^k$ and indirect $\mathcal{J}_l^k$ precedents for every bottleneck link l, where k is the algorithm's last iteration), which provide all the necessary information to construct the bottleneck structure of the network. The last value of the iterator k is also of relevance because it corresponds to the length of the longest path in the BPG graph, as shown in the next lemma:

Lemma 3 Depth of the bottleneck structure. The diameter of the BPG graph is equal to the last value of the iterator k in the BPG algorithm. We refer to this value as the depth or simply the number of levels of the bottleneck structure.

Proof. See Appendix A.1.4

Figure 4:
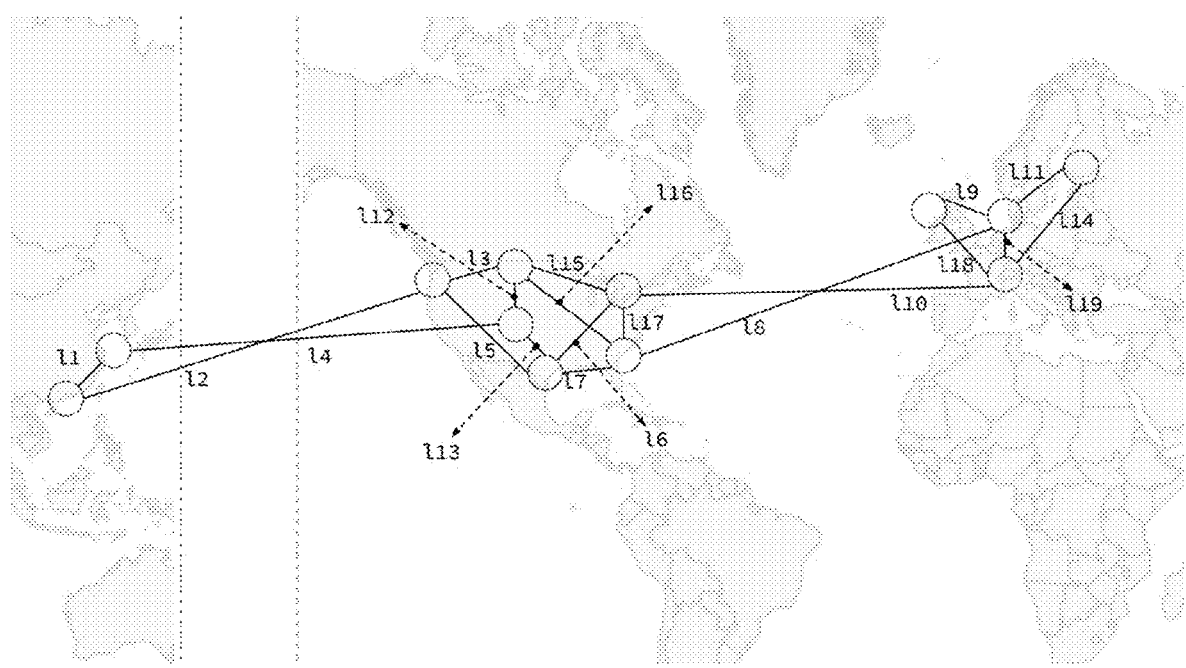
FIG. 4 depicts Google's SDN WAN B4 network.

Next, we use two examples to illustrate how the BPG graph is constructed. In both these examples, we use the network shown in FIG. 4 to illustrate the process of constructing the bottleneck structure. This topology corresponds to the SDN WAN network called B4 that connects twelve of Google's large scale data centers globally using nineteen links. While we could have chosen any arbitrary topology, we focus on Google's B4 network to base the analysis on a real network.

Example 1 Computation of the BPG graph. In this simple example we assume the presence of five flows $\{f_1, \ldots, f_5\}$ as shown in FIG. 5A. This configuration leads to the following initial state of the BPG algorithm: $\mathcal{L} = \{l_1, \ldots, l_9\}$, $\mathcal{F} = \{f_1, \ldots, f_5\}$; $\mathcal{F}_1 = \{f_1, f_2\}$, $\mathcal{F}_4 = \{f_1, f_4, f_5\}$, $\mathcal{F}_5 = \{f_3\}$, $\mathcal{F}_{12} = \{f_5\}$, $\mathcal{F}_{15} = \{f_5\}$, $\mathcal{F}_6 = \{f_3, f_4\}$, $\mathcal{F}_{10} = \{f_5\}$. We also assume that the links' effective capacities are such that $c_1 = 80$, $c_4 = 110$, $c_6 = 130$, $c_{15} = 20$ Gbps, while all the other links are assumed to have a capacity large enough such that they are not bottlenecks. Note that in general these effective capacities need not be equal to the physical capacity of the links. This is because it is possible to reserve a fraction of the physical capacity to high priority traffic (traffic whose bandwidth must be guaranteed) so that the analysis of the bottleneck structure is performed without taking into account such traffic, effectively reducing the available capacity of the links.

FIG. 5B shows the BPG graph as computed by Algorithm 2 The number of levels of this bottleneck structure is four since that's the length of its longest path $l_{15}$-$l_1$-$l_4$-$l_6$ (see Lemma 3). Link $l_{15}$ is a root vertex, which means it can influence the performance of all other links. It also means that in any distributed congestion control algorithm, flows bottlenecked at any other link cannot converge until flows bottlenecked at $l_{15}$ converge. (As noted in Lemma 1, this is true for any pair of links for which there exists a path in the BPG graph.) Link $l_6$ is a leaf vertex, which implies it does not influence the performance of any other link.

Note also that there exists an indirect precedence between links $l_{15}$ and $l_1$. As in a direct precedent case, this also means flows bottlenecked at link $l_1$ cannot converge until flows bottlenecked at link $l_{15}$ have converged. The difference here is that there exists no common flow going through both links, unlike in the case of direct precedents. Instead, execution of the BPG algorithm shows that links $l_{15}$ and $l_1$ have link $l_4$ as a relay link ($\mathcal{R}_{l_1}^k = \{l_4\}$ when the algorithm terminates) that helps transmit the bottleneck information from one to the other.

Example 2 B4's bottleneck structure for full-mesh/shortest-path. In this example, we compute the bottleneck structure of the B4 network for a more realistic case considering a larger number of flows. In particular, we assume the existence of a flow between each pair of data centers—i.e., a full mesh connectivity—with each flow taking the shortest path. As a first-order approximation, we reason that the full mesh assumption is intuitively meaningful if we consider that in general, every data center may need to communicate with each other. Also, the choice of shortest paths can serve as a raw approximation of the actual routing. While in a production system, both of these assumptions can be relaxed by using actual historical or real-time flow and routing information of the network to compute its precise bottleneck structure. This could, for instance, be inferred using NetFlow, sFlow or BGP-LS protocols among others-see also Appendix A.5 for details. The full-mesh/shortest-path model provides a simple but powerful base benchmark that can help measure the approximate bottleneck structure of a network by using only its fixed topological structure.

The BPG graph of the B4 network under the full-mesh/shortest-path assumption and with all link capacities set to 100 Gbps is presented in FIG. 6. As shown, the root vertex corresponds to link $l_8$. This vertex has a region of influence equal to the full network. (Since there exists a directed path from this vertex to any other vertex in the BPG graph.) That is, variations on the effective capacity of this link are critical as they propagate to (and affect the performance of) the rest of the links. Looking at FIG. 4, link $l_8$ is indeed a highly strategic link as it connects the US and the EU data centers, which are the two regions with the most data centers (Asia being the less dense region).

In contrast, links $l_{16}$, $l_{11}$, $l_9$, $l_{18}$, $l_{19}$, $l_{14}$, $l_{15}$, $l_3$, $l_6$, $l_7$, $l_{12}$, $l_1$, are leaves in the bottleneck structure, which means they have no impact on the performance of any other link. This analysis reveals that when looking for high-impact bottlenecks, network operators should consider links that are located at higher levels in the BPG graph. Of interest is comparing the influence of links $l_8$ and $l_{10}$, both being the transatlantic connections between the US and EU regions.

The bottleneck structure-which takes into account the structural properties of the topology, the routing and the flow information of the network-indicates that link $l_8$ has a higher influence than $l_{10}$ (from FIG. 6, link $l_8$ influences all the other links, while link $l_{10}$ influences only a fraction of links in the BPG graph).

Furthermore, the graph shows that link $l_8$ can affect the performance of link $l_{10}$ (since there is a directed path from $l_8$ to $l_{10}$), but not vice versa. Similarly, on the transpacific connections side, the BPG graph shows that link $l_2$ has a more significant influence than link $l_4$ in terms of nodes they can affect, but in this case, neither of these two links can influence the performance of each other since there is no directed path connecting them. Accordingly, the kind of structural information that the BPG graph reveals helps network operators identify and organize the relevancy of each bottleneck.

FIG. 6 also shows the value of the fair share for each link (positioned to the right of each vertex). It is easy to check that the values of the fair share are always monotonically increasing along a directed path in this BPG graph. This is actually a mathematical property of the bottleneck structure and is true for all BPG graphs:

Property 1 Monotonic fair shares along a precedence path. Let $s_{l_1}, s_{l_2}, \ldots, s_{l_n}$ be the fair share values of links $l_1, l_2, \ldots, l_n$, respectively. If $l_i$ is a direct precedent of $l_{i+1}$, then $s_{l_i} < s_{l_{i+1}}$, for all $1 \le i \le n-1$.

Proof. See Appendix A.1.1.

Minimum Convergence Time of Distributed Congestion Control Algorithms

We described above that an intuitive way to understand the bottleneck structure of a network includes modeling its bottleneck links as nodes that are trying to compute a globally optimal fair-share value by exchanging locally available information. This dualism between the two models-bottleneck structure and distributed communication-provides a robust framework to measure the minimum convergence time attainable by any distributed congestion control algorithm. We capture this concept in the following lemma:

Lemma 4 Minimum convergence time of a distributed congestion control algorithm. Let $\tau(l_i, l_j)$ be a weight assigned to each edge $(l_i, l_j)$ of the BPG graph as follows: (1) If $l_i$ is a direct precedent of $l_j$, then $\tau(l_i, l_j)$ is the time that it takes for a message to be sent from $l_i$ to $l_j$; (2) If $l_i$ is an indirect precedent of $l_j$, then $\tau(l_i, l_j) = \max\{\tau(l_i, l_r) + \tau(l_r, l_j)$ |foranyrelaylink|_rbetween|_iand|_j$\}$. Let $l_1 - l_2 - \ldots - l_n$ be a longest path terminating at link $l_n$ according to these weights. Then the minimum convergence time for link $l_n$ is $\Sigma_{1 \le i \le n-1} \tau(l_i, l_{i+1})$.

Proof. See Appendix A.1.5.

It is important to note that the above lower bound is not attainable in the case of TCP congestion control algorithms because, in such protocols, there is no direct communication mechanism between links-since they are end-to-end protocols. Instead, TCP algorithms rely on implicit feedback based on signals such as packet loss or round trip time, effectively requiring a significantly longer time to propagate from one link to another. Nevertheless, the importance of the above lemma is in the claim that convergence time increases as the depth of the bottleneck structure increases, and this general principle holds even for end-to-end protocols. In the discussion below, we test this lemma against a TCP congestion control algorithm and empirically demonstrate that convergence time does increase as the depth of the bottleneck structure increases.

The Influence of Flows onto Bottleneck Links and onto Each Other

While the theory of bottleneck ordering helps understand the relations that exist between links and the influences they exert onto each other, the BPG graph resulting from this mathematical framework does not reveal any information regarding the performance of flows. There exists, however, a simple way to transform the BPG graph into a structure that does take into account flows and helps characterize their performance. We refer to this new structure as the flow gradient graph, formally defined as follows:

Definition 4 Flow gradient graph. The flow gradient graph is a digraph such that:

For every bottleneck link and for every flow, there exists a vertex.

For every flow f: (1) If f is bottlenecked at link l then there exists a directed edge from l to f; (2) If f is not bottlenecked at link l but it passes through it, then there exists a directed edge from f to l.

The flow gradient graph can be constructed using the FastWaterFilling algorithm described above since this procedure computes the bottleneck links and for every flow in the network it discovers its bottleneck right at line 17 (Algorithm 2) when the flow is entered into the converged set. We use an example to illustrate how this graph is constructed.

Example 3 Computation of the flow gradient graph. Consider the network in FIG. 7A having 4 links and 6 flows. If we run the FastWaterFilling algorithm and construct the flow gradient graph as indicated in Definition 4, we obtain the graph structure shown in FIG. 7B.

The flow gradient graph is a useful extension of the BPG since it allows to generalize the bottleneck analysis onto flows. We can see bottlenecks and flows as two sides of the same coin; thus if the network were an economy, links and flows would correspond to the supply and the demand, respectively. This duality principle implies that all the general lemmas and properties described herein regarding the bottleneck structure of a network have a dual correspondence in the domain of flows. For instance, Lemma 2 (bottleneck influence) can be translated to the domain of flows as follows:

Lemma 5 Flow influence. A flow f can influence the performance of another flow f', i.e., $\partial_{r_f}/\partial_{r_{f'}} \ne 0$, if and only if there exists a set of bottlenecks $\{l_1, l_2, \ldots, l_n\}$ such that (1) $l_i$ is a direct precedent of $l_{i+1}$, for $1 \le i \le n-1$, (2) flow f' is bottlenecked at link $l_n$ and (3) flow f goes through $l_1$.

Proof. See Appendix A.1.6.

Using this Lemma, we can infer the following properties from the flow gradient graph in FIG. 7A: (1) Flow $f_5$ has no influence on any of the other flows, since its bottleneck links ($l_3$ and $l_4$) have no influence on any other bottlenecks; (2) flows $f_1$, $f_3$ and $f_6$ have an influence on all other flows, since their bottleneck $l_1$ is a root vertex; (3) flow $f_4$ can only influence flows $f_2$ and $f_5$; and (4) flow $f_2$ can only influence flows $f_4$ and $f_5$. We describe below an experiment where we leverage the insights revealed by the flow gradient graph to identify flows that have a high impact on the performance of a network.

Experimental Results

To experimentally evaluate the ability of the proposed theory to predict bottleneck and flow performance in real networks, we developed a sandbox using Mininet and the POX SDN controller. The sandbox takes as input information related to a network's topology, routing, and traffic flows. With that, the sandbox can create the desired network configurations, including the configurations presented in FIGS. 4 and 7A and others introduced herein. As part of the sandbox, we also implemented a new forwarding module for POX to allow static routing on emulated network architectures. This routing module allows us to compose networks with the desired number of bottleneck levels. We used iPerf to generate network traffic. The sandbox also provides the ability to select a specific TCP congestion control algorithm (e.g., BBR, Cubic, or Reno) and scale to larger network configurations on multi-core machines. Since our sandbox utilizes Mininet, the implementation of these algorithms is from real production TCP/IP code from the Linux kernel. The Linux kernel version used was 4.15.0-54. To test the various principles of the proposed theory, we developed Python scripts that process the results from the experiments run on the sandbox. In particular, for each experiment, we measured instantaneous network throughput, flow completion times, flow convergence times, and Jain's fairness indexes. Essentially, the sandbox provides a flexible way to create and analyze general network architectures. We used the sandbox to obtain the following results.

On the Bottleneck Structure of TCP Networks

In this initial experiment, we tested the hypothesis that TCP congestion-controlled networks behave as predicted by the theory of bottleneck ordering. In particular, we experimented with the three networks presented in FIGS. 8A-8C, each with a different number of BPG levels (from 2 to 4 levels), and evaluated whether three well-known congestion control algorithms-BBR, Cubic and Reno-which do not identify the direct and/or indirect precedence links as the BPG algorithm does, to determine if any of these algorithms can recognize the bottleneck structure. We chose these three algorithms as representatives of two broad classes of algorithms. Cubic and Reno are amongst the most widely used algorithms within the class of additive-increase/multiplicative-decrease (AIMD) methods. BBR is a new algorithm developed by Google and widely used in its infrastructure that belongs to a class known as congestion-based methods.

We show the corresponding BPG graphs in FIGS. 8A-8C to the right of each network. The graphs include also the fair share $s_i$ and the link capacity $c_i$ next to each vertex corresponding to bottleneck link $l_i \in \mathcal{B}$. The rest of the links are assumed to have a capacity large enough so that they are not bottlenecks. All flows are configured to transmit a data set of 250 MB using TCP, and all links have a 2-millisecond latency.

In this experiment, we also measured the degree of fairness achieved by each congestion control algorithm using Jain's fairness index normalized to the max-min rate allocation. (See Appendix A.4 for a summarized description.) Since the bottleneck structure of the network is also the solution to the theoretical max-min problem, this index effectively serves as an indicator of the degree to which the congestion control algorithm under test can assign rates according to the bottleneck structure itself.

The results for BBR and Cubic are presented in FIGS. 9A-9F, while results for Reno are presented in Appendix A.2. In FIGS. 9A-9F, flows are labeled according to their source and destination data centers. (For instance, the label h1-h7 corresponds to the flow $f_1$ in FIGS. 8A-8C that goes from data center 1 to data center 7). We make the following observations:

BBR can capture the bottleneck structure fairly cleanly, but AIMD algorithms (Cubic and Reno) fail to do so. For instance, for the 3-level network (FIGS. 9B and 9E), each BBR flow can converge to a rate corresponding to its bottleneck level (see the BPG graph in FIG. 8B), while the two lower throughput flows in the Cubic case collapse onto a single level. We believe this is a direct effect of the congestion-based approach taken by BBR, which aims at determining the actual bottleneck capacity and effectively tries to stabilize the flow's transmission rate to its bottleneck fair share. In contrast, AIMD algorithms implement loss-based heuristics and have no notion of bottleneck's fair share. Instead they act by constantly increasing and decreasing the flow rate, and as a result, flows have a higher propensity to jump between consecutive levels in the bottleneck structure, as shown in FIGS. 9A-9F.

Because BBR flows can identify their correct bottleneck levels, they don't compete against each other. AIMD flows, however, are not able to identify their bottleneck levels and end up competing against each other, leading to worse performance.

As a result, the flow completion time for BBR is significantly lower than that of AIMD algorithms (see Table 1).

BBR performance is relatively independent of the number of levels, as its slowest flow completion time stays between 230 and 235 seconds. For AIMD algorithms, however, performance degrades significantly when increasing the number of levels from 3 to 4, with an increase of the slowest flow completion time from 385 seconds to 810 (more than double), for Cubic.

BBR achieves better fairness as measured by Jain's fairness index (see Table 2). Fairness index deteriorates significantly for AIMD flows when going from 3 levels to 4 levels, while BBR flows continue to maintain a good level of fairness. This result is also because BBR can better identify the bottleneck structure of the network.

TABLE 1

Completion time of the slowest flow (seconds).

| Algorithm | 2-Level | 3-Level | 4-Level |
| --- | --- | --- | --- |
| BBR | 230 | 235 | 230 |
| Cubic | 380 | 385 | 810 |
| Reno | 375 | 370 | 750 |

TABLE 2

Jain's fairness index.

| Algorithm | 2-Level | 3-Level | 4-Level |
| --- | --- | --- | --- |
| BBR | 0.99 | 0.98 | 0.92 |
| Cubic | 0.94 | 0.96 | 0.72 |
| Reno | 0.93 | 0.96 | 0.73 |

The Effect of Latency on the Bottleneck Structure of a Network

In the discussion above, we saw that AIMD algorithms fail to identify the bottleneck structure of the test networks, and as a consequence, they perform significantly poorer than BBR. We now study this phenomenon in more detail.

The first observation we make is that differences in flow RTTs can play a role in the capabilities of a congestion control algorithm to identify the bottleneck structure. For instance, in FIG. 9D corresponding to the 2-level network with Cubic, the RTT of the flow at the highest level (flow $f_2$ corresponding to h5-h12 in the plot's legend) is 22 milliseconds while the RTT of the flow at the lowest level (flow $f_1$ corresponding to h1-h7 in the plot's legend) is 16 milliseconds. (These RTT values are the sum of the latencies of the links each flow goes through multiplied by two.)

Due to its lower RTT, the lower level flow $f_1$ can capture bandwidth from the higher-level flow $f_2$, and this leads to the collapse of the 2 levels in the Cubic case. This is in contrast with BBR (FIG. 9A), where flows show to be resilient against these RTT variations and can stay confined at their correct bottleneck levels. Similarly, in FIG. 9E the same two flows $f_1$ and $f_2$ collapse on each other for the same reason, this time though as part of the two lower bottleneck levels in a 3-level network. As mentioned above, this is in contrast with BBR that, for these tested networks, can identify the bottleneck levels despite these differences in RTT.

Figure 9C:
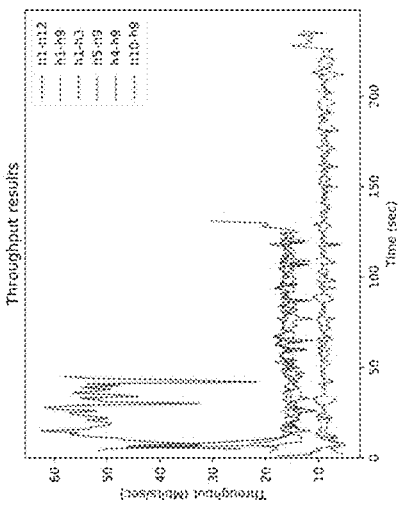
FIGS. 9A-9C show extraction of the bottleneck structures of the networks shown in FIGS. 8A-8C, respectively, using a conventional congestion control technique BBR, that does not construct bottleneck precedence graphs.
Figure 9F:
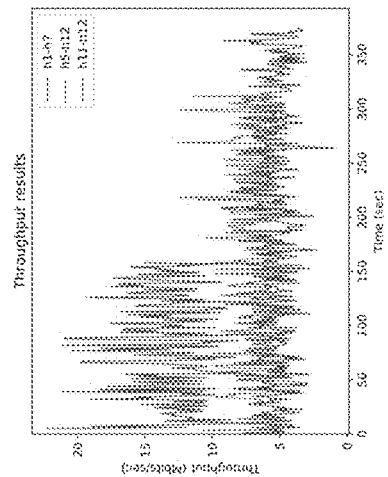
FIGS. 9D-9F show extraction of the bottleneck structures of the networks shown in FIGS. 8A-8C, respectively, using another conventional congestion control technique Cubic, that also does not construct bottleneck precedence graphs.
Figure 9B:
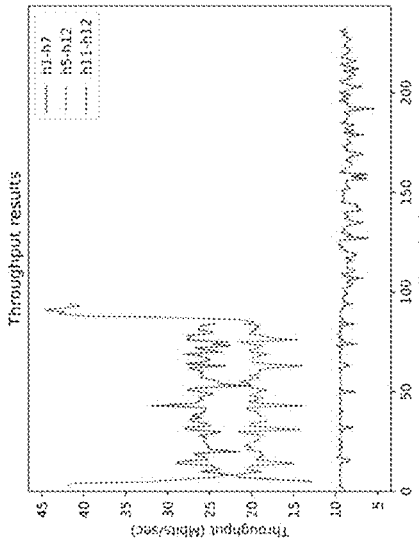
Figure 9E:
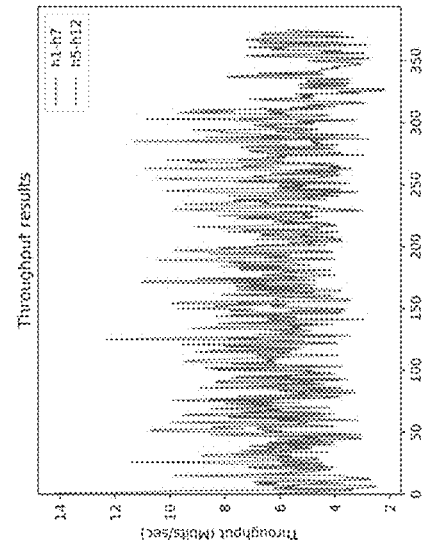
Figure 9A:
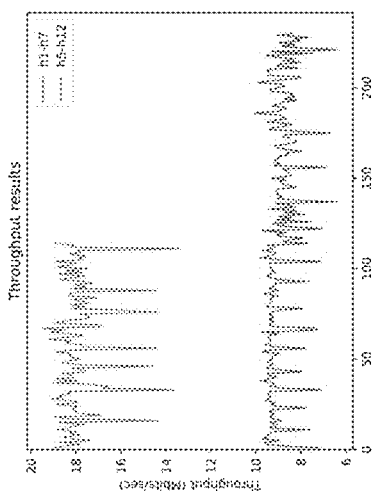
Figure 9D:
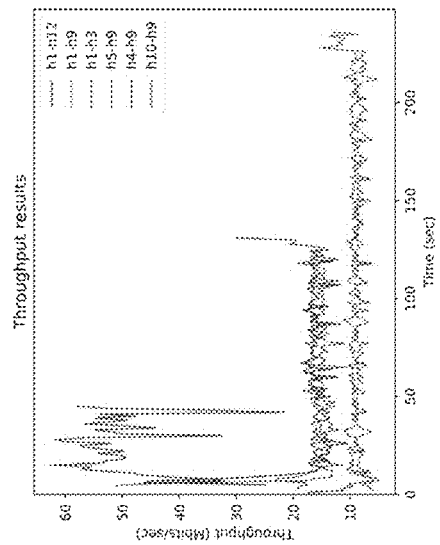
Figure 10:
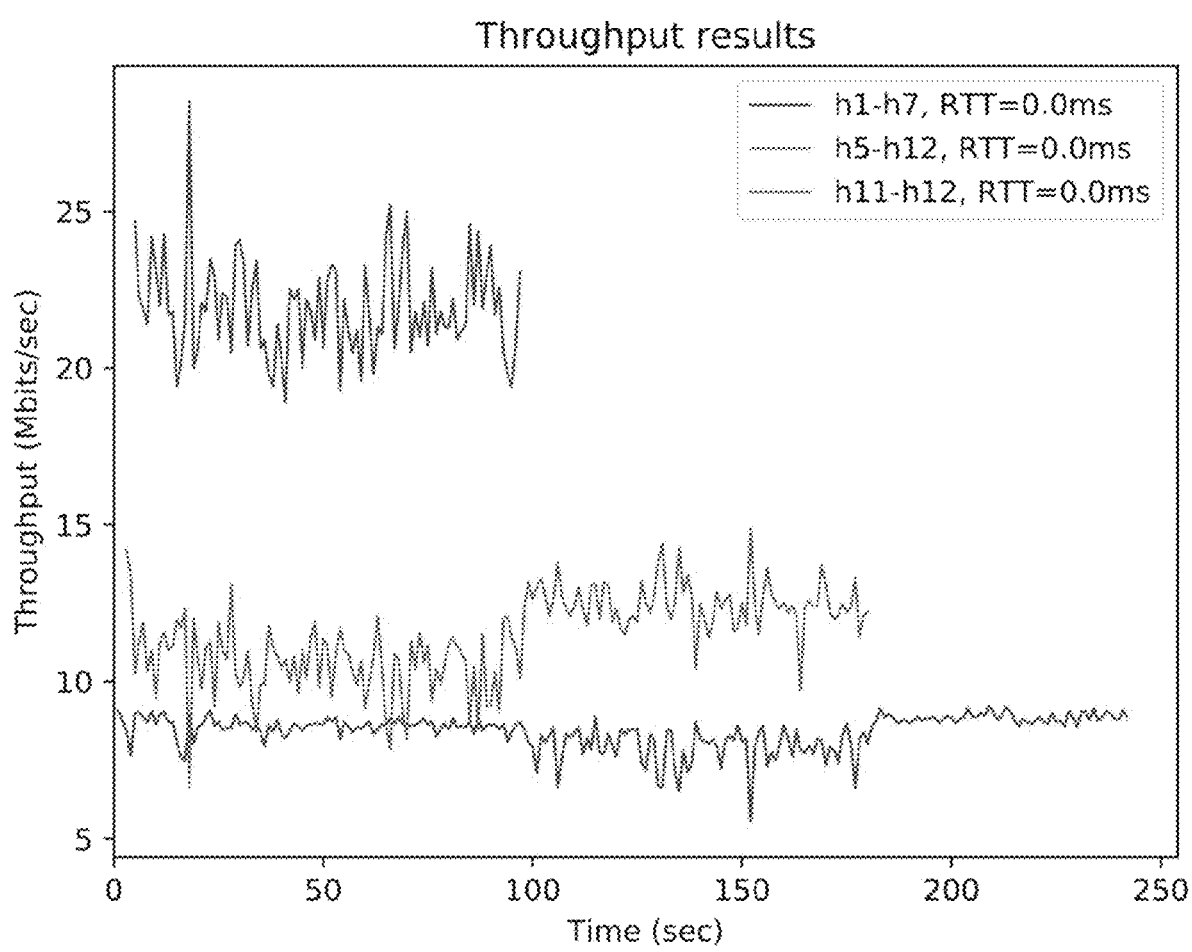
FIG. 10 show extraction of the bottleneck structures of a modified version of the network shown in FIG. 8C using Cubic, where a bottleneck precedence graph is not constructed.

To demonstrate the effect of RTT, we tested the 3-level network (FIGS. 8A-8C) using Cubic and setting all link latencies to zero. While queuing delay at the switches is still non-zero, this has the effect of setting all flows to a much more similar latency, thus reducing the distortions introduced by highly different RTTs. The results are presented in FIG. 10, which show that Cubic flows are now able to identify the bottleneck structure of the network. This result is in contrast with FIG. 9E, where Cubic flows were not able to identify their bottleneck rates. A relevant outcome is that due to the bottleneck distortion introduced by RTT, the performance of flows deteriorates from a flow completion time of 245 seconds in FIG. 10 to 385 seconds in FIG. 9E. Note also that BBR flows were able to perform well even under the presence of link latencies (as shown in FIGS. 9A, 9B and 9C, BBR achieves a flow completion time of 235 seconds with non-zero link latencies, even lower than Cubic with zero link latencies). Thus this seems to indicate that BBR is a significantly more robust congestion control algorithm against the distorting effects of RTT.

The above results show that BBR does significantly better at identifying each flow's true bottleneck, but can we still fool this congestion control algorithm to collapse its bottleneck structure? In the next experiment, we take this objective by using the 3-level network, initially setting all link latencies to zero, and progressively increasing the RTT of the flows on the upper bottleneck levels to verify if the structure collapses. To control the RTT of each flow individually, we add a fictitious link attached to the source of each flow with a large capacity (so it does not become a bottleneck) and a latency that we adjust to achieve a specific end-to-end RTT value for each flow. In FIGS. 11A-11F, we present the sequence of steps that lead to the collapse of the bottleneck structure. First, flow $f_3$ (from data centers 9 to 12) is folded onto flow $f_2$ by increasing its RTT to 4 milliseconds. Then, flows $f_3$ and $f_2$ are folded onto flow $f_1$ by increasing their RTTs to 10 and 6 milliseconds, respectively. Thus in this experiment, we conclude that while BBR is a more robust algorithm to the effects of RTT, its bottleneck structure can still collapse if RTTs are chosen carefully.

On how Low-Hitter Flows can be High-Impact Flows

Next, we illustrate an example of how the theory of bottleneck ordering can be used to support traffic engineering operations. We start with an initial network configuration, and our objective is to identify the flows that have the largest impact on the performance of the rest of the flows. Based on the information from this analysis, a network operator can choose to re-route high-impact traffic or assign it to a lower priority queue to help improve the overall performance of the network.

To drive this experiment, we consider the network introduced in FIG. 7A and previously used in Example 3. Running the FastWaterFilling algorithm we obtain the following theoretical flow rate allocations: $r_1$=8.3, $r_2$=16.6, $r_3$=8.3, $r_4$=16.6, $r_5$=75, and $r_6$=8.3 Mbps. Following a traditional traffic optimization approach, we could reach the conclusion that flow $f_5$ at a rate of 75 Mbps is a high-impact flow since it takes the highest bandwidth. (This flow uses more than four times the bandwidth of the second highest throughput flow.) This approach however does not take into account the bottleneck structure of the network and, as we will see, leads to a non-optimal choice.

Figure 12A:
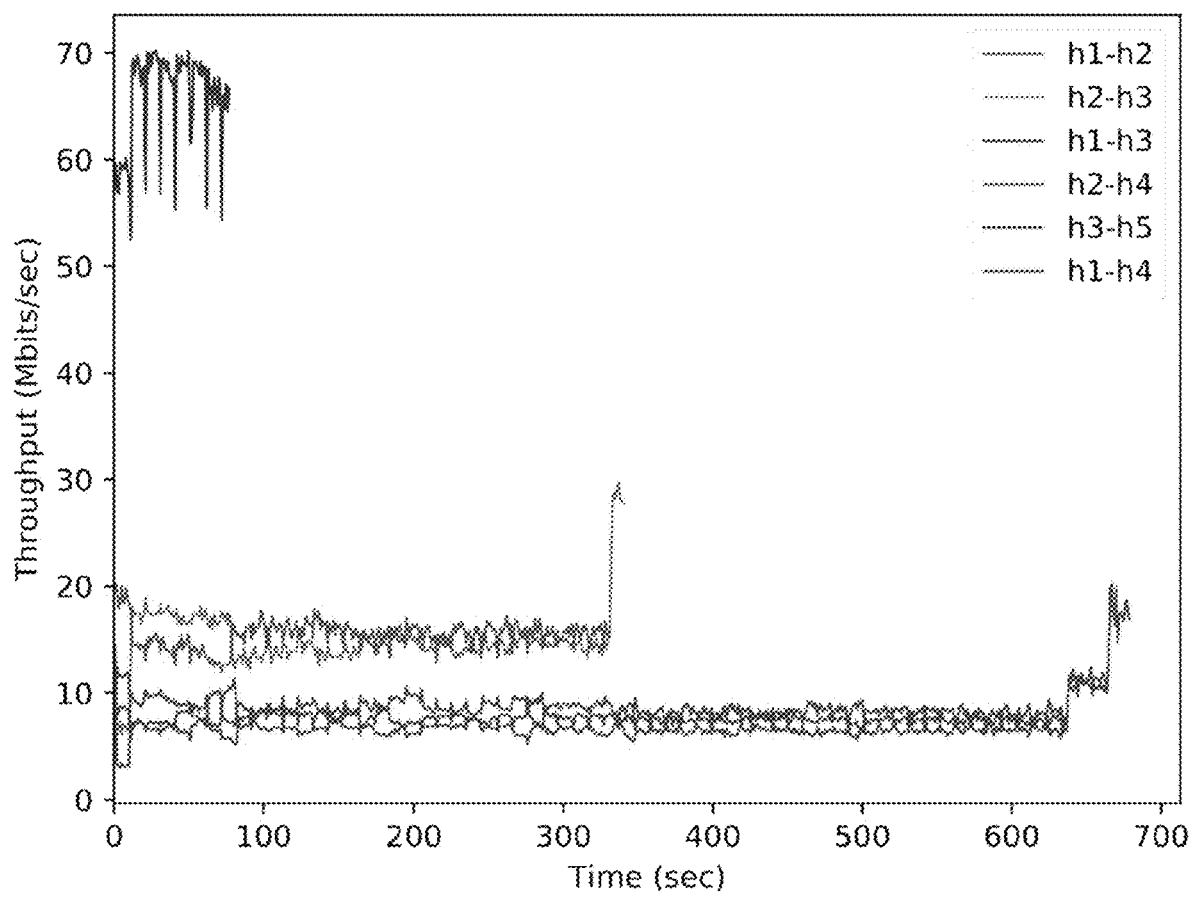
FIG. 12A shows the effect of running BBR on the network shown in FIG. 7A, where no flows are removed.
Figure 12B:
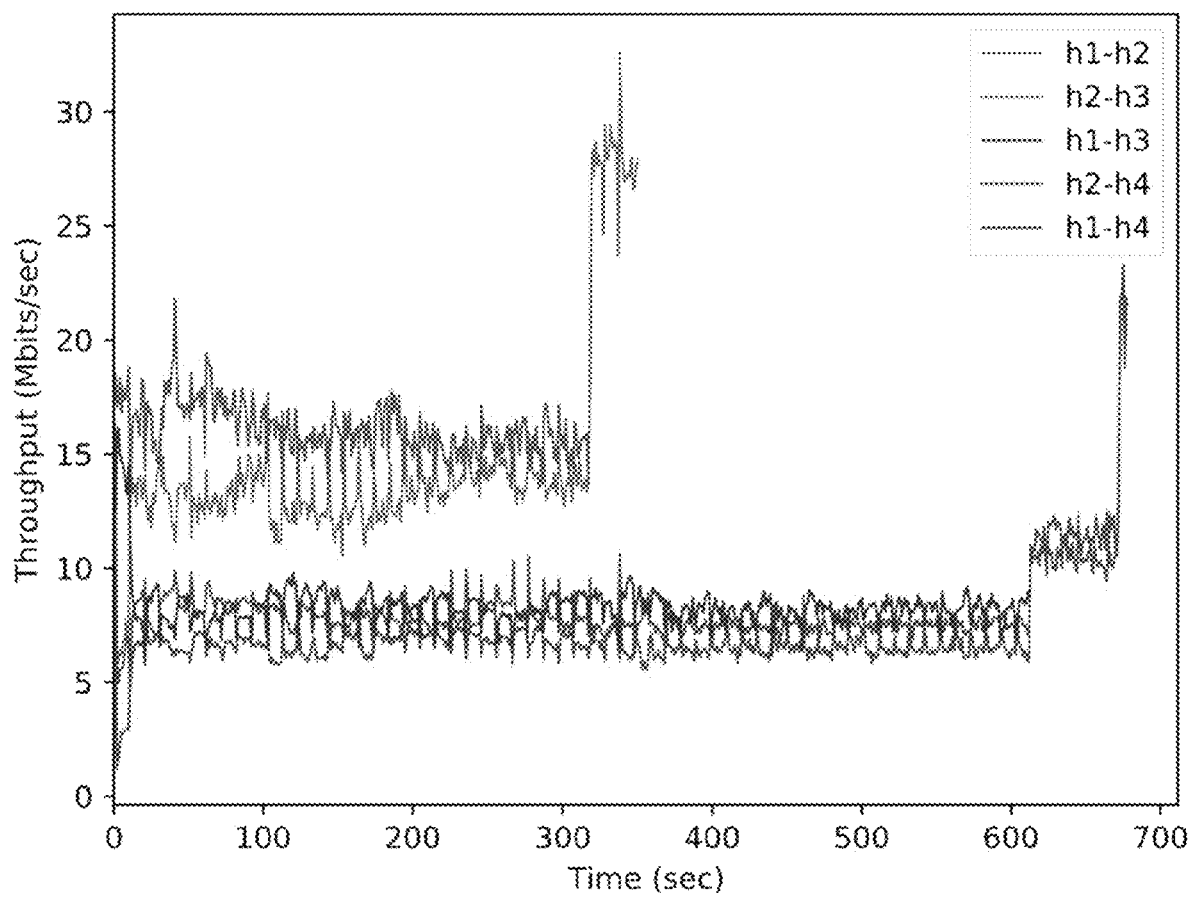
FIG. 12B shows the effect of running BBR on the network shown in FIG. 7A, where a heavy-hitter flow is removed.

In FIG. 12a we show the results of running BBR on the network in FIG. 7A. The resulting average flow throughputs are (see Table 3): $r_1$=7.7, $r_2$=15.1, $r_3$=7.5, $r_4$=15.4, $r_5$=65.8, and $r_6$=8.1 Mbps, which are relatively similar to the flow rates computed by the FastWaterFilling Algorithm as provided in the previous paragraph. In FIG. 12B, we see the result of removing the heavy hitter flow $f_5$ from the network, showing that the impact on the rest of the flows is effectively none. (See also Table 3 for the exact values of the flows' average throughputs and completion times.) If instead we remove flow $f_6$ (a flow about 8 times smaller than $f_5$ in terms of its average throughput), we see that the rest of the flows improve their performance significantly (FIG. 12C). For instance, as shown in Table 3, the flow completion time of the slowest flow is reduced from 679 to 457 seconds.

This result might seem counter-intuitive if we consider the fact that flow $f_6$ is among the smallest throughput flows, but it is easy to explain if we take into account the bottleneck structure of the network. In particular, from the flow gradient graph in FIG. 7B, we observe that flow $f_5$ is bottlenecked at links $l_3$ and $l_4$, which are leaf vertices in the bottleneck structure and thus have no impact on the performance of any other links and flows. However, flow $f_6$ is bottlenecked at link $l_1$ which sits right in the middle of the bottleneck structure, thus having a significantly higher impact.

This result indicates that traditional approaches, which focus on finding the heavy hitter flows, might tend to sub-optimal choices because they do not take into account the full bottleneck structure of the network. We reason that network operators interested in finding the high impact flows should also consider the BPG and the flow gradient graph structures to aid their optimization process.

TABLE 3

As predicted by the theory of bottleneck ordering, flow $f_6$ is a significantly higher impact flow than flow $f_5$

| Comp. time (secs) | $f_1$ | $f_2$ | $f_3$ | $f_4$ | $f_5$ | $f_6$ | Slowest |
|---|---|---|---|---|---|---|---|
| With all flows | 664 | 340 | 679 | 331 | 77 | 636 | 679 |
| Without flow $f_5$ | 678 | 350 | 671 | 317 | — | 611 | 678 |
| Without flow $f_6$ | 416 | 295 | 457 | 288 | 75 | — | 457 |
| Avg rate (Mbps) | $f_1$ | $f_2$ | $f_3$ | $f_4$ | $f_5$ | $f_6$ | Total |
| With all flows | 7.7 | 15.1 | 7.5 | 15.4 | 65.8 | 8.1 | 119.6 |
| Without flow $f_5$ | 7.5 | 14.5 | 7.6 | 16.1 | — | 8.3 | 54 |
| Without flow $f_6$ | 12.2 | 17.2 | 11.1 | 17.7 | 68.1 | — | 126.3 |

Finally, we also note that we performed the same experiments using TCP Cubic and Reno and obtained the same behavior in both algorithms. (For the sake of brevity, we include those results in Appendix A.3.) Overall, the results show that the same traffic engineering analysis based on the bottleneck structure of the network applies not only to BBR but to TCP congestion-controlled networks in general.

Convergence Time with Increased Number of Bottleneck Levels and Flow Competition In the discussion above, we saw that the depth of the bottleneck structure of a network is closely related to the convergence time of a distributed congestion control algorithm. We set to experimentally verify this property by using the network configuration in FIG. 13A. Its BPG graph is shown in FIG. 13B, which corresponds to a linear (single path) graph, with a fair share for each link $l_i$ of $s_i$=10i, 1≤i≤n. This configuration has one BPG level per-link, and thus it corresponds to a network with maximal depth for a given number of links.

To complement the convergence time analysis, we also tested the impact of increasing the number of flows at each level. With this objective, we implemented a flow multiplier factor as part of our sandbox. Multiplying the number of flows by a factor m means that each flow in a given network is replicated (preserving its source, destination, and route) m times. This approach can effectively increase by m the number of flows competing at the same level, without modifying the bottleneck structure of the network.

Table 4 presents the results of running the described experiment varying the number of levels n and the flow multiplier factor m from 1 to 4, for a total of 16 experiments, using the BBR algorithm. The results show the behavior predicted by the theoretical framework: Convergence time increases (1) as the number of bottleneck levels increases, and (2) as the number of flows at the same level increases.

TABLE 4

Converge time increases with the number of levels and the number of level-competing flows.

|  | 1-Level | 2-Level | 3-Level | 4-Level |
| --- | --- | --- | --- | --- |
| num. flows × 1 | 2 | 2 | 2 | 2 |
| num. flows × 2 | 2 | 2 | 12 | 26 |
| num. flows × 3 | 4 | 16 | 14 | 54 |
| num. flows × 4 | 14 | 26 | 34 | 72 |

While network operators cannot influence the number of flows, they have some ability to alter the number of levels in the BPG graph. For instance, one strategy would include configuring routes (or even design network topologies) that tend to generate bottleneck structures of smaller depth. This strategy would help flows converge faster and lead to networks operating at higher utilization. The study and design of routes and topologies that yield shallow bottleneck structures, while very interesting, is left for future work.

To the best of our knowledge, the proposed theoretical framework is the first to address the problem of characterizing the bottleneck structure of a network and the influences and relationships existing between bottlenecks from both formal and practical standpoints. According to a known technique that refers to the bottleneck relationships as dependency chains and observes that performance perturbation of bottleneck links may affect other bottleneck links, does not address the problem of formally identifying the hidden structure that controls such perturbations.

Various other bottleneck characterization techniques appear to assume implicitly that the bottlenecks in a network have a flat structure. Traditional traffic optimization approaches generally only focus on heavy-hitter flows using a single-link model. In contrast, the techniques described herein reveal the bottleneck structure of a network, which allows optimizing traffic engineering by taking into account the network's topological, routing, and flow properties.

In the techniques described herein, we base the bottleneck analysis on max-min rate assignment. An initial algorithm to compute the max-min rate allocation of a network has been improved and is known. Our algorithm to construct the bottleneck structure is based on a further extension of that improved algorithm.

Congestion control algorithms have been one of the most widely researched subjects in the field of computer communications since the Internet collapsed in 1986 due to the lack of them. Starting from the first TCP congestion control algorithm implemented in 1987, key research has focused on characterizing the bottleneck to help maximize the performance of flows individually while achieving fairness collectively. Such single-bottleneck oriented approach, however, has left a gap in attempting to understand the global structure of the problem.

In this first part, we addressed this gap by introducing a theory of bottleneck ordering. The theoretical framework leads to the BPG algorithm, a procedure that reveals the bottleneck structure of a network in the form of a graph—the BPG graph. This graph provides vital insights to the understanding of the collective bottleneck behavior in a distributed network, among others: (1) The implicit relationships that exist between bottlenecks; (2) the bounded regions in the network that links and flows can influence; and (3) the convergence properties of the congestion control algorithm run by the network.

Our experimental results show that: (1) Real networks do have a bottleneck structure that may follow the BPG graph closely; (2) RTT variations can lead to imperfections (levels that fold) in the bottleneck structure, which can severely affect performance; (3) congestion-based algorithms such as BBR are able to infer the bottleneck structure significantly better than loss-based/AIMD algorithms such as Cubic and Reno, which leads them to achieve superior performance in both throughput and fairness. The theory also reveals intriguing results that low-hitter flows can have a higher impact on a network than heavy-hitter flows, or the notion that routing and topology can play a role in the design of shallower bottleneck structures that would improve the convergence time of congestion control algorithms.

Part 2: A Theory of Flow Ordering for Networks

How large is a network flow? Existing work in the literature has addressed this question by considering metrics such as the number of bytes, transmission rate, duration, jitter or burstiness, to name a few. But is one metric better than another one and, more importantly, what is the true meaning of the elusive concept of flow size? In the techniques described herein we show that a formal mathematical definition of flow size depends on the topological structure of the network and a utility function that describes its QoS properties. This leads to a theory of flow ordering, a mathematical framework that explains the connection between the abstract concept of flow size and the QoS properties of networks, including data network, energy-distribution networks, cellular networks, and networks for transport of physical goods. To put the theory to the test, we apply it to derive computationally tractable algorithms to resolve the problem of topologically ordering TCP flows according to their QoS impact.

INTRODUCTION

The objective of this part of the discussion is to develop the following concept: the size of a flow should not only be measured in terms of arbitrary scalar metrics such as rate, byte counts or duration as it has been done in the past, but also through a formal framework that takes into account the mathematical properties—in terms of its topology and its QoS utility function—of a data network. The contributions of this technique are as follows:

We demonstrate that the flow ordering of a data network can be derived as the solution to a problem we refer as the 1-partitioned QoS problem. This approach is general in that it takes into account the topological and the QoS properties of the network.

The particular case of the 2-partitioned QoS problem (l=2) leads to a general definition of the concepts of elephant and mouse flows.

We demonstrate that all existing metric-based definitions of elephant flow implicitly assume a single-bottleneck link network topology. The present theory allows to identify the flow ordering in arbitrary network topologies.

The general problem of identifying the flow ordering is NP complete. Fortunately, we show that if the QoS function satisfies the property of nested convexity (as defined herein), then the greedy algorithm (introduced below) is optimal and can find the flow ordering in polynomial time. This opens a study area around the problem of designing and analyzing QoS functions that are nested convex.

Based on the concepts of max-min and max-flow optimization, we present an initial candidate of a QoS function, and analyze its nested convexity properties under a variety of scenarios that are suitable to TCP networks.

To illustrate the applicability of the proposed framework, we use it to study the problem of flow ordering in Google's B4 network.

In the following, we present the main body of this work. We first introduce the concept of partitioned QoS, the general definition of elephant flow, the topological properties of inclusiveness and nested convexity and an optimal greedy algorithm.

Thereafter, we provide empirical measurements to help validate the theory and illustrate its applicability, and provide conclusions.

Network Model and QoS Functions

We start by introducing a definition of the network model that will be used throughout the discussion below. As used herein, a network can be a data network, an energy (e.g., electricity) distribution network, a cellular network, a network for transporting goods, etc.

Definition 5 Network. We define a network N as a tuple $\langle T,F \rangle$ such that:

T= $\langle S,L \rangle$ is a graph having a set of vertices S and a set of edges L.

F={$f_1, f_2, \ldots, f_{|F|}$} is a set of flows, where each flow $f_i$ is an ordered list of vertices $v_{i,1} \to v_{i,2} \to (\ldots) \to v_{i,|f_i|}$ such that $v_{i,j} \in S$ and $(v_{i,j}, v_{i,j+1}) \in L$, for all $1 \le i \le |F|$ and $1 \le j < |f_i|$.

In the language of data networks, the vertices in S correspond to switches (or routers) whereas the edges in L correspond to links connecting the switches in the network. Together they uniquely characterize the topology of the network T. In addition, a flow $f_i \in F$ corresponds to a specific communication connection (e.g., depending on the network architecture and model, this could correspond to a TCP/UDP connection, an MPLS path, an IP tunnel, etc.) between a source vertex and a destination vertex.

Next we introduce the concept of partitioned QoS function, the starting point from where our theoretical framework is constructed:

Definition 6 Partitioned QoS function. Let N= $\langle T,F \rangle$ be a network and assume that each flow $f_i \in F$ is assigned resources from N according to one of l possible policies ($P_1, P_2, \ldots, P_l$). For instance, while not limited to, an example of policies can be those conforming to the rule "flows assigned to policy $P_i$ are forwarded at a higher priority than flows assigned to policy $P_{i+1}$". Let the tuple $\langle F_1, F_2, \ldots, F_l \rangle$ be an l-part partition on the set of flows F such that the flows in $F_i$ are assigned to policy $P_i$, for $1 \le i \le l$. We will say that q($F_1, F_2, \ldots, F_l$) is an l-partitioned QoS function of network N if q($F_1, F_2, \ldots, F_l$)>q($F_{1'}, F_{2'}, \ldots, F_{l'}$) implies that the quality of service (QoS) achieved with configuration $\langle F_1, F_2, \ldots, F_l \rangle$ is greater than with configuration $\langle F_{1'}, F_{2'}, \ldots, F_{l'} \rangle$. When there is no need to make the number of partitions explicit, we will also say that q( ) is a partitioned QoS function or simply a QoS function.

A partitioned QoS function is therefore a utility function on the space of all the possible l-part partitions of F. Throughout this essay, the following encoding will provide a convenient way to express some of the mathematical and algorithmic results:

Definition 7 Flow encoding. A network configuration expressed as an l-part partition of a set of flows F, $\langle F_1, F_2, \ldots, F_l \rangle$, can be conveniently encoded as an |F|-dimensional vector p where each element $p_i$ is such that:

$$p_i = k \text{ iff } f_i \in F_k \quad (1)$$

Hence, any l-part partition has one corresponding vector in the space $[l]^{|F|}$, where $[l] = \{k \in \mathbb{N} \mid k \le l\}$. Using this encoding, a partitioned QoS function can be expressed as a utility function mapping the set of vectors in $[l]^{|F|}$ onto the set of real numbers $\mathbb{R}$:

$$q:[l]^{|F|} \Rightarrow \mathbb{R} \quad (2)$$

A partitioned QoS function can also be expressed in terms of finding ways to store |F| objects into l boxes according to a utility function q( ). In this case, the search space is given by the sum of all multinomial coefficients, which corresponds also to the size of the space $[l]^{|F|}$:

$$\Sigma_{k_1+\ldots+k_l=|F|} \binom{|F|}{k_1, \ldots, k_l} = l^{|F|} \quad (3)$$

The problem of finding an optimal network configuration $\langle F_1, F_2, \ldots, F_l \rangle$ can now be reduced to the problem of identifying the element in $[l]^{|F|}$ that maximizes q( ):

Definition 8 Partitioned QoS problem. We will say that an l-part partition $\langle F_1^*, F_2^*, \ldots, F_l^* \rangle$ of F is a QoS optimal partition if q($F_1^*, F_2^*, \ldots, F_l^*$)≥q($F_1, F_2, \ldots, F_l$) for any other l-part partition $\langle F_1, F_2, \ldots, F_l \rangle$ of F. We will refer to the problem of finding such optimal partition as the partitioned QoS problem or the l-partitioned QoS problem if there is a need to make the number of partitions explicit.

General Definition of Elephant and Mouse Flow

The previous formulation leads to a formal interpretation and definition of the concepts of elephant and mouse flows:

Definition 9 General definition of elephant and mouse flows. Let N= $\langle T,F \rangle$ be a network and assume that each of its flows is assigned resources from the network according to two possible policies, $P_1$ and $P_2$. Let also q( ) be a 2-partitioned QoS function. Then we will say that $F_e \subseteq F$ is the set of elephant flows if and only if $\langle F_e, F \backslash F_e \rangle$ is a QoS optimal partition. Consequently, we will say that $F \backslash F_e$ is the set of mouse flows.

The above definition shows that the problem of identifying the set of elephant flows in a network corresponds to an l-partitioned QoS problem with l=2. It also allows us to establish a direct relationship between the meaning of elephant flow and its effects on the QoS of a network: the set of elephant flows is one that when exclusively assigned to policy $P_1$, the resulting QoS of the network is maximal. The same can be said of mouse flows: the set of mouse flows is one that when exclusively assigned to policy $P_2$, the resulting QoS is also maximal. Notice that without loss of generality, we will take the convention $\langle F_1,F_2 \rangle = \langle F_e, \backslash F_e \rangle$, so that the set of elephant and mouse flows are assigned policies $P_1$ and $P_2$, respectively.

Following the notation in equation (1), any 2-partitioned QoS function q( ) can be encoded using a mapping between the set of |F|-dimensional binary vectors and the set of real numbers:

$$q:b^{|F|} \Rightarrow \mathbb{R} \tag{4}$$

where b=[2]=0.1.

Since the above is a general definition of elephant and mouse flows, then any of the definitions proposed in the existing literature should correspond to a particular solution of a specific 2-partitioned QoS problem. The next lemma reveals the structural connection of the existing solutions—characterized by the problem's implicit network topology and QoS function—and the general definition of elephant and mouse flows:

Lemma 6 Metric-based partitioned QoS. Let m(f) be any function mapping the set of flows F with the set of non-negative real numbers, $m:F \rightarrow \mathbb{R}^+$. We will call m(f) a flow-metric function or simply the metric function when the context is understood. Examples of metric functions include the number of bytes or the transmission rate of a flow. Assume the following 2-partitioned QoS function:

$$q_m(F_1, F_2) = \begin{cases} K_1 = \sum_{f \in F_2} \pi(f), & \text{if } \sum_{f \in F_2} r(f) > C \\ K_2 + \sum_{f \in F_2} \rho(f), & \text{otherwise} \end{cases} \tag{5}$$

where r(f) is the rate of flow f, C is a network capacity parameter, $K_1$ and $K_2$ are two arbitrary positive numbers chosen so that $K_2 > K_1$, and $\pi(f)$ and $\rho(f)$ are two penalty and reward functions satisfying the following conditions:

$$\pi(f_i) > \pi(f_j) \Leftrightarrow m(f_i) > m(f_j) \;\; \rho(f_i) > \rho(f_j) \Leftrightarrow m(f_i) < m(f_j), \text{ for all } f_i, f_j \in F \tag{6}$$

Then the set of elephant flows corresponds to $F_1 = F_e = \{f_1, f_2, \ldots, f_{\lambda^*}\}$ such that $m(f_i) > m(f_{i+1})$, $\Sigma_{\forall i > \lambda^*} r(f_i) \le C$, and $F_e$ has minimal cardinality.

Figure 14:
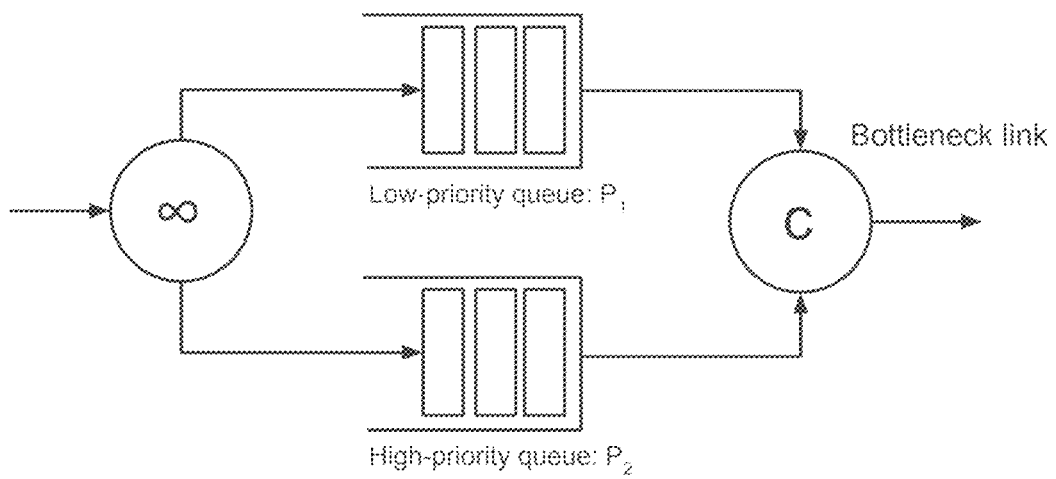
FIG. 14 shows an example network implementing two flow-processing policies.

Proof. Equation (5) can be modeled using the network described in FIG. 14 as follows. If the rate of the traffic going through the high-priority queue (policy $P_2$) exceeds the total capacity C of the bottleneck link, the QoS of the network deteriorates according to the penalty function $\pi( )$. Since from equation (6) flows with the highest metric m( ) inflict the largest penalty, we can improve the QoS of the network by routing these high-metric flows to the low-priority queue. On the other hand, if the rate of the traffic going through the high-priority queue (policy $P_2$) is below the total capacity of the link C, the total QoS of the network improves according to the reward function $\rho( )$. In this case, the QoS of the network can be improved by migrating the flows with the lowest metric m( ) from the low-priority queue to the high-priority queue.

The optimal 2-partitioned QoS is therefore one that redirects the minimum number of the largest flows—according to the metric function m( )—to the low-priority queue without exceeding the capacity C of the bottleneck link. This partitioned QoS problem can be trivially solved using the following greedy algorithm. Let $\{f_1, f_2, \ldots, f_{|F|}\}$ be the list of flows ordered according to the rule $m(f_i) \ge m(f_{i+1})$. Then the set of elephant flows corresponds to $F_1 = F_e = \{f_1, f_2, \ldots, f_{\lambda^*}\}$ such that $\Sigma_{\forall i > \lambda^*} r(f_i) \le C$ and $F_e$ has minimal cardinality, i.e., $\lambda^*$ is minimal.

The 2-partitioned QoS function in equation (5) demonstrates that for any elephant flow detection algorithm in the literature which uses a metric function m(f) to classify elephant flows, there exists at least one partitioned QoS function—e.g., that in equation (5)—whose solution leads to the ordering given by the metric. For instance, elephant flow definitions such as those based on the metrics of flow rate, byte count or burstiness are all equivalent to solving the partitioned QoS problem in FIG. 14. This indicates that current solutions only address a specific type of QoS problems: those characterized by the partitioned QoS function defined in equation (5) and the network topology in FIG. 14. Real-world network operators however need to architect and manage their networks according to arbitrary QoS requirements that depend on a large variety of factors—e.g., network topology, path latency, customer demand, network offering, etc.—which means that in practice their optimal solution will differ from the solutions offered by a metric-based QoS function. We describe the development of a mathematical framework to address the general problem of flow ordering for arbitrary topologies.

General Definitions of Flow Ordering and Flow Size

We now center around the problem of deriving a formal definition of flow ordering and flow size for data networks. While we will discuss this subject for the case l=2, the following results can be demonstrated to be generally applicable to the general case of arbitrary number of policies l≥2.

Definition 10 λ-optimal QoS partition. Let $\langle \langle N, P_1, P_2, q( ) \rangle \rangle$ be a 2-partitioned QoS problem. We will say that $F_\lambda \subset F$ defines a λ-optimal QoS partition on the set of flows F if $q(F_\lambda, F \backslash F_\lambda) \ge q(F', F \backslash F')$ for all F' such that $F' \subset F$ and $|F_\lambda| = |F'| = \lambda$. When the meaning is clear, we will simply use the term λ-optimal partition.

Notice that using Definitions 6 and 10, we have that the set of elephant flows $F_e$ is an $|F_e|$-optimal QoS partition. The intuition behind the concept of a λ-optimal QoS partition is as follows. Assume first that λ=1. The 1-optimal QoS partition corresponds to a single-flow partition $F_1 = \{f_1\}$ such that the exclusive mapping of flow $f_1$ onto policy $P_1$ leads to the best QoS configuration among all other possible single-flow partition configurations. It follows that flow $f_1$ has the biggest QoS impact—as its mapping onto policy $P_1$ is QoS maximal—and we can conclude that among all flows, $f_1$ is the largest one from a QoS impact standpoint. This reveals a recursive strategy to identify the ordering of flows according to an abstract concept of size as follows:

Start by finding $F_1 = \{f_1\} \subset F$ such that $F_1$ is a 1-optimal partition. Mark $f_1$ as the largest flow.

Next, find $F_2 = \{f_1, f_2\} \subset F$ such that $F_2$ is a 2-optimal partition. Mark $f_2$ as the second largest flow.

Continue recursively for all possible λ-optimal partitions until all the flows are marked.

Notice that in order for the above construction process to succeed, the condition $F_\lambda \subset F_{\lambda+1}$ must be satisfied at each iteration. This leads to the first property that a 2-partitioned QoS function needs to satisfy to ensure the flows can be ordered according to their size:

Property 2 Inclusive QoS functions. We will say that a 2-partitioned QoS function is inclusive if its λ-optimal partition $F_\lambda$ includes the (λ−1)-optimal partition $F_{\lambda-1}$, for $2 \leq \lambda \leq |F|$. Equivalently, assuming the vector $p_i^{\lambda»}$ is the configuration encoding of $(F_\lambda, F\backslash F_\lambda)$ (see definition 7), a 2-partitioned QoS function is inclusive if $p_{\lambda-1} = p_{\lambda-1} \wedge p_\lambda$, where $\wedge$ is the bitwise logical conjunction.

We are now in a position to formally introduce the concept of flow size ordering:

Definition 11 Flow ordering. Let $\langle N, P_1, P_2, q(\ ) \rangle$ be a 2-partitioned QoS problem and assume that q( ) is inclusive. Then we will say that $f_1$ is the largest elephant flow in the set F if and only if:

$$q(f_1, F\backslash\{f_1\}) \geq q(f', F\backslash\{f'\}), \text{ for all } f' \in F. \quad (7)$$

Similarly, we will say that a flow $f_2$ is the second largest flow in the set F if and only if:

$$q(\{f_1, f_2\}, F\backslash\{f_1, f_2\}) \geq q((f_1, f'), F\backslash\{f_1, f'\}), \quad (8)$$

for all $f' \in F$ and $f' \neq f_1$. More in general, we will say that a flow $f_i \in F$ is the i-th largest flow in the set F if and only if:

$$q(F_i, F\backslash F_i) \geq q(F', F\backslash F') \quad (9)$$

where $F_i = F_{i-1} \cup \{f_i\}, f_i \notin F_{i-1}$ $F' = F_{i-1} \cup \{f'\}, \text{ for all } f' \notin F_{i-1} \quad (10)$ for $1 \leq i \leq |F|$ and $F_0 = \{\emptyset\}$.

We will also say that the ordered list $\{f_1, f_2, \ldots, f_{|F|}\}$ defines the flow size ordering of the 2-partitioned QoS problem $\langle N, P_1, P_2, q(\ ) \rangle$.

Definition 11 introduces both the mathematical definition of flow ordering and a greedy algorithm to order the flows according to such ordering. It is easy to see that if the QoS function is inclusive, then the greedy algorithm is optimal, i.e., it yields the correct flow ordering and the correct set of $\lambda$-optimal partitions. Further, for the particular case of l=2, the top flows in this ordering correspond to the set of elephant flows. We will elaborate a bit more on this point below.

While knowing the flow ordering is often enough to characterize and optimize network problems, sometimes it can be useful to have an exact measurement or metric for the size of a flow. For instance, as we have seen, all metric based solutions found in the literature rely on such metric to provide the definition of elephant flow and to construct heavy hitter detection algorithms. Next, we construct a formal metric that captures the mathematical meaning of flow size according to the QoS properties of the network.

Property 3 Decreasing returns to gains. Let $\{f_1, f_2, \ldots, f_{|F|}\}$ be the flow size ordering of a 2-partitioned QoS problem $\langle N, P_1, P_2, q(\ ) \rangle$ and let $\sigma_q(f_i) = q(F_i, F\backslash F_i) - q(F_{i-1}, F\backslash F_{i-1})$. We will say that q( ) has decreasing returns to gains, if the following is true:

$$\sigma_q(f_i) \leq \sigma_q(f_{i-1}), \text{ for } 2 \leq i \leq |F| \quad (11)$$

Intuitively, the property of decreasing returns to gains tells us that as more flows are moved into policy $P_1$, the QoS gains achieved by performing such action become smaller. This property leads to a natural definition of flow size as follows:

Definition 12 Flow size and q-size metric. Let $f_1, f_2, \ldots, f_{|F|}$ be the flow size ordering of a 2-partitioned QoS problem $\langle N, P_1, P_2, q(\ ) \rangle$ and assume q( ) has decreasing returns to gains. We define $\sigma_q(f_i) = q(F_i, F\backslash F_i) - q(F_{i-1}, F\backslash F_{i-1})$ as the size of flow f. We will also refer to the function $\sigma_q(f_i)$ as the q-size metric of the QoS problem $\langle N, P_1, P_2, q(\ ) \rangle$. When the subindex q is redundant, we will simply use the expression $\sigma(f_i)$.

The formal concept of flow size can be understood by analogy with an intuitive method that one can use to measure the size of objects in nature. Suppose that we have different types of objects and that we are interested in knowing their volume ordering. We can immerse each object into a pool of water and measure the amount of water displaced. The object with the n-th largest volume will displace the n-th largest amount of water. This approach is equivalent to the definition of flow size ordering introduced above. The water in the pool can be seen as the total level of QoS available. When a flow is classified as elephant, it is moved into policy $P_1$, as if an object were removed from a pool, enhancing the overall QoS of the network by an amount equal to the amount of water displaced. The size of the flow $f_i$ corresponds to the quantity of water displaced, which mathematically can be expressed as the difference in QoS between the two configurations: $\langle F_i, F\backslash F_i \rangle$ and $\langle F_{i-1}, F\backslash F_{i-1} \rangle$. This value corresponds to $\sigma(f_i)$.

The property of decreasing returns to gains is necessary to provide a natural metric onto the set of real numbers upon which we can measure in absolute terms the size of a flow, but it is not needed in order to define the ordering of the flows according to their size. To define the ordering, a 2-partitioned QoS function q( ) only needs to satisfy the inclusiveness property. In the discussion below, we identify the convexity properties that need to be supported by q( ) to ensure inclusiveness. Before doing that, we complete this analysis showing that all metric-based definitions of flow ordering have decreasing returns to gains:

Lemma 7 Decreasing returns to gains for metric-based ordering. All metric-based partitioned QoS functions have decreasing returns to gains.

Proof. Consider the metric-based partitioned QoS problem described in Lemma 6. Using the condition $m(f_i) > m(f_{i+1})$ and equation 6, we can apply equation (9) to derive the flow size ordering as follows:

$q(\{\emptyset\}, F) = K_1 - \Sigma_{\forall f \in F} \pi(f) = q_0$ $q(F_1, F\backslash F_1) = q_0 + \pi(f_1) = q_1$ $q(F_2, F\backslash F_2) = q_1 + \pi(f_2) = q_2$ ( . . . )

$q(F_{\lambda^*-1}, F\backslash F_{\lambda^*-1}) = q_{\lambda^*-2} + \pi(f_{\lambda^*-1}) = q_{\lambda^*-1}$ $q(F_{\lambda^*}, F\backslash F_{\lambda^*}) = K_2 + \Sigma_{\forall f \in F\backslash F^*_{\lambda}} \rho(f) = q_{\lambda^*}$ $q(F_{\lambda^*+1}, F\backslash F_{\lambda^*+1}) = q_{\lambda^*} - \rho(f_{\lambda^*+1}) = q_{\lambda^*+1}$ ( . . . )

$q(F_{l-1}, F\backslash F_{l-1}) = q_{|F|-2} - \rho(f_{l-1}) = q_{l-1}$ $q(F, \{\emptyset\}) = q_{l-1} - \rho(f_l) = q_l \quad (12)$ where $F_i = F_{i-1} \cup f_i$, for all $1 \leq i \leq |F|$, $F_0 = \{\emptyset\}$ and $F_{|F|} = F$.

Figure 15:
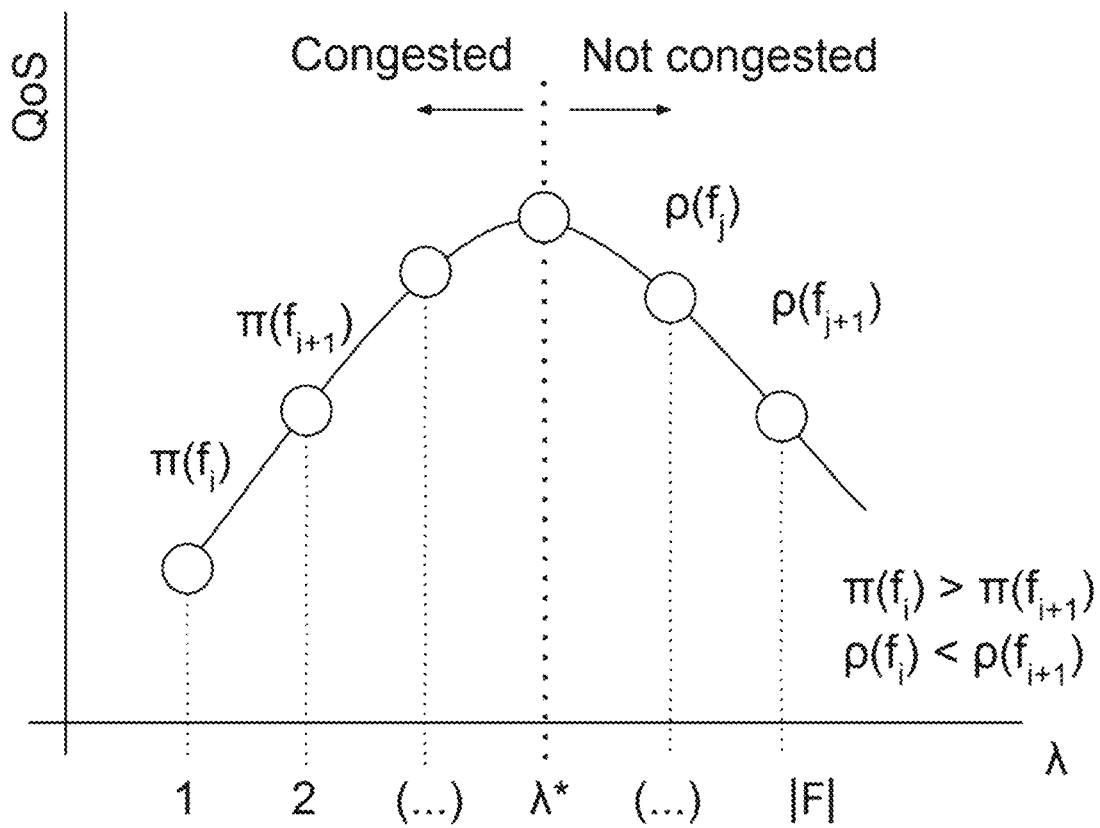
FIG. 15 shows decreasing returns to gains for metric-based QoS, according to various embodiments.

The above sequence has two separated regions graphically illustrated in FIG. 15. The first region generates the sequence $\{\emptyset\}, F_1, \ldots, F_{\lambda^*-1}$, which corresponds to all possible $\lambda$-optimal partitions under the assumption that the network is congested-upper level of equation (5). Under this region, moving a flow $f_i$ from policy $P_2$ to policy $P_1$ increases the QoS of the network by $\pi(f_i)$—i.e., the QoS penalty generated by flow $f_i$ when scheduled as high priority. Notice also that using the general definition of elephant flows (definition 9), $\{f_1, \ldots, f_\lambda^*\}$ corresponds to the set of elephant flows in the network.

The second region generates the sequence $F_{\lambda^*}, \ldots, F_{|F|}$ which corresponds to all possible λ-optimal partitions under the assumption that the network is not congested-lower level of equation (5). Under this region, moving a flow $f_i$ from policy $P_2$ to policy $P_1$ decreases the QoS of the network by $\rho(f_i)$—i.e., the QoS gain foregone by flow $f_i$ when scheduled as low priority. Similarly, using definition 9, $\{f_{\lambda^*+1}, \ldots, f_{|F|}\}$ corresponds to the set of mouse flows in the network. The optimal partition is reached when $\lambda=\lambda^*$, that is, when all elephant flows are moved to policy $P_1$, which is accomplished with the configuration $(F^*, F\backslash F^*)$ and the total QoS is:

$$K_2+\Sigma_{\forall f \in F \backslash F^*_\lambda} \rho(f) = q_{\lambda^*} \tag{13}$$

It is easy to see that $\sigma(f_i)=\pi(f_i)$ for $1 \leq i \leq \lambda^*$ and $\sigma(f_i)=-\rho(f_i)$ for $\lambda^* < i \leq l$. Now using equation (6), we can conclude that all metric-based QoS functions have decreasing returns to gain.

Study of Inclusive QoS Functions

The property of inclusiveness is relevant because if a QoS function satisfies it, then the greedy algorithm introduced in Definition 11 is optimal and the problem of ordering the flows in a network becomes tractable. We now study the mathematical properties of inclusive QoS functions. We start with a simple example.

Example 4 Inclusive paths on 3 flow networks. Let $\langle N, P_1, P_2, q(\ ) \rangle$ be a 2-partitioned QoS problem and assume that $F=\{f_1,f_2,f_3\}$. We are interested in understanding which possible mappings of the flows onto policies $P_1$ and $P_2$ preserve the property of inclusiveness. Using the encoding in definition 7 and since $|F|=3$ and $l=2$, the set of possible flow mappings correspond to the following binary symbols:

$$[1]^{|F|}=[2]^3=\{\{000\},\{001\},\{010\},\{011\},\{100\},\{101\},\{110\},\{111\}\} \tag{14}$$

The encoding of the solution set works as follows. A zero in the i-th position of each symbol means that flow $f_i$ is classified as a mouse flow-hence mapped onto policy $P_2$. Similarly, a one in the j-th position of each symbol means that flow $f_j$ is classified as an elephant flow-hence mapped onto policy $P_1$. To find an optimal mapping, we start with the symbol $\{000\}$ that maps all flows onto policy $P_2$ and attempt to increase the QoS of the network by migrating flows to policy $P_1$ following the recursive strategy described in equation (9). The complete set of possible optimization paths following this strategy is presented in FIGS. 16A and 16B.

As indicated in the graph, out of a total of nine possible paths, there exist six paths that satisfy the property of inclusiveness:

$$\{\{000\} \to \{001\} \to \{011\} \to \{111\}\},$$
$$\{\{000\} \to \{001\} \to \{101\} \to \{111\}\},$$
$$\{\{000\} \to \{010\} \to \{011\} \to \{111\}\},$$
$$\{\{000\} \to \{010\} \to \{110\} \to \{111\}\},$$
$$\{\{000\} \to \{100\} \to \{101\} \to \{111\}\},$$
$$\{\{000\} \to \{100\} \to \{110\} \to \{111\}\}. \tag{15}$$

Example 4 illustrates with a simple network configuration that not all possible optimization paths lead to a well defined flow ordering. Instead, only those that satisfy the property of inclusiveness do. We are now interested in identifying the topological properties that partitioned QoS functions must satisfy to ensure the property of inclusiveness is satisfied. To this end, we introduce first the concepts of partition distance and nested neighborhood:

Definition 13 Partition and nested neighborhoods. Let $\langle F_1, F_2 \rangle$ and $\langle F_{1'}, F_{2'} \rangle$ be two 2-part partitions of a set of flows F and let the vectors p and p' be their corresponding configuration encoding (definition 7). We define the partition distance d( ) between $\langle F_1, F_2 \rangle$ and $\langle F_{1'}, F_{2'} \rangle$ as the difference between the number of flows assigned to $F_1$ and $F_{1'}$. (Equivalently, it is also the difference between the number of flows assigned to $F_2$ and $F_{2'}$). Mathematically:

$$d_\pi(\langle F_1,F_2 \rangle, \langle F'_1,F'_2 \rangle)=||F_1|-|F'_1||=||F_2|-|F'_2|| \tag{16}$$

or, in a more compact form using the configuration encoding:

$$d_\pi(p,p')=|\|p\|_1-\|p'\|_1| \tag{17}$$

where $\|x\|_1$ is the Manhattan norm. We also define the partition neighborhood $n_\pi(\ )$ of a 2-part partition as the set of all 2-part partitions that are at a partition distance 1 of it:

$$n_\pi(\langle F_1,F_2 \rangle)=\{\langle F'_1,F'_2 \rangle s.t. d_\pi(\langle F_1,F_2 \rangle, \langle F'_1,F'_2 \rangle)=1\} \tag{18}$$

equivalently:

$$n_\pi(p)=\{p' s.t. d_\pi(p,p')=1\} \tag{19}$$

The partition neighborhood allows us to define the concept of nested neighborhood $n_o(\ )$ as follows:

$$n_o(\langle F_1,F_2 \rangle)=\{\langle F'_1,F'_2 \rangle \in n_\pi(\langle F_1,F_2 \rangle) s.t. F_1 \subset F'_1\} \Leftrightarrow n_o(p)=\{p' \in n_\pi(p) s.t. p=p' \wedge p'\} \tag{20}$$

where $\wedge$ is the bitwise logical conjunction.

Notice that the nested neighborhood of a 2-part partition is contained inside its partition neighborhood, $n_o(p) \subset n_\pi(p)$, hence the name nested. We can now introduce the concept of nested convexity which will allow us to characterize the property of inclusiveness:

Definition 14 Nested convexity on 2-partitioned QoS functions. Let a configuration encoding p be a $\|p\|_1$-optimal partition of an arbitrary 2-partitioned QoS problem $\langle N, P_1, P_2, q(\ ) \rangle$. The QoS function q( ) is said to be nested convex in the vicinity of p if the following is true:

$$\forall p' \in n_\pi(p) \exists p'' \in n_o(p) s.t. q(p'') \geq q(p') \tag{21}$$

Finally, we are in a position to characterize the property of inclusiveness using the convexity properties of the QoS function:

Lemma 8 Nested convexity and inclusiveness. A 2-partitioned QoS function is inclusive if and only if it is nested convex in the vicinity of its λ-optimal partitions, for all $1 \leq \lambda \leq |F|$.

Proof. Let $\langle N, P_1, P_2, q(\ ) \rangle$ be a 2-partitioned QoS problem and assume that q( ) is nested convex in the vicinity of its λ-optimal partitions but not inclusive. Then, from Property 2, there must be a λ-optimal partition which does not include the (λ−1)-optimal partition, for some λ between 2 and $|F|$. For such λ, we have that $p_{\lambda-1} \neq p_{\lambda-1} \wedge p_\lambda$ and, from equation (20), the following holds:

$$p_\lambda \notin n_o(p_{\lambda-1}) \tag{22}$$

Since $p_\lambda$ is a $\lambda$-optimal partition, we also have that:

$$q(p_\lambda) > q(p), \forall p \in n_\lambda(p_{\lambda-1}) \tag{23}$$

But equations (22) and (23) contradict the nested convex definition in equation (21). This proves the "if" part of the lemma. Assume now that q( ) is inclusive but not nested convex in the vicinity of some $\lambda$-optimal partition $p_\lambda$ and let $p_{\lambda+1}$ be a $(\lambda+1)$-optimal partition. By definition, we have that $p_{\lambda+1}$ is in the partition neighborhood of $p_\lambda$, that is, $p_{\lambda+1} \in n_\pi(p_\lambda)$. From equation (21) and since q( ) is not nested convex in the vicinity of p, we also have that $q(p_{\lambda+1}) > q(p')$ for all $p' \in n_o(p)$. This implies that $p_{\lambda+1}$ is not in the nested neighborhood of $p_\lambda$, and hence that $p_\lambda \neq p_\lambda \wedge p_{\lambda+1}$, which contradicts the assumption that q( ) is inclusive from Property 2.

In Appendix B.1 we provide a topological interpretation of the property of nested convexity and the reason it leads to a polynomial time greedy algorithm to compute the $\lambda$-optimal partitions. We conclude this initial theoretical framework summarizing in FIG. 17 the possible configurations that a partitioned QoS problem can take. To be well-defined, the property of inclusiveness-equivalently, nested convex-must hold. This ensures both the existence of a flow ordering and that the greedy algorithm is optimal. If in addition the property of decreasing returns to gains holds, then there exist a q-size metric.

Identification of the Flow Ordering in TCP Networks

To network operators, understanding which flows are responsible for the largest degradation of performance is critical in order to quickly debug network problems. Consider for example the case of a misconfigured BGP route. Such situation causes certain flows to use routes that are less efficient, therefore negatively impacting the overall QoS of the network. According to the theory of flow ordering described herein, if we are able to correctly order the flows in a network based on their QoS impact, these large flows should reveal themselves at the top of the list. Another common example is the case of flows that violate their service level agreement (SLA), whether due to a network misconfiguration or to a violation of the contract between the user and the network provider.

Traditional methods attempt to identify such flows by looking at scalar metrics such as flow transmission rate, total number of bytes transmitted, or jitter. As shown in Lemma 6, however, such approaches do not take into consideration the topological structure of the network—e.g., the graph structure of the network, the routes followed by the flows, the capacity of the links, or the inner effects of the congestion control algorithm regulating the flows' transmission rates—and are unable to capture the QoS utility function inherent to a network. We now show how the theory of flow ordering can be used in practice to order TCP flows according to their impact to the overall QoS of the network and its topological structure.

The theoretical framework described herein contemplates an area of research around the problem of designing suitable partitioned QoS functions that are practical and useful to network operators. Towards this objective, in what follows we describe and study a first class of QoS functions that are applicable to real networks.

Definition 15 Max-min/max-flow (m3f) QoS function.

Let $N = \langle T, F \rangle$ be a network and let $F_e$ be an arbitrary subset of flows, $F_e \subseteq F$. We define the max-min/max-flow (m3f) QoS function as follows:

$$q_{m3f}(F_e, F \backslash F_e) = \sum_{\forall f_i \in F} r_i \begin{vmatrix} r_j^* - \delta \forall f_j \in F_e \\ r \text{ is max}-\text{min} \end{vmatrix} \tag{24}$$

where r* is the max-min rate allocation corresponding to network N and $\delta$ is a non-negative real number which we refer to as the traffic shaper hyperparameter.

The above QoS function corresponds to the sum of all the flow rates subject to the constraint that all flows are transmitting at the max-min rate while traffic shaping the flows in $F_e$ by an amount $\delta$. Intuitively, this QoS function models the following properties:

The QoS measures the global welfare of the network by summing (in general aggregating, using a function based on the QoS function) up the transmission rates of all flows. To build an analogy, if the network was an economy, a flow would correspond to the economic output of single economic agent, and the QoS value would correspond to the gross domestic product of the economy.

The model assumes that flows operate under a congestion control algorithm that assigns the max-min rate to each flow.

The QoS of the network is controlled by the hyperparameter $\delta$. Those flows that are moved onto a policy $P_1$ (the flows in the set $F_e$, see Definition 9), are forced to reduce their max-min rate by an amount of $\delta$. This new constraint brings the network to a new optimal max-min solution, and therefore to a new value of the QoS.

We reason that the m3f QoS function is suitable to model networks that are operated by TCP congestion control algorithms-such as Cubic or BBR, among many others-because such algorithms aim at maximizing network utilization while ensuring fairness among all flows. Some TCP congestion algorithms are explicitly designed to converge to max-min (e.g., XCP) while others converge to other fairness criteria such as proportional fairness. In addition, it is well-known that algorithms using additive increase/multiplicative decrease (AIMD)—a type of control loop used by many TCP variants-converge to use equal amounts of bandwidth from their bottleneck link similar to max-min. Equivalent mathematical models for other bandwidth allocation schemes using the framework described herein are contemplated.

A key characteristic of our model in conjunction with the theory of flow ordering is that it allows us to reason about the optimal value of $F_e$ (the set of flows that need to be traffic shaped) that maximize the overall QoS (the welfare) of the network. In this model the hyperparameter $\delta$ can also be interpreted as the delta step in a gradient descent algorithm. In particular, in the case of the m3f QoS function, the objective is to identify the subset of flows $F_e \subset F$ such that when they are traffic shaped by a small step size $\delta$, the new resulting max-min rate allocation increases maximally towards the max-flow rate allocation.

It should be understood that m3f is only one example of a QoS function that may be used for ordering flows according to flow sizes or flow metrics so as to improve the overall QoS of a network. In general, the size or metric of a flow represents the network resources required for processing the flow, where the larger the size/metric of a flow the greater the network resources required for processing the flow. Network resources include one or more of link bandwidth, processing capacity, processing time, memory, etc. When the designation of a flow is changed from a relatively less resource consuming flow to a relatively more resource consuming flow, a suitable QoS function may apply or increase a penalty associated with the metric of that flow. The QoS function may also apply or increase a reward associated with the respective metrics of one or more other flows. Thus, the QoS function accounts for the overall QoS of the network, which may also be referred to as network performance of global welfare of the network.

The penalty/reward, which are described above in connection with Equations (5) and (6), represent a reduction/increase in transmission rates associated with the flow. A reduction in the rate of a flow can decrease the instantaneous resource requirement of that flow, making a greater portion of the available network resource(s) for one or more other flows, which can increase the overall QoS of the network. Examples of QoS function include set functions. The m3f function can also be weighted. In particular, max-min can be weighted, max-flow can be weighted, or they both can be weighted. Some QoS functions are constrained such that one or more flows are guaranteed at least respective specified minimum transmission rates or bandwidths. Some QoS functions may be constrained such that one or more flows are limited to at most respective specified maximum transmission rates or bandwidths.

This formulation provides us with a natural way to compute derivatives or gradients in the form of infinitesimal adjustments to flow rates that help improve the QoS of a network. We formalize this concept in the next definition:

Definition 16 Flow gradients. Let $N = \langle T, F \rangle$ be a network associated with a QoS function $q( )$ (Definition 6). We define the gradient of a flow $f \in F$, $\nabla_{f_i} q$, as:

$$\nabla_{f_i} q = \lim_{\delta \to 0} \frac{q(\{f_i\}, F \setminus f_i) - q(\{\emptyset\}, F)}{\delta} \quad (25)$$

More in general, we define the gradient produced by the set of flows $F_e \subset F$ as:

$$\nabla_{F_e} q = \lim_{\delta \to 0} \frac{q(F_e, F \setminus F_e) - q(\{\emptyset\}, F)}{\delta} \quad (26)$$

Note that this notation should not be directly compared with the traditional definition of gradient used in the field of calculus. The main difference is that in our problem we deal with discrete set functions, instead of continuous and differentiable functions. Unlike the general definition of gradient which results in a vector-valued real function, the flow gradient is a scalar-valued set function. Thus one can reason the name of derivative would be more suitable than gradient. We use instead the more general terminology of gradient to better reflect the concept of incremental path, since our objective is to identify optimization paths within the problem's feasible set that lead to better QoS. Note that since derivatives are a special case of gradients for unidimensional functions, the gradient terminology is still mathematically accurate.

The following example illustrates how the proposed framework can be used to order the flows for the case of the max-min/max-flow QoS function:

Example 5 Ordering flows in a network. Let N be the network example described in FIG. 18A, with 6 flows (represented as lines) and 4 links (represented as circles) of capacity 25, 50, 75, and 100. We are interested in knowing the ordering of the flows according to their impact to the QoS of the network based on the m3f QoS function. The max-min rate allocation for this network corresponds to the vector $r = [8.\overline{3}, 16.\overline{6}, 8.\overline{3}, 16.\overline{6}, 75, 8.\overline{3}]$, where $r_i$ is the transmission rate of flow $f_i$. An algorithm to compute the max-min rate vector is known. Such rate allocation produces a QoS value of $q_{m3f}(\{\emptyset\}, F) = 133.\overline{3}$ according to equation (24). If we were to classify flows based on their rate (as is done in much of the existing literature), we would conclude that flow $f_5$ is the largest flow with $r_5 = 75$. But this analysis neglects the distributed and topological structure of the problem. To identify the true flow ordering according to the given QoS function, we need to compute the value of $q_{m3f}(F_e, F \setminus F_e)$ for all possible subsets of flows $F_e \subset F$ and measure how the QoS of the network increases or decreases based on the choice of $F_e$. Mathematically, we need to compute the gradients according to equation (26).

FIG. 28 shows the identification of the flow size ordering for the network in FIG. 18A by computing the flow gradients for all possible subsets of flows. FIG. 28 provides the computation of the gradients for all possible values of $F_e$. (Since there are 6 flows and l=2, we have 64 possible encodings, as shown in equation (3).) FIG. 28 reveals the following:

The cells in gray correspond to the $\lambda$-optimal QoS values, for $1 \le \lambda \le |F|$.

Since the six $\lambda$-optimal partitions satisfy $F_\lambda \subset F_{\lambda+1}$, $1 < \lambda \le 6$, the m3f QoS function applied to network N is inclusive and thus, from Lemma 8, it is also nested convex.

The flow ordering according to the m3f QoS function is $f_6 > f_3 > f_4 > f_5 > f_1 > f_2$, thus flow $f_6$ is the largest, while flow $f_2$ is the smallest. This demonstrates that a classification of flow ordering based on rate is erroneous since while $f_5$ has the largest max-min rate of 75, the topological structure of the network reveals that it is actually the third smallest flow.

FIG. 18B plots the gradient values for each $\lambda$-optimal partition, for $0 \le \lambda \le |F| = 6$. The graph shows that the QoS of the network improves when flows $f_6$ and $f_3$ are classified as elephant flows, and degrades when flows $f_1$ and $f_2$ are classified as elephant flows.

Because nested convexity holds, the greedy algorithm described in equation (9) returns the correct flow ordering, and thus there is no need to explore all $2^6 = 64$ possible flow encodings to order the flows. This is a relevant result, since otherwise identifying the flow ordering would not be tractable in real world networks that operate with millions of real-time flows.

In FIG. 28, we have seen that the flow ordering of a network is directly related to the gradients of the utility function that characterizes the QoS of our network: if a flow $f \in F$ has a larger gradient than another flow $f' \in F$, then f has a larger impact to the overall QoS of the network than f', and thus it is a larger flow. More in general, if a subset of flows $X \subset F$ has a larger gradient than another subset of flows $Y \subset F$, then X is a larger subset of flows than Y. Hence, being able to compute such gradients efficiently becomes a problem of interest.

Each gradient $\nabla_{F_e} q$ in FIG. 28 can be generally obtained by measuring the variation of the total flow rate according to the max-min criterion when the set of flows in $F_e$ are traffic shaped by an amount of $\delta$. Thus for the m3f QoS function:

$$\nabla_{F_e} q_{m3f} = \lim_{\delta \to 0} \frac{\sum_{\forall f_i \in F} r_i(F_e) - \sum_{\forall f_i \in F} r_i(\{\emptyset\})}{\delta} \quad (27)$$

where $r_i(X)$ corresponds to the max-min rate of flow $r_i$ after all the flows in X are traffic shaped by $\delta$.

Computing such expression provides two challenges. First, it requires the calculation of a new max-min solution for the whole network after the traffic shapers are added. Since real networks can run millions of flows (or many more), this could be a consuming computation, specially when such gradients need to be computed in real time as network conditions vary. Secondly, the computation of the limit in expression (27) requires choosing a small enough δ to ensure the value of the gradient is accurate, but it is not clear how this value can be computed efficiently without requiring multiple iterations, with each iteration involving another calculation of the max-min rate allocation. The algorithm we propose next overcomes both of these challenges by using the knowledge gained from the topological structure of the network. Before describing the algorithm, we need to introduce first the concept of flow gradient graph:

Definition 17 Flow gradient graph. (In what follows we will take the classic definitions of saturated link and bottleneck link in the max-min sense.)

Let $\mathcal{L}_b(f)$ and $\mathcal{L}_{\overline{b}}(f)$ be as follows:

$\mathcal{L}_b(f)$ is the set of saturated links traversed by flow f that are a bottleneck to flow f.

$\mathcal{L}_{\overline{b}}(f)$ is the set of saturated links traversed by flow f that are not a bottleneck to flow f.

We define the flow gradient graph of a network $N = \langle \langle S, L \rangle, F \rangle$ as a directed graph $\Gamma(N) = \langle V, E \rangle$ constructed as follows:

1. Start with V=E={∅}.
2. For each saturated link l∈L, add l as a vertex to V. We will call these link vertices.
3. For each flow f∈F, add f as a vertex to V. We will call these flow vertices.
4. For each flow f, add a directed edge (l,f) for all l∈$\mathcal{L}_b(f)$.
5. For each flow f, add a directed edge (f,l) for all l∈$\mathcal{L}_{\overline{b}}(f)$.

$\mathcal{L}_b(f)$ and $\mathcal{L}_{\overline{b}}(f)$ can be determined using the BPG algorithm described above. Alternatively, flow gradient graph can be derived directly from the BPG algorithm. the FIG. 19 provides the flow gradient graph of the network introduced in example 5. Note that by way of convention and to facilitate its interpretation, we represent link vertices and flow vertices as white and gray nodes, respectively. To obtain this graph we need to compute the bottleneck links associated with each flow according to the max-min rate allocation. Such computation is well-known in the literature and we omit it for the sake of brevity. In particular, using for instance a known max-min algorithm described elsewhere (Jordi Ros and Wei K Tsai, "A Lexicographic Optimization Framework to the Flow Control Problem," *IEEE Transactions on Information Theory*, 56(6), pp. 2875-2886 (2010), which is incorporated herein by reference in its entirety), we obtain the following sets of bottleneck and non-bottleneck links: $\mathcal{L}_b(f_1)=\{l_1\}$, $\mathcal{L}_{\overline{b}}(f_1)=\{\emptyset\}$, $\mathcal{L}_b(f_2)=\{l_2\}$, $\mathcal{L}_{\overline{b}}(f_2)=\{\emptyset\}$, $\mathcal{L}_b(f_3)=\{l_1\}$, $\mathcal{L}_{\overline{b}}(f_3)=\{l_2\}$, $\mathcal{L}_b(f_4)=\{l_2\}$, $\mathcal{L}_{\overline{b}}(f_4)=\{l_3\}$, $\mathcal{L}_b(f_5)=\{l_3, l_4\}$, $\mathcal{L}_{\overline{b}}(f_5)=\{\emptyset\}$, $\mathcal{L}_b(f_6)=\{l_1\}$, $\mathcal{L}_{\overline{b}}(f_6)=\{l_2, l_3\}$. From these sets the flow gradient graph can be constructed as shown in FIG. 19.

The key characteristic of the flow gradient graph is that it encodes the necessary information to efficiently compute the flow gradients based on the bottleneck structure of the network. In particular, the gradient of any flow f∈F can be computed by applying a rate shift of δ to the flow vertex associated with f and measuring the resulting rate drift propagation on all other flows by traveling through the directed graph. For this process to be successful, there are three invariants that must be preserved when computing the resulting drift for the affected flows:

Invariant 1: Drift conservation. The sum of rate drifts arriving to and departing from a link vertex must be equal to zero.

Invariant 2: Fairness conservation. The rate drifts departing from a link vertex must be equally distributed.

Invariant 3: Bottleneck consistency. The rate drifts leaving a flow vertex must be equal to the minimum of the rate drifts arriving to it.

Figure 20A:
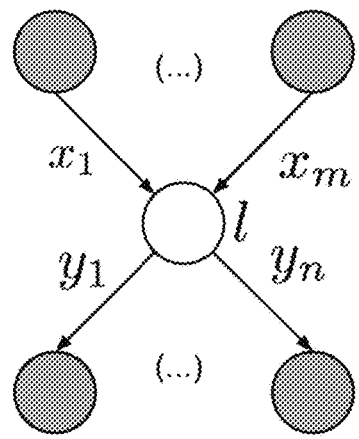
FIGS. 20A and 20B illustrate the invariant properties associated with a flow gradient graphs according to various embodiments.
Figure 20B:
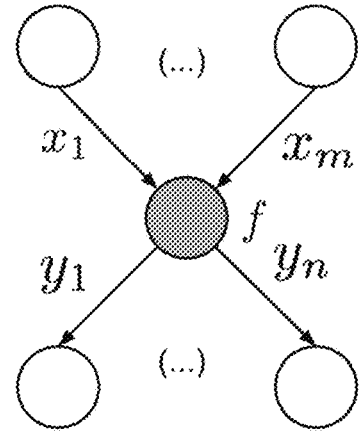

The first invariant is needed to ensure that the rate drifts maintain all links saturated—otherwise links could become either unsaturated or the total link utilization could become larger than its capacity—while the second invariant is needed to ensure max-min fairness is preserved. Invariants 1 and 2 work together to compute the resulting rate drifts in the link vertices and are graphically represented in FIG. 20A. The third invariant is needed to support the singular case of a flow being bottlenecked at more than one link, in which case the flow's drift must be limited by its most constrained bottleneck after all the rate drifts are applied. This invariant is used to compute rate drifts in the flow vertices and is graphically represented in FIG. 20B.

For the sake of brevity, we only include the formal description of the flow gradient algorithm as supplemental material in Appendix B.2 and we focus the next discussion around an example to describe how the algorithm works.

FIGS. 21A-F show how the invariants are applied to compute the gradient of all the λ-optimal partitions in our network from example 5, for λ=1, 2, . . . , 6. Consider for instance FIG. 26(*a*) which computes the gradient of flow $f_6$. We start by applying a rate shift of δ onto flow vertex $f_6$ (marked in FIG. 21A using red font). This corresponds to the action of traffic shaping flow $f_6$ by an amount of δ. To ensure Invariants 1 and 2 are preserved at link vertex $l_1$, flow vertices $f_1$ and $f_3$ need to be assigned a drift of δ/2 (marked in FIG. 21A using blue font).

This ensures that the sum of all rate drifts arriving and departing from $l_1$ is equal to zero (Invariant 1) and that all the departing rate drifts are equal to each other (Invariant 2). Since link vertex $l_2$ has a total input drift of $-\delta+\delta/2=-\delta/2$ arriving from flow vertices $f_3$ and $f_6$, applying again Invariants 1 and 2 the output drift corresponding to flows $f_2$ and $f_4$ must be equal to δ/4. Now at link vertex $l_3$ there is a total input drift of $-\delta+\delta/4=-3\delta/4$ arriving from flow vertices $f_4$ and $f_6$, which leads to an output drift onto flow vertex $f_5$ of 3δ/4. However, since flow $f_5$ has a second bottleneck with a drift of 0, applying invariant 3 we have that the total drift leaving flow vertex $f_5$ is 0. The actual gradient of flow $f_6$ can now be easily obtained according to equation (27) by dividing the sum of all drifts by δ, $(-\delta+\delta/2+\delta/2+\delta/4+\delta/4+0)/\delta$, which results in the expected value of ½, in agreement with the value shown in FIG. 28.

As illustrated in the above example, the flow gradient graph provides two beneficial properties. First, the algorithm only requires recomputing the parts of a network that are strictly affected by the rate drift. In particular, the flows that need to be recomputed to derive the gradient of flow f correspond to the subset of flows that are descendants to flow f's parent link vertices. For instance, the gradient of flow $f_5$ is trivially equal to $-\delta$ and it can be computed directly without recomputing the rate of any other flow since flow $f_5$'s parent vertices $l_3$ and $l_4$ do not have any children vertices in the flow gradient graph other than $f_5$ itself. Thus the proposed algorithm can be seen as a streaming algorithm in that it avoids recomputing the max-min rates for all flows by only considering the necessary rate drift changes from a given initial max-min solution.

This property is important to ensure the scalability of the real-time computation for networks involving a very large number of flows. Secondly, the algorithm is independent of the value of S. This property is a result of the fact that the max-min optimization problem can be characterized by a piecewise linear function, since it can be expressed as a recurrence of linear programming problems. The flow gradient graph is able to capture this property in that the sum of all the rate drifts is proportional to $\delta$, and this factor gets canceled out by the denominator in equation (27). Thus in practice we can fully eliminate the variable $\delta$ from the flow gradient graph and work only with the actual rate drift weights, as is shown in the rest of the graphs in FIGS. 21B through 21F.

Notice that the flow gradient graph is a valid framework to compute gradients provided that the value of $\delta$ is small enough so that the overall bottleneck structure of the network is preserved. Choosing a $\delta$ too large could change the structure of the flow gradient graph itself resulting in an erroneous computation. Fortunately, the case of small $\delta$ is precisely the case we are interested in, since our objective is to obtain the flow ordering by computing changes in QoS when flows are subject to infinitesimal traffic shapers according to equation (27).

Measurements and Evaluation

We describe below two experiments that we conducted to help empirically validate some of the principles described in our theoretical framework. In the first experiment, we aimed at quantifying and providing some empirical evidence on the property of nested convexity for small networks. In the second experiment, we demonstrate how the theory of flow ordering can be used to identify large flows in Google's B4 network.

Measurements of Nested Convexity in Small Networks

In this experiment we developed a network generator and measured the property of nested convexity for the max-min/ max-flow QoS function. To bound the number of possible networks in the search space, we limit this experiment to networks where all links have the same capacity. While real networks in general have links with different capacities, we reason the case of equal link capacity is relevant in controlled environments such as enterprise networks and serves also as a first order approximation for networks that don't satisfy this requirement. Our network generator makes use of the combinatorial properties of the problem to ensure the networks generated are unique, eliminating duplicated networks that are symmetric with each other.

We present measurements for networks up to 7 links and 7 flows. Measuring networks with higher number of links and flows rapidly becomes intractable, thus for this experiment we only focus on these smaller networks. While obviously such small networks may not be realistic in the real world, the next results may still be interesting in small networking environments or in scenarios where flows are aggregated into a reduced number of "superflows". For instance, in MPLS networks, many IP connections can be aggregated into a reduced number of MPLS paths. Such set of MPLS paths can be modeled as flows, in which case our objective becomes the ordering of these paths according to their overall impact on the QoS of the network.

Table 5 presents the results. All measurements are done by inspecting all possible networks with the corresponding number of links and flows except for the last three cases at the lower right corner of the table which are marked with "*". These three cases generated an intractable amount of networks and instead we randomly explored 100 million networks for each of them and projected the results as estimations. The four numbers measured in each cell are (in this order): the total number of networks, the number of non-nested convex networks, the number of singular networks and the number of singular networks that are non-nested convex.

We define a singular network as a network that has at least one flow with more than one bottleneck link. We use the term singular because in the continuum space of rate allocations, the case where a flow happens to have the exact same bottleneck rate in more than one link can be seen as a singularity. Notice that as the number of flows increases, the chances of having singular networks decreases because it becomes more difficult for two links to yield the exact same bottleneck rate to a given flow. In real world scenarios, singular networks are very unlikely or may only manifest in infrequent instantaneous situations.

A surprising result derived from Table 5 is that for all networks explored, non-singularity is a sufficient condition for nested convexity. This can be seen by the fact that the second and fourth numbers (the number of non-nested convex networks and the number of singular networks that are non-nested) in each cell are identical. We formalize this in a lemma:

Lemma 9 Nested convexity for small networks. Let N be a non-singular network with constant link capacities and assume its QoS can be characterized with the m3f function described in equation (24). If N has up to 6 links and up to 6 flows, then N is deterministically nested convex. If N has up to 7 links and up to 7 flows, then N is nested convex with very high probability.

The contribution of the above lemma is that it enables a very simple mechanism to verify if a network is nested convex for small networks. This is because the property of singularity can be identified by simple inspection of the max-min rate in each bottleneck link of the network, a procedure which is well known to be solvable in polynomial time. At the time of this writing we are still running our network generator to evaluate if all the networks with 7 flows and 7 links are deterministically nested convex. While it will not necessarily add more insights to our argument, this computation will complete in about two weeks, in which case we will be able to assert whether the above lemma also holds deterministically for all networks up to 7 links and 7 flows. We note also that the above lemma does not hold for larger networks. In Appendix B.3 we present the smallest network we found that does not satisfy the above lemma.

TABLE 5

Nested convexity measurements for small networks with constant link capacity.

| | | | | # Flows | | | | |
|---|---|---|---|---|---|---|---|---|
| # Links | 1 | 2 | 3 | 4 | 5 | 6 | 7 |
| 1 | 1 | 1 | 1 | 1 | 1 | 1 | 1 |
| | 0 | 0 | 0 | 0 | 0 | 0 | 1 |
| | 0 | 0 | 0 | 0 | 0 | 0 | 0 |
| | 0 | 0 | 0 | 0 | 0 | 0 | 1 |

TABLE 5-continued

Nested convexity measurements for small networks with constant link capacity.

| # Links | # Flows | | | | | | |
|---|---|---|---|---|---|---|---|
| | 1 | 2 | 3 | 4 | 5 | 6 | 7 |
| 2 | 3 | 6 | 10 | 15 | 21 | 28 | 36 |
| | 0 | 0 | 0 | 0 | 0 | 0 | 0 |
| | 1 | 1 | 2 | 2 | 3 | 3 | 4 |
| | 0 | 0 | 0 | 0 | 0 | 0 | 0 |
| 3 | 7 | 28 | 84 | 219 | 462 | 924 | 1716 |
| | 0 | 0 | 0 | 3 | 6 | 15 | 27 |
| | 4 | 13 | 41 | 81 | 185 | 295 | 546 |
| | 0 | 0 | 0 | 3 | 6 | 15 | 27 |
| 4 | 15 | 120 | 680 | 3060 | 11628 | 38760 | 116280 |
| | 0 | 0 | 0 | 114 | 452 | 1757 | 5159 |
| | 11 | 86 | 500 | 1989 | 7650 | 21646 | 64884 |
| | 0 | 0 | 0 | 114 | 452 | 1757 | 5159 |
| 5 | 31 | 496 | 5456 | 46376 | 324632 | 1947792 | 10295472 |
| | 0 | 0 | 0 | 2713 | 22460 | 115791 | 809369 |
| | 26 | 431 | 4851 | 38091 | 274241 | 1108290 | 7844214 |
| | 0 | 0 | 0 | 2715 | 22460 | 115791 | 809369 |
| 6 | 63 | 2016 | 43680 | 720720 | 9657648 | 109453344 | 1078897248* |
| | 0 | 0 | 0 | 51870 | 159332 | 5810982 | 121577707 |
| | 57 | 1905 | 42004 | 678894 | 1566495 | 96492451 | 963645397 |
| | 0 | 0 | 0 | 51870 | 159332 | 5810982 | 121577707 |
| 7 | 127 | 8128 | 349504 | 11358880 | 297602656 | 6547258432* | 124397910208* |
| | 0 | 0 | 0 | 136211 | 226206 | 916018544 | 9298946216 |
| | 120 | 7953 | 345521 | 1623094 | 1938302 | 6261684990 | 117290829240 |
| | 0 | 0 | 0 | 126211 | 226206 | 916018544 | 9298946216 |

Table 5 shows nested convexity measurements for small networks with constant link capacity. Each cell shows (in this order) the total of number of (1) networks, (2) non-nested convex networks, (3) singular networks and (4) singular networks that are non-nested convex. (Results marked with "*" were obtained by randomly exploring 100 million networks).

Identifying Top Flows in Google's B4 Network

We describe several experiments to help illustrate how a network operator can use the proposed framework to identify large flows according to their impact to the QoS of the network and based on the topological structure of the network. To help bring some realism to the experiment, we choose the topology from a real world network, in this case Google's B4 network. This toplogy is described in Appendix B.4. In our tests, we assumed that all links have a constant capacity. Note that under this assumption, the actual value of the link capacity is irrelevant to the analysis.

Our first experiment involved measuring the flow ordering assuming there exists a flow between each pair of nodes in the network. Because there are 12 nodes, this results in a total of 144 flows. These flows can be interpreted as traffic engineered paths that are used to move traffic from one site to another, and our objective was to determine how efficient each path is according to the topological structure of the network. We started by assuming each flow uses a shortest path between its endpoints and later introduce less efficient flows and verify if the algorithm is able to capture their larger QoS impact. For this experiment we assumed the max-min/max-flow QoS function.

Using the flow gradient graph algorithm by performing an exhaustive computation of all gradients for all possible subsets of flows up to cardinality 4, we obtain the $\lambda$-optimal partitions $\{f_{12}\}$, $\{f_{12}, f_{131}\}$, $\{f_{12}, f_{131}, f_{132}\}$, $\{f_{12}, f_{131}, f_{132}, f_{142}\}$ for $\lambda=1,2,3,4$, respectively. Thus the largest flow is $f_{12}$, followed by $f_{131}$, $f_{132}$ and $f_{142}$. For 5 and more flows the search space becomes intractable, since from equation (3), a total of $2^{144}$ executions of the flow gradient graph algorithm would need to be computed for the full exploration. It is in this regard that our theoretical framework can be used to identify the flow ordering in a tractable manner. Assuming the property of nested convexity-equivalently, inclusiveness, as shown in Lemma 8-we can compute the full ordering of all the 144 flows in polynomial time (a total of 144*143/2 executions of the flow gradient graph algorithm) by using the greedy algorithm introduced in Definition 11. By using this approach, we obtained the flow ordering:

$f_{12} > f_{131} > f_{132} > f_{142} > f_{11} > f_{37} > f_{47} > f_{130} > f_{10} > f_{109} > ( \ldots ) > f_{123} > f_{40} > f_{136} > f_{53} > f_{105} > f_{27} > f_{79} > f_{66} > f_{14} > f_{92}$, where we only present the top and bottom 10 flows. Appendix B.4 presents the complete ordering including the values of the flow gradients. We observed that:

Google's B4 network is at least nested convex for all values of $\lambda$ up to 4, since the top 4 flows returned under the assumption of nested convexity are exactly the same as those obtained from the exhaustive combinatorial search. It is possible that the network is also nested convex for more values above 4, but this can't be verified due to the intractability of the problem.

By assuming nested convexity, we obtain a complete ordering of all the flows that allows us to identify correct traffic shaping strategies that lead to increments in QoS without the need to perform combinatorial exploration. For instance, we obtain that the maximal $\lambda$ with positive gradient is equal to 132, with a gradient value of $\nabla_{F_{132}} = 11.50$. This allows us to assert that by traffic shaping all flows in the set $F_{132}$, we obtain a maximal increment in QoS according to the m3f function, and that such increment will have a multiplicative factor of 11.5 on the $\delta$ chosen for the traffic shapers. Because all flows in the subsets $F_{133}, \ldots, F_{144}$ have a negative gradient, we can also conclude that we should not traffic shape any of these flows.

One observation from the experiment is that many of the positive flow gradients are very similar to each other and have a small value. (See Appendix B.4 for full detail on all the gradients.) For instance, the largest flow $f_{12}$ has a gradient of 0.66, which from equation (7) implies that the gradient of any other flow $f_i \neq f_{12}$ must be no larger than 0.66. This reflects the notion that all flows are relatively efficient and that there is no flow that stands out as substantially larger than any another flow.

We reason that this is true because we chose each flow to follow a shortest path between its endpoints, which makes them efficient flows from a topological standpoint. Thus the m3f QoS function is able to capture this property. To further test this characteristic, we add 12 more flows to our network experiment, $f^*_1, \ldots, f^*_{12}$, and we force each flow $f_i^*$ to go through links $l_0, \ldots, l_{i-1}$, for $1 \leq i \leq 12$. Our goal is to verify that the proposed theoretical framework and the m3f function are capable of identifying flow $f^*_{12}$ as a very inefficient and large flow in the network since it goes through all possible links. Indeed by computing the flow ordering for all the 166 flows (the previous 144 plus the new 12 flows), we now obtain the top 10 flow ordering $f^*_{12} > f^*_{10} > f^*_9 > f^*_{11} > f_8^* > f_7 > f_5 > f_{47} > f_{130} > f_{11}$, which correctly identifies $f^*_{12}$ as the top flow.

Interestingly, the m3f QoS function assigns a higher size to $f^*_{10}$ than to $f^*_{11}$, even though the latter one uses one more link. This is the type of subtle insights that the proposed topological approach to flow classification brings, since the ordering is not only based on the amount of links used by a flow, but on a comprehensive view of the complete structure of the network, including the inner interactions among all the flows with respect to each other and the links they traverse. Finally, we also observe that the proposed framework is able to quantify the magnitude by which a flow is larger than other flows. Indeed, the gradient of the top flow $f^*_{12}$ is equal to 3.87, $\nabla_{f^*_{12}} q_{m3f} = 3.87$. This is in contrast with the gradient of flow $f_{12}$ on the first test performed without the additional 12 flows, which was 0.66, $\nabla_{f_{12}} q_{m3f} = 0.66$.

Conclusions and Open Questions

Suppose that you are a network operator and suddenly detect that the performance of your network has been drastically reduced due to an unexpected set of misbehaving flows—e.g., maybe due to a mis-configured BGP route or maybe because such flows are not respecting their service level agreement. You are interested in identifying these flows, but your network is running millions of flows and you cannot afford debugging each of them individually. The theory of flow ordering techniques described herein provide a mathematical tool to tackle this problem in a tractable manner. By providing a real-time list of flows ordered according to their QoS impact, network operators can focus on debugging the top flows that are most likely to have caused the collapse of the network.

Appendix A: Additional Material to the Theory of Bottleneck Ordering

A.1 Mathematical Proofs

Property 4 Monotonic fair shares. Let $s_l^k$ be the fair share of link l at iteration k of the BPG algorithm. Then $s_l^k \leq s_l^{k+1}$.

Proof. This result is described in connection with in Property 3.6 discussed in: Jordi Ros-Giralt and Wei Kang Tsai, "A Theory of Convergence Order of Maxmin Rate Allocation and an Optimal Protocol," *Proceedings IEEE INFOCOM* 2001, volume 2, pp. 717-726 (2001), which is incorporated herein by reference in its entirety.

A.1.1 Property 1

Monotonic fair shares along a precedence path. Let $s_{l_1}, s_{l_2}, \ldots, s_{l_n}$ be the fair share values of links $l_1, l_2, \ldots, l_n$, respectively. If $l_i$ is a direct precedent of $l_{i+1}$, then $s_{l_i} < s_{l_{i+1}}$, for all $1 \leq i \leq n-1$.

Proof. By induction, it is sufficient to prove that the lemma holds for n=2. Let $k_1$ and $k_2$ be the value of k at the iteration when links $l_1$ and $l_2$ are removed from the set of unresolved links (BPG algorithm/line 13). This implies $s_{l_1} = s_{l_1}^{k_1}$ and $s_{l_2} = s_{l_2}^{k_2}$. From the lemma, assume that $l_1$ is a direct precedent of $l_2$. It must be that $k_2 > k_1$, since from lines 15 and 16 of the BPG algorithm, at any arbitrary iteration k a link l is only added to the set of direct precedents of another link l' ($\mathcal{D D}_{l'}^k = \mathcal{D D}_{l'}^k \cup l$) if link l has been resolved ($l \notin \mathcal{L}^k$) and link l' has not been resolved ($l' \in \mathcal{L}^k$). Suppose now that $s_{l_2} \leq s_{l_1}$ and we will arrive at a contradiction. At iteration $k_1$ when link $l_1$ is resolved (BPG algorithm/line 11) we have that $s_{l_1}^{k_1} < s_{l_2}^{k_1}$, since $s_l^k = u_l^k$. Now using Property 4 we have that $k_2 > k_1$ implies $s_{l_2}^{k_1} \leq s_{l_2}^{k_2}$. Thus we have $s_{l_2} \leq s_{l_1} = s_{l_1}^{k_1} < s_{l_2}^{k_1} \leq s_{l_2}^{k_2} = s_{l_2}$, which is a contradiction.

A.1.2 Lemma 1

Bottleneck convergence order. A link l is removed from the set of unresolved links $\hat{L}k$ at iteration k in the BPG algorithm, $\mathcal{L}^k = \mathcal{L}^k \setminus \{l\}$, if and only if all of its direct and indirect precedent links have already been removed from this set at iteration k−1.

Proof. We start with the sufficient condition. Assume that at an arbitrary iteration k all direct and indirect precedents of a link $l_1$ have converged. We will also assume that link $l_1$ does not converge at iteration k and arrive at a contradiction. It must be that $s_{l_1}^k \neq u_{l_1}^k$, otherwise from lines 11 and 13 of the BPG algorithm link $l_1$ would converge at iteration k. This implies the existence of at least one link $l_r$ that shares a flow with $l_1$, $\mathcal{F}_{l_1} \cap \mathcal{F}_{l_r} \neq \{\emptyset\}$, such that at iteration k it has not converged yet, $l_r \in \mathcal{L}^k$, and $s_{l_r}^k < s_{l_1}^k$. Note from lines 18 and 19 such link is added to the relay set of link $l_1$, $l_r \in \mathcal{R}_{l_1}^k$. Assume link $l_1$ converges at iteration $k_1$, then since all of its direct precedents converged at iteration k, we have $s_{l_1}^{k_1} = s_{l_1}^k$. This also means that $s_{l_r}^{k_1} > s_{l_r}^k$, which necessarily implies the existence of at least one link $l_2$ that converges at an iteration $k_2$ such that $k < k_2 < k_1$. Such link is a direct precedent of $l_r$, and since $l_r$ is in the relay set of link $l_1$, at line 22 of the BPG algorithm, link $l_2$ becomes an indirect precedent of $l_1$. Since link $l_2$ converges at iteration $k_2$ and $k_2 > k$, we arrive at a contradiction.

To address the necessary condition, suppose that a link $l_1$ converges at iteration k and that another link $l_2$ that has not converged yet at the same iteration is either a direct or indirect precedent of link $l_1$. By construction of the BPG algorithm, however, this is not possible since once link $l_1$ converges at iteration k, it is removed from the set of unresolved links $\mathcal{L}^k$, thus no further direct or indirect links can be added to it.

A.1.3 Lemma 2

Bottleneck influence. A bottleneck l can influence the performance of another bottleneck l', i.e., $\partial s_l / \partial c_l \neq 0$, if and only if there exists a set of bottlenecks $\{l_1, l_2, \ldots, l_n\}$ such that $l_i$ is a direct precedent of $l_{i+1}$, for $1 \leq i \leq n-1$, $l_1 = l$ and $l_n = l'$.

Proof. We start with the sufficient condition. By induction, it is enough to show the case n=2. Assume that link $l_1$ is a direct precedent of link $l_2$, then there must exist a flow f bottlenecked at link $l_1$ that shares a flow with both $l_1$ and $l_2$, $f \in \mathcal{F}_{l_1} \cap \mathcal{F}_{l_2}$. Note that any infinitesimal change on the capacity of link $l_1$ changes the rate of flow $r_f$, since this flow is bottlenecked at the same link (BPG Algorithm/lines 9 and 12). Note also that such variation propagates to link $l_2$ inducing a change in its fair share (line 9), which implies as $\partial s_{l_2}/\partial c_{l_1} \neq 0$.

To address the necessary condition, note first that the performance of a link is uniquely determined by the fair share equation (line 9):

$$s_l^k(c_l, \Sigma_{\forall f \in C^k \cap \mathcal{F}_l} r_f)/l \; \mathcal{F}_l \backslash C^k |, \forall l \in \mathcal{L}^k \quad (28)$$

This equation depends on internal link parameters (such as its capacity $c_l$ and the number of flows going through it) as well as external parameter such as the rates of the flows bottlenecked at some other link $\{r_f | \forall f \in C^k \cap \mathcal{F}_l\}$. Thus $s_l$ can only be externally influenced by changing these rates. It is easy to see that these rates correspond to flows that are bottlenecked at links that are direct precedents of link l. Thus the fair share of a link can only change if the rate of one or more of its flows bottlenecked at one of its direct precedent links changes. Since the rates of these flows are equal to the fair share of these direct precedent links, this implies that in order to induce a change in the fair share of $s_l$, it is necessary to change the capacity of one or more of its direct precedent links.

A.1.4 Lemma 3

Depth of the bottleneck structure. The diameter of the BPG graph—which we will also refer as the depth or the number of levels of the bottleneck structure—is equal to the last value of the iterator k in the BPG algorithm.

Proof. Since the diameter of the BPG graph corresponds to the maximum length of any of its paths and since at every iteration the algorithm adds one more vertex to any longest path in the graph, the value of k at the end of the algorithm must be equal to the size of any longest path.

A.1.5 Lemma 4

Minimum convergence time of a distributed congestion control algorithm. Let $\tau(l_i, l_j)$ be a weight assigned to each edge $(l_i, l_j)$ of the BPG graph as follows: (1) If $l_i$ is a direct precedent of $l_j$, then $\tau(l_i, l_j)$ is the time that it takes for a message to be sent from $l_i$ to $l_j$; (2) If $l_i$ is an indirect precedent of $l_j$, then $\tau(l_i, l_j) = \max\{\tau(l_i, l_r) + \tau(l_r, l_j) | \text{for any relay link } l\_r \text{ between } l\_i \text{ and } l\_j\}$. Let $l_1 - l_2 - \ldots - l_n$ be a longest path terminating at link $l_n$ according to these weights. Then the minimum convergence time for link $l_n$ is $\Sigma_{1 \leq i \leq n-1} \tau(l_i, l_{i+1})$.

Proof. This lemma is a consequence of Lemma 1. From Lemma 1, we know that a link l cannot resolve its fair share until all of its direct and indirect precedents have resolved their own fair share. Furthermore, we know that if all the direct and indirect precedents of a link l have been resolved at iteration k, then link l can converge immediately after at iteration k+1. To derive the current lemma, we only need to take into account the time that it takes to communicate a message from the direct and indirect links of link l to link l itself. Because direct precedent links share a flow, communication can propagate directly. For the case of indirect precedence, communication has to go through the relay link. In particular, we need to select the relay link that imposes the longest distance, as that's the longest time it can take to propagate the state between a link and its indirect precedent. The $\tau(\cdot)$ function introduced in the lemma captures the value of these communication times for the two possible relations between bottleneck links.

A.1.6 Lemma 5

Flow influence. A flow f can influence the performance of another flow f', i.e., $\partial r_{f'}/\partial r_f \neq 0$, if and only if there exists a set of bottlenecks $\{l_1, l_2, \ldots, l_n\}$ such that (1) $l_i$ is a direct precedent of $l_{i+1}$, for $1 \leq i \leq n-1$, (2) flow f' is bottlenecked at link $l_n$ and (3) flow f goes through $l_1$.

Proof. Let f and f' be two arbitrary flows and assume that flow f' is bottlenecked at link l'. From lines 9 and 12 of the BPG algorithm, the rate of a flow corresponds to the fair share of its bottleneck. Thus flow f can only influence flow f' if it can affect link l''s fair share, $s_{l'}$. Assume that we apply an infinitesimal change to flow f's rate $r_f$. This could be achieved by applying a traffic shaper that slightly decreases its rate (negative infinitesimal) or by imposing a minimum rate constraint that assigns a rate slightly higher than the fair share of its bottleneck link $s_l$ (positive infinitesimal). For any link l traversed by flow f, such small perturbation will lead to an infinitesimal change in its fair share $s_l$. Now from Lemma 2 we know that a link l can only influence another link l' if there exists a directed path from l to l' in the BPG graph. Furthermore, Lemma 2 is a necessary and sufficient condition. Thus both the necessary and sufficient conditions of this lemma must hold too if we set $l=l_1$ and $l'=l_n$.

A.2 Results of the Bottleneck Structure with TCP Reno

We demonstrated above that BBR generally performs better in capturing a given network's bottleneck structure than AIMD-based protocols such as Cubic and Reno. While the results of BBR and Cubic are presented in FIGS. 9A-9F, FIGS. 22A-22F present the results for BBR and Reno. A comparison of BBR and Reno's bottleneck structures shows that unlike BBR, Reno is not able to identify the bottleneck structure of the network.

A.3 Results of the Low-Hitter Flow Experiment for TCP Cubic and Reno

Figure 23A:
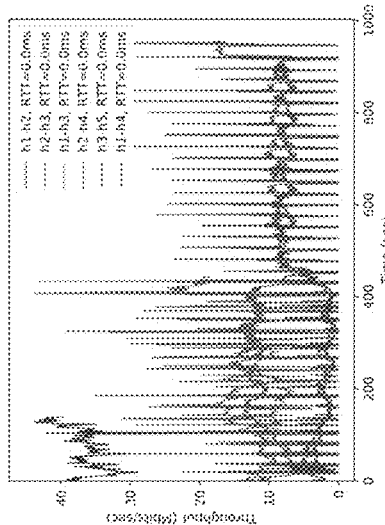
FIGS. 23A and 23D show the effect of running Cubic and Reno, respectively, on the network shown in FIG. 7A, where no flows are removed.
Figure 23B:
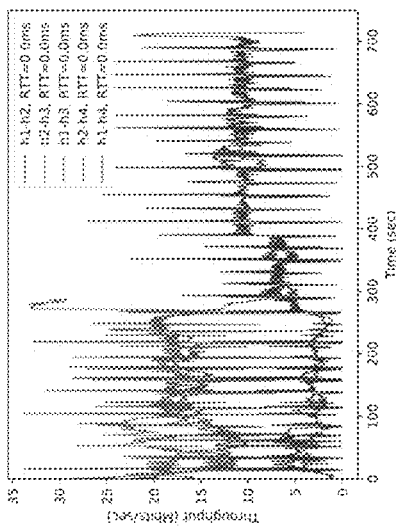
FIGS. 23B and 23E show the effect of running Cubic and Reno, respectively, on the network shown in FIG. 7A, where a heavy-hitter flow is removed.
Figure 23C:
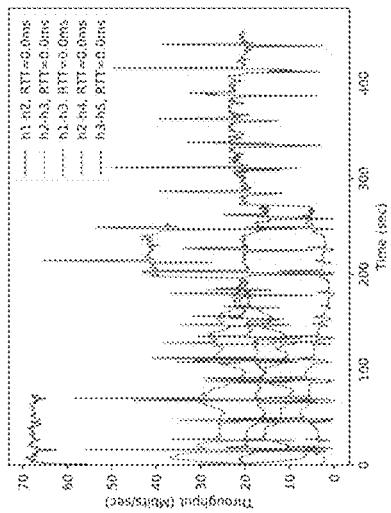
FIGS. 23C and 23F show the effect of running Cubic and Reno, respectively, on the network shown in FIG. 7A, where a low-hitter flow is removed.
Figure 23D:
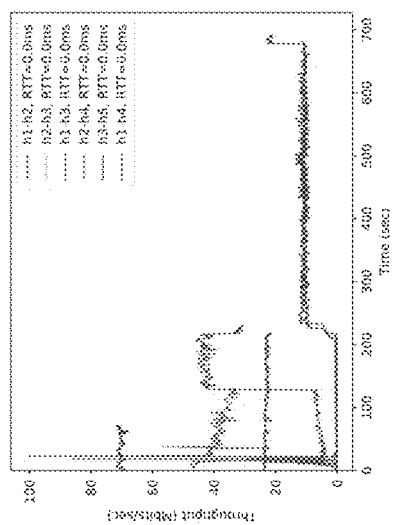
Figure 23E:
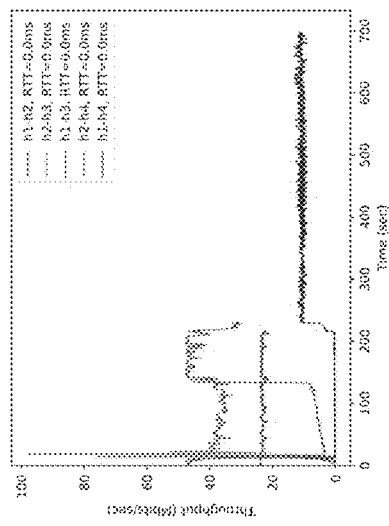
Figure 23F:
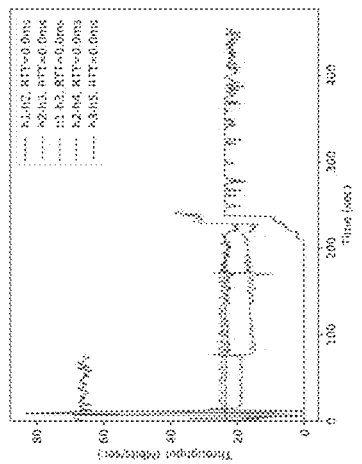

The plots in FIGS. 23A-23F correspond to the experiment described above using TCP Cubic and Reno instead of TCP BBR. Note that the similar qualitative results are obtained in Cubic and Reno as with BBR, with the biggest reduction in flow completion time achieved when the low-hitter flow $f_6$ is removed. The low-hit flow is also a high-impact flow when using TCP Cubic and Reno. FIGS. 23A-23C show the results for Cubic; FIGS. 23D-23F show the results for Reno.

A.4 Jain's Fairness Index

Jain's index is a metric that rates the fairness of a set of values $x_1, x_2, \ldots, x_n$ according to the following equation:

$$\mathcal{J}(x_1, x_2, \ldots, x_n) = \frac{\left(\sum_{i=1}^{n} x_i\right)^2}{n \cdot \sum_{i=1}^{n} x_i^2} = \frac{\bar{x}^2}{\overline{x^2}}$$

The index value ranges from 1/n (worst case) to 1 (best case).

For multi-link networks the value $x_i$ must be normalized to an optimal fairness allocation. We normalize $x_i$ as the ratio $f_i/O_i$, where $f_i$ is the rate of flow $f_i$ achieved through the experiments and $O_i$ is its expected max-min fair throughput.

A.5 Notes on Using the Framework in Production Networks

We now present practical considerations that would allow the integration of the proposed theory into modern data networks. The proposed theoretical framework requires three inputs:

Network topology. The set of links, $\mathcal{L}$, and their capacities, $\{c_l | \forall l \in \mathcal{L}\}$. Real-time topology information can normally be obtained from software defined networking (SDN) components or can infer it using techniques from the field of Network Tomography.

Flow information. The set of flows, $\{f_i | \forall l_i \in \mathcal{L}\}$. This input requires knowing the IP tuple (source and destination IP addresses and port numbers), and we can obtain that by using monitoring protocols (e.g., Net-Flow, sFlow or by using security monitoring tools.

Routing information. The set of links traversed by each flow or, equivalently, the set of flows traversing each link: $\{\mathcal{F}_l | \forall l \in \mathcal{L}\}$. We can infer this information from several vantage points, including switch routing tables, SDN controller.

Of the multiple avenues of potential operational use cases, we list the following:

Offline capacity planning. Having access to BPG graphs, network operators can identify high-impact bottlenecks and make trade-offs regarding link updates and capacity planning. For instance, bottlenecks that are consistently closer to the root of the BPG graph may be more important to upgrade than those located near the leaves because their influence is bigger (Lemma 2).

Real-Time Traffic engineering. As an online tool to help optimize traffic engineering, the proposed framework can be employed to compute the bottleneck structure and identify high-impact bottlenecks and flows in real-time.

Appendix B: Additional Material to the Theory of Flow Ordering

B.1 Topological Interpretation of the Property of Nested Convexity

Figure 24:
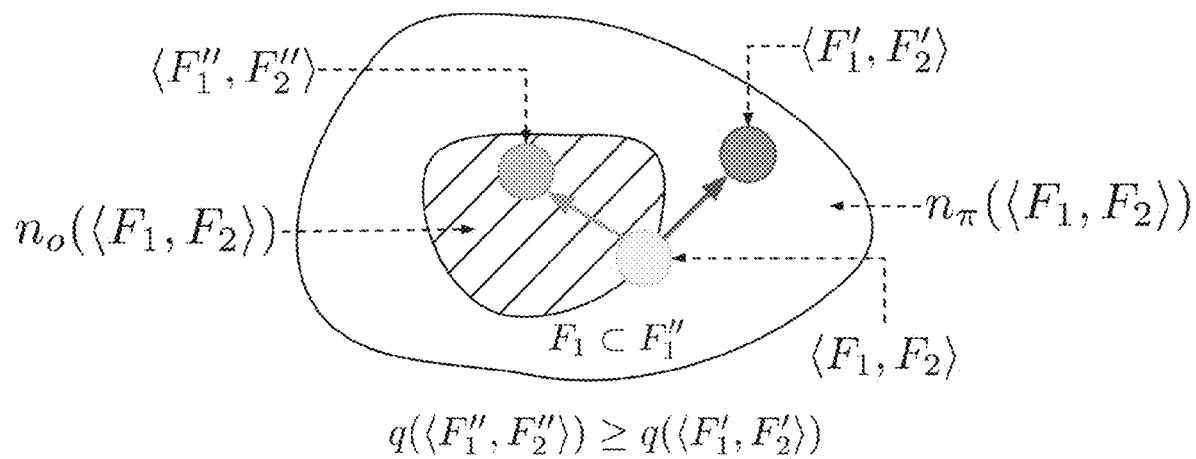
FIG. 24 depicts a nested convex partitioned QoS function, according to one embodiment.
Figure 25:
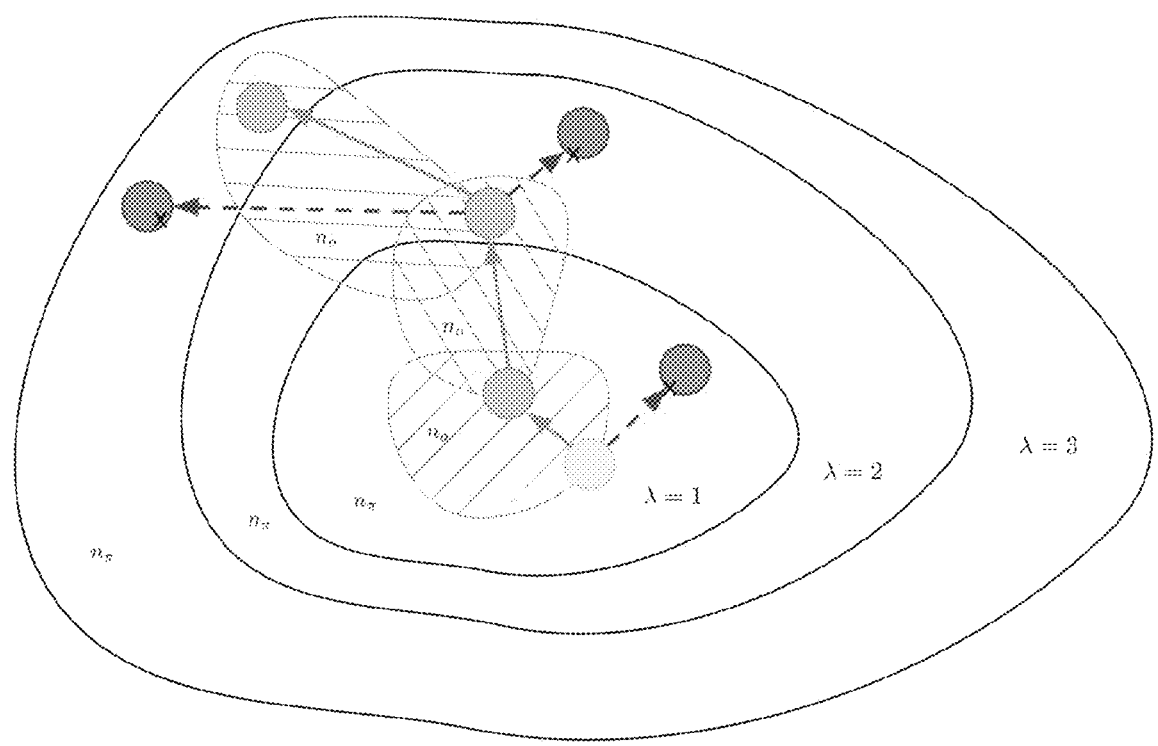
FIG. 25 illustrates the use of a nested convex partitioned QoS function in ordering flows, according to one embodiment.

FIG. 24 provides a topological interpretation of the property of nested convexity. A partitioned QoS function is said to be nested convex if for any subset of flows X, the maximal element in its partition neighborhood belongs to its nested neighborhood. For any arbitrary subset of flows $X \subset F$, search for the element in its partition neighborhood that is maximal according to the QoS function. If such element belongs to the nested neighborhood, then we say that the QoS function is nested convex. The key characteristic of such property is that while the search space in the partition neighborhood is combinatorial in size, the search space in the nested neighborhood is polynomial in size. As a result, this enables a greedy algorithm that can identify all the λ-optimal partitions in polynomial time, following the topological path represented in FIG. 25. If a partitioned QoS function is nested convex, then all the λ-optimal partitions (and thus the set of elephant flows) can be found in polynomial time using the Greedy algorithm.

B.2 Flow Gradient Computation Algorithm

Algorithm 3 provides the pseudocode of the algorithm introduced above in connection with Definition 16.

| Algorithm 3: ComputeFlowGradient(L, F, f*) | |
|---|---|
| 1 | % Local variables |
| 2 | $\mathcal{L}_b(f)$ := Flow f's bottleneck links; |
| 3 | $\mathcal{L}_{\bar{b}}(f)$ := Flow f's non-bottleneck links; |
| 4 | $\mathcal{F}_b(l)$ := Link l's bottleneck flows; |
| 5 | $\mathcal{F}_{\bar{b}}(l)$ := Link l's non-bottleneck flows; |
| 6 | Δ(f) := Flow f's rate drift; |
| 7 | β(l) := Link l's bandwidth drift; |
| 8 | $\mathcal{R}$ := List of flows to be processed; |
| 9 | % Initialization code |
| 10 | Set Δ(f) = 0 for all f ∈ F; |
| 11 | Set β(l) = 0 for all l ∈ L; |
| 12 | Set $\mathcal{R} = \{\emptyset\}$ |
| 13 | % Root initialization |
| 14 | Δ(f*) = −1; |
| 15 | $\mathcal{R} = \mathcal{R} \cup \mathcal{L}_{\bar{b}}(f^*)$; |
| 16 | for l ∈ $\mathcal{L}_b(f_i)$ do |
| 17 | β(l) = β(l) − 1; |
| 18 | for f ∈ $\mathcal{F}_b(l)$ and f ≠ f do |

| Algorithm 3: ComputeFlowGradient(L, F, f*) | |
|---|---|
| 19 | Δ(f) = β(l)/(|$\mathcal{F}_b(l)$| − 1); |
| 20 | $\mathcal{R} = \mathcal{R} \cup \mathcal{L}_{\bar{b}}(f)$; |
| 21 | end for |
| 22 | end for |
| 23 | % Main rate propagation loop |
| 24 | while $\mathcal{R} \neq \{\emptyset\}$ do |
| 25 | l = EXTRACT_HIGHEST_LINK($\mathcal{R}$); |
| 26 | β(l) = β(l) − $\Sigma_{f \in \mathcal{F}_b(l)}$ Δ(f); |
| 27 | for f ∈ $\mathcal{F}_{\bar{b}}(l)$ do |
| 28 | Δ(f) = min{Δ(f), β(l)/|$\mathcal{F}_b(l)$|}; |
| 29 | $\mathcal{R} = \mathcal{R} \cup \mathcal{L}_{\bar{b}}(f)$; |
| 30 | end for |
| 31 | end while |
| 32 | return $\Sigma_{\forall f \in F}$ Δ(f); |

B.3 Smallest Non-Nested Convex Networks

FIG. 26A presents the topology of the smallest network with constant link capacity that is not nested convex according to $q_{m3f}(\ )$. This network is singular. As expected from Lemma 9, this network is singular, since flow $f_5$ has two bottlenecks at links $l_2$ and $l_3$ (the same applies to flow $f_6$). This network is not nested convex because the 1-optimal partition has two solutions $F_1=\{f_4\}$ or $F_1=\{f_5\}$ and none is included by the 2-optimal partition which is $F_2=\{f_2, f_3\}$.

FIG. 26B presents the topology of the smallest network with constant capacity that is neither nested convex nor singular according to $q_{m3f}(\ )$. This network is not nested convex because the 1-optimal partition is $F_1=\{f_8\}$ and is not included by the 2-optimal partition which is $F_2=\{f_6, f_7\}$.

B.4 Google's B4 Network Topology and Flow Gradients

FIG. 27 presents the topology of Google's B4 network. Assuming each pair of nodes is connected via a flow following a shortest path, the flow in red corresponds to the largest flow under the assumption that all links have the same capacity and that the QoS function is modeled according to the max-min/max-flow QoS function.

Figure 29:
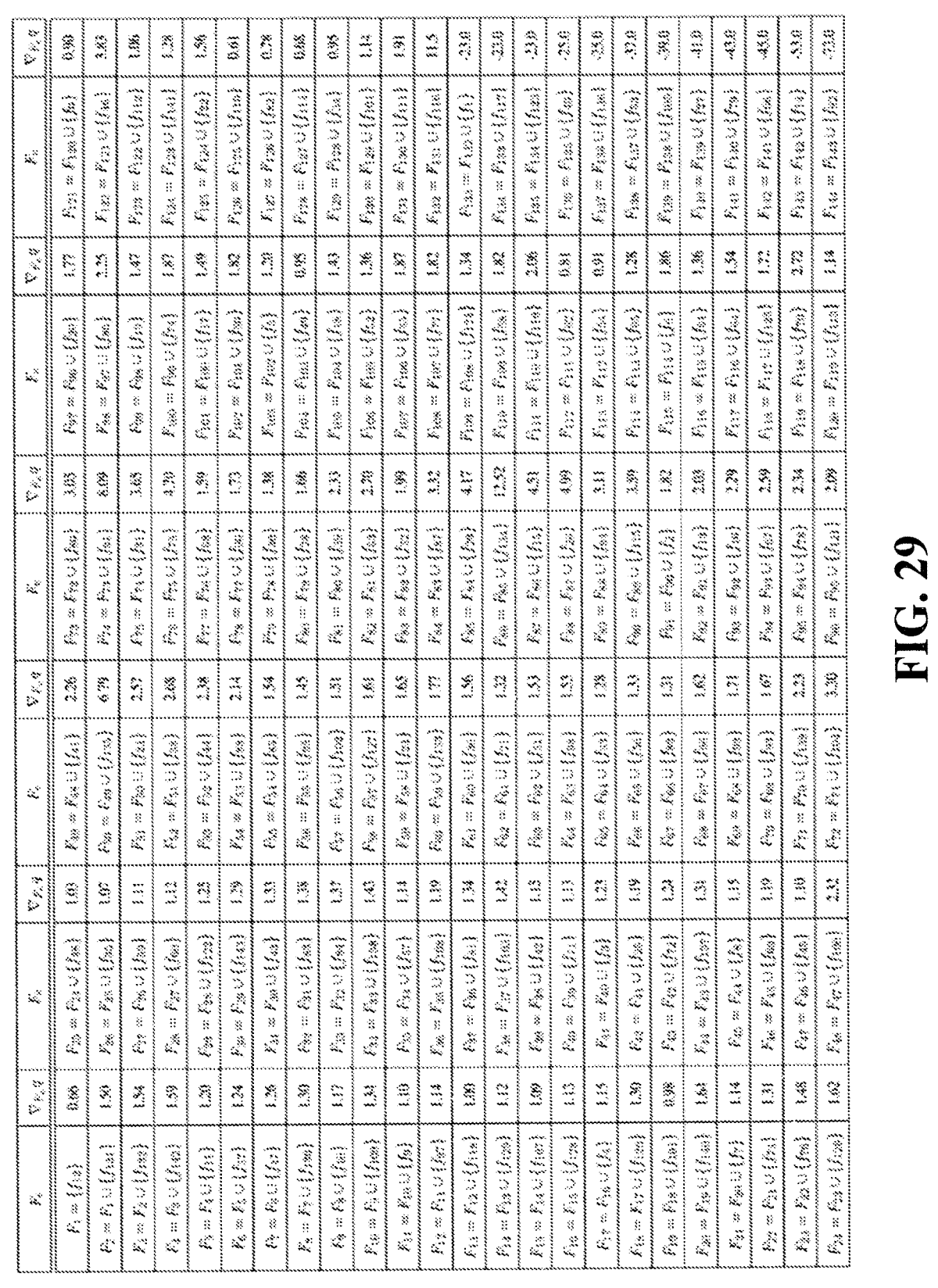

FIG. 29 shows the identification of the flow size ordering for Google's B4 network via the computation of the flow gradients for all possible λ-optimal partitions. FIG. 29 presents all of its λ-optimal partitions and their gradients when connecting every two pair of nodes (a total of 144 flows) using a shortest path and under the assumption of nested convexity for the m3f QoS function. The largest 10 flows are $f_{12}>f_{131}>f_{132}>f_{142}>f_{11}>f_{37}>f_{47}>f_{130}>f_{10}>f_{109}>f_9$ while the smallest 10 flows are $f_{123}>f_{40}>f_{136}>f_{53}>f_{105}>f_{27}>f_{79}>f_{66}>f_{14}>f_{92}$. $F_{132}$ is the largest subset of flows that produces a positive gradient, while flows $f_1$, $f_{117}$, $f_{123}$, $f_{40}$, $f_{136}$, $f_{53}$, $f_{105}$, $f_{27}$, $f_{79}$, $f_{66}$, $f_{14}$, $f_{92}$ produce a negative gradient and should not be traffic shaped in order to avoid QoS deterioration.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted. Sets and subsets, in general, include one or more members.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communication protocols to facilitate communication between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communication with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communication protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

What is claimed is:

1. A method for improving network utilization by configuring processing of flows therein, the method comprising:
   in a network comprising a plurality of links and having a plurality of flows that are processed according to P policies, P being greater than 1,
   evaluating a plurality of candidate partitionings of the plurality of flows into P groups, using a QoS function that, using network topology, determines network performance for each candidate partitioning, wherein:
   according to a candidate partitioning, a first flow belongs to a first group of the P groups and one or more flows belong to a second group of the P groups; and
   to determine the network performance, the QoS function accounts for effect of rate drift in a rate of the first flow on respective rates of all other flows in the plurality of flows; and
   designating a candidate partitioning that maximizes the network performance as best partitioning, wherein the plurality of flows are allocated to P groups according to the best partitioning and one or more flows in each group are processed according to a respective one of the P policies.

2. The method of claim 1, wherein the QoS function comprises a generalized P-partitioned set function receiving (P−1) sets as inputs.

3. The method of claim 1, wherein the QoS function comprises a max-min-max-flow (m3f) function.

4. The method of claim 3, wherein the max-min-max-flow (m3f) function comprises: (i) a weighted max-min-max-flow function, (ii) a max-min-weighted-max-flow function, or (iii) a weighted max-min-weighted-max-flow function.

5. The method of claim 1, wherein the QoS function guarantees for at least one flow from the plurality of flows a specified minimum flow rate.

6. The method of claim 1, wherein the QoS function is inclusive.

7. The method of claim 6, wherein:
the plurality of candidate partitionings comprises one or more sets of partitionings, one or more partitionings in each set corresponding to a respective value of a parameter ($\lambda$); and
evaluating the plurality of candidate partitionings comprises:
selecting a plurality of parameter values in order and, for each parameter value:
evaluating from a corresponding set one or more candidate partitionings using the QoS function; and
designating a candidate partitioning that maximizes the network performance as optimal partitioning for that parameter value,
yielding a plurality of optimal partitionings corresponding to the plurality of parameter values; and
designating as the best partitioning from the plurality of optimal partitionings, a partitioning for which the network performance according to the QoS function is maximum.

8. The method of claim 7, wherein evaluating the one or more candidate partitionings for a current parameter value comprises identifying a nested neighborhood of the optimal partitioning for a preceding parameter value.

9. The method of claim 8, wherein:
in the optimal partitioning for the preceding parameter value, each flow belonging to a first group in the P groups is larger in size than any flow in a second group in the P groups;
each partitioning is encoded using P symbols; and
identifying the nested neighborhood comprises selecting a candidate partitioning such that:
Manhattan distance between an encoding of the candidate partitioning and an encoding of the optimal partitioning for the preceding parameter value is less than or equal to a specified threshold; and
each flow designated to the first group in the optimal partitioning for the preceding parameter value is designated to a corresponding first group in the candidate partitioning.

10. The method of claim 1, wherein evaluating a particular candidate partitioning comprises:
constructing a flow gradient graph for the network;
decrementing a respective flow rate of each flow in at least one partition according to the candidate partitioning, by a unit rate ($\delta$);
propagating reduction in the flow rates through the flow gradient graph to obtain a flow rate drift at each flow in the network; and
aggregating the flow rate drifts using a function based on the QoS function to obtain the network performance.

11. The method of claim 10, wherein constructing the flow gradient graph comprises:
creating a link vertex for each bottleneck link in the network and a flow vertex for each flow in the network;
for each link in the network:
identifying one or more flows bottlenecked by that link, and adding a respective directed edge from a link vertex corresponding to that link to the respective flow vertices corresponding to each of the one or more bottlenecked flows; and
identifying non-bottlenecked flows passing through the link, and adding a respective directed edge from a flow vertex corresponding to each non-bottlenecked flow to the link vertex corresponding to the link.

12. The method of claim 11, wherein the one or more bottlenecked flows and the one or more non-bottlenecked flows are identified by constructing a bottleneck precedence graph.

13. The method of claim 1, wherein the network is selected from the group consisting of a data network, an energy-distribution network, a cellular network, and a goods-distribution network.

14. The method of claim 1, wherein:
P is equal to two; and
according to the best partitioning, one or more flows from the plurality of flows belong to a first group and are designated elephant flows, and remaining flow or flows belong to a second group and are designated mouse flows.

15. The method of claim 1, wherein each of the P policies defines a respective processing priority for flows belonging to the corresponding one of the P groups.

16. A system for improving network utilization by configuring processing of flows therein, the system comprising:
a first processor;
a first memory in electrical communication with the first processor, the first memory comprising instructions which, when executed by a processing unit comprising at least one of the first processor and a second processor, and in electronic communication with a memory module comprising at least one of the first memory and a second memory, program the processing unit to:
in a network comprising a plurality of links and having a plurality of flows that are processed according to P policies, P being greater than 1,
evaluate a plurality of candidate partitionings of the plurality of flows into P groups, using a QoS function that, using network topology, determines network performance for each candidate partitioning, wherein:
according to a candidate partitioning, a first flow belongs to a first group of the P groups and one or more flows belong to a second group of the P groups; and
to determine the network performance, the QoS function accounts for effect of rate drift in a rate of the first flow on respective rates of all other flows in the plurality of flows; and
designate a candidate partitioning that maximizes the network performance as best partitioning, wherein the plurality of flows are allocated to P groups according to the best partitioning and one or more flows in each group are processed according to a respective one of the P policies.

17. The system of claim 16, wherein the QoS function comprises a generalized P-partitioned set function receiving (P−1) sets as inputs.

18. The system of claim 16, wherein the QoS function comprises a max-min-max-flow (m3f) function.

19. The system of claim 18, wherein the max-min-max-flow (m3f) function comprises: (i) a weighted max-minmax-flow function, (ii) a max-min-weighted-max-flow function, or (iii) a weighted max-min-weighted-max-flow function.

20. The system of claim 16, wherein the QoS function guarantees for at least one flow from the plurality of flows a specified minimum flow rate.

21. The system of claim 16, wherein the QoS function is inclusive.

22. The system of claim 21, wherein:
the plurality of candidate partitionings comprises one or more sets of partitionings, one or more partitionings in each set corresponding to a respective value of a parameter ($\lambda$); and
to evaluate the plurality of candidate partitionings, the instructions program the processing unit to:
select a plurality of parameter values in order and, for each parameter value:
evaluate from a corresponding set one or more candidate partitionings using the QoS function; and
designate a candidate partitioning that maximizes the network performance as optimal partitioning for that parameter value,
yielding a plurality of optimal partitionings corresponding to the plurality of parameter values; and
designate as the best partitioning from the plurality of optimal partitionings, a partitioning for which the network performance according to the QoS function is maximum.

23. The system of claim 22, wherein to evaluate the one or more candidate partitionings for a current parameter value, the instructions program the processing unit to:
identify a nested neighborhood of the optimal partitioning for a preceding parameter value.

24. The system of claim 23, wherein:
in the optimal partitioning for the preceding parameter value, each flow belonging to a first group in the P groups is larger in size than any flow in a second group in the P groups;
each partitioning is encoded using P symbols; and
to identify the nested neighborhood the instructions program the processing unit to select a candidate partitioning such that:
Manhattan distance between an encoding of the candidate partitioning and an encoding of the optimal partitioning for the preceding parameter value is less than or equal to a specified threshold; and
each flow designated to the first group in the optimal partitioning for the preceding parameter value is designated to a corresponding first group in the candidate partitioning.

25. The system of claim 16, wherein to evaluate a particular candidate partitioning, the instructions program the processing unit to:
construct a flow gradient graph for the network;
decrement a respective flow rate of each flow in at least one partition according to the candidate partitioning, by a unit rate ($\delta$);
propagate reduction in the flow rates through the flow gradient graph to obtain a flow rate drift at each flow in the network; and
aggregate the flow rate drifts using a function based on the QoS function to obtain the network performance.

26. The system of claim 25, wherein to construct the flow gradient graph the instructions program the processing unit to:
create a link vertex for each bottleneck link in the network and a flow vertex for each flow in the network;
for each link in the network:
identify one or more flows bottlenecked by that link, and add a respective directed edge from a link vertex corresponding to that link to the respective flow vertices corresponding to each of the one or more bottlenecked flows; and
identify non-bottlenecked flows passing through the link, and add a respective directed edge from a flow vertex corresponding to each non-bottlenecked flow to the link vertex corresponding to the link.

27. The system of claim 26, wherein to identify the one or more bottlenecked flows and the one or more non-bottlenecked flows, the instructions program the processing unit to:
construct a bottleneck precedence graph.

28. The system of claim 16, wherein the network is selected from the group consisting of a data network, an energy-distribution network, a cellular network, and a goods-distribution network.

29. The system of claim 16, wherein:
P is equal to two; and
according to the best partitioning, one or more flows from the plurality of flows belong to a first group and are designated elephant flows, and remaining flow or flows belong to a second group and are designated mouse flows.

30. The system of claim 16, wherein each of the P policies defines a respective processing priority for flows belonging to the corresponding one of the P groups.

* * * * *

UNITED STATES PATENT AND TRADEMARK OFFICE
CERTIFICATE OF CORRECTION

| | | |
|---|---|---|
| PATENT NO. | : 11,398,984 B1 | Page 1 of 1 |
| APPLICATION NO. | : 16/580718 | |
| DATED | : July 26, 2022 | |
| INVENTOR(S) | : Jordi Ros-Giralt et al. | |

It is certified that error appears in the above-identified patent and that said Letters Patent is hereby corrected as shown below:

In the Specification

At Column 1, Line 20, please amend the following paragraph under the heading "GOVERNMENT LICENSE RIGHTS":
-- This invention was made with government support under contract Nos. DE-SC0019523 and DE-SC0011358 awarded by the U.S. Department of Energy (DoE). The government has certain rights in the invention. --

Signed and Sealed this
First Day of April, 2025

Coke Morgan Stewart
*Acting Director of the United States Patent and Trademark Office*